(12) United States Patent
Rubenstein et al.

(10) Patent No.: US 12,289,183 B2
(45) Date of Patent: Apr. 29, 2025

(54) SYSTEM AND METHOD FOR A GLOBAL VIRTUAL NETWORK

(71) Applicant: UMBRA Technologies Ltd., Hong Kong (CN)

(72) Inventors: Joseph E. Rubenstein, Beijing (CN); Jørn Allan Dose Knutsen, Oslo (NO); Thibaud August Bernard Jean Saint-Martin, Aubignan (FR); Carlos Eduardo Oré, Saint-Herblain (FR); Fred Broussard, Indianapolis, IN (US)

(73) Assignee: UMBRA Technologies Ltd., Hong Kong (CN)

( * ) Notice: Subject to any disclaimer, the term of this patent is extended or adjusted under 35 U.S.C. 154(b) by 0 days.

(21) Appl. No.: 18/390,894

(22) Filed: Dec. 20, 2023

(65) Prior Publication Data

US 2024/0205049 A1 Jun. 20, 2024

Related U.S. Application Data

(63) Continuation of application No. 17/589,753, filed on Jan. 31, 2022, now Pat. No. 11,881,964, which is a
(Continued)

(51) Int. Cl.
*H04L 12/46* (2006.01)
*H04L 9/40* (2022.01)
(Continued)

(52) U.S. Cl.
CPC .......... *H04L 12/4633* (2013.01); *H04L 45/12* (2013.01); *H04L 45/64* (2013.01); *H04L 61/4511* (2022.05); *H04L 63/02* (2013.01)

(58) Field of Classification Search
CPC . H04L 12/4633; H04L 61/4511; H04L 45/12; H04L 45/64; H04L 63/02
(Continued)

(56) References Cited

U.S. PATENT DOCUMENTS 4,890,281 A 12/1989 Balboni et al.
5,828,847 A 10/1998 Gehr et al.
(Continued)

FOREIGN PATENT DOCUMENTS

AU 2014381693 A1 8/2016
CN 1315088 A 9/2001
(Continued)

OTHER PUBLICATIONS

Russell, R., "Introduction to RDMA Programming," Apr. 17, 2014, XP055232895, last retrieved from the internet Oct. 5, 2021: URL: web.archive/org/web/20140417205540/http://www.cs.unh.edu/~rdr/rdma-intro-module.ppt (76 pages). (Previously submitted in related U.S. Appl. No. 15/546,247.).
(Continued)

*Primary Examiner* — Melvin H Pollack
(74) *Attorney, Agent, or Firm* — Gardella Alciati

(57) ABSTRACT

Systems and methods for connecting devices via a virtual global network are disclosed. In one embodiment the network system may comprise a first device in communication with a first endpoint device and a second device in communication with a second endpoint device. The first and second devices may be connected with a communication path. The communication path may comprise one or more intermediate tunnels connecting each endpoint device to one or more intermediate access point servers and one or more control servers.

21 Claims, 61 Drawing Sheets

Related U.S. Application Data continuation of application No. 16/815,864, filed on Mar. 11, 2020, now Pat. No. 11,240,064, which is a continuation of application No. 15/546,247, filed as application No. PCT/US2016/015278 on Jan. 28, 2016, now Pat. No. 10,630,505, and a continuation of application No. PCT/IB2016/000110, filed on Jan. 5, 2016, and a continuation of application No. PCT/US2015/064242, filed on Dec. 7, 2015.

(60) Provisional application No. 62/266,060, filed on Dec. 11, 2015, provisional application No. 62/174,394, filed on Jun. 11, 2015, provisional application No. 62/151,174, filed on Apr. 22, 2015, provisional application No. 62/144,293, filed on Apr. 7, 2015, provisional application No. 62/108,987, filed on Jan. 28, 2015.

(51) Int. Cl.
*H04L 45/12* (2022.01)
*H04L 45/64* (2022.01)
*H04L 61/4511* (2022.01)

(58) Field of Classification Search
USPC .......................................................... 709/249
See application file for complete search history.

(56) References Cited

U.S. PATENT DOCUMENTS

| | | | |
|---|---|---|---|
| 5,893,089 | A | 4/1999 | Kikinis |
| 5,940,838 | A | 8/1999 | Schmuck et al. |
| 6,209,039 | B1 | 3/2001 | Albright et al. |
| 6,289,201 | B1 | 9/2001 | Weber et al. |
| 6,374,302 | B1 | 4/2002 | Galasso et al. |
| 6,463,465 | B1 | 10/2002 | Nieuwejaar |
| 6,477,166 | B1 | 11/2002 | Sanzi et al. |
| 6,502,135 | B1 | 12/2002 | Munger et al. |
| 6,593,863 | B2 | 7/2003 | Pitio |
| 6,611,587 | B2 | 8/2003 | Brown et al. |
| 6,671,361 | B2 | 12/2003 | Goldstein |
| 6,678,241 | B1 | 1/2004 | Gai et al. |
| 6,690,223 | B1 | 2/2004 | Wan |
| 6,693,876 | B1 | 2/2004 | Zey |
| 6,735,207 | B1 | 5/2004 | Prasad et al. |
| 6,785,295 | B1 | 8/2004 | Graf et al. |
| 6,879,995 | B1 | 4/2005 | Chinta et al. |
| 6,973,048 | B2 | 12/2005 | Pitio |
| 6,996,117 | B2 | 2/2006 | Lee et al. |
| 7,006,505 | B1 | 2/2006 | Bleszynski et al. |
| 7,028,183 | B2 * | 4/2006 | Simon .................. H04L 63/164 713/168 |
| 7,039,701 | B2 | 5/2006 | Wesley |
| 7,069,318 | B2 | 6/2006 | Burbeck et al. |
| 7,145,882 | B2 | 12/2006 | Limaye et al. |
| 7,145,922 | B2 | 12/2006 | Pitio |
| 7,161,899 | B2 | 1/2007 | Limaye et al. |
| 7,161,965 | B2 | 1/2007 | Pitio |
| 7,173,902 | B2 | 2/2007 | Daniell et al. |
| 7,177,929 | B2 | 2/2007 | Burbeck et al. |
| 7,221,687 | B2 | 5/2007 | Shugard |
| 7,224,706 | B2 | 5/2007 | Loeffler-Lejeune |
| 7,254,833 | B1 | 8/2007 | Cornelius et al. |
| 7,269,130 | B2 | 9/2007 | Pitio |
| 7,310,348 | B2 | 12/2007 | Trinh et al. |
| 7,349,403 | B2 | 3/2008 | Lee et al. |
| 7,349,411 | B2 | 3/2008 | Pitio |
| 7,349,435 | B2 | 3/2008 | Giacomini |
| 7,389,312 | B2 | 6/2008 | Ohran |
| 7,433,964 | B2 | 10/2008 | Raguram et al. |
| 7,551,623 | B1 | 6/2009 | Feroz et al. |
| 7,577,691 | B2 | 8/2009 | Novik et al. |
| 7,587,487 | B1 | 9/2009 | Gunturu |
| 7,633,909 | B1 | 12/2009 | Jones et al. |
| 7,689,722 | B1 | 3/2010 | Timms et al. |
| 7,742,405 | B2 | 6/2010 | Trinh et al. |
| 7,742,411 | B2 | 6/2010 | Trinh et al. |
| 7,801,030 | B1 | 9/2010 | Aggarwal et al. |
| 7,822,877 | B2 | 10/2010 | Chong et al. |
| 7,870,418 | B2 | 1/2011 | Sekaran et al. |
| 7,886,305 | B2 | 2/2011 | Ahmed et al. |
| 7,930,339 | B2 | 4/2011 | Tobita et al. |
| 7,957,311 | B2 | 6/2011 | Trinh et al. |
| 8,010,751 | B2 | 8/2011 | Yang et al. |
| 8,064,909 | B2 | 11/2011 | Spinelli et al. |
| 8,069,258 | B1 | 11/2011 | Howell |
| 8,069,435 | B1 | 11/2011 | Lai |
| 8,073,777 | B2 | 12/2011 | Barry et al. |
| 8,107,363 | B1 | 1/2012 | Saluja |
| 8,239,915 | B1 | 8/2012 | Satish et al. |
| 8,259,571 | B1 | 9/2012 | Raphel et al. |
| 8,266,672 | B2 | 9/2012 | Moore |
| 8,401,028 | B2 | 3/2013 | Mihaly et al. |
| 8,422,397 | B2 | 4/2013 | Ansari et al. |
| 8,437,641 | B2 | 5/2013 | Ono et al. |
| 8,458,786 | B1 | 6/2013 | Kailash et al. |
| 8,544,065 | B2 | 9/2013 | Archer et al. |
| 8,595,478 | B2 * | 11/2013 | Haney .................. H04L 45/04 713/153 |
| 8,611,335 | B1 | 12/2013 | Wu et al. |
| 8,611,355 | B1 | 12/2013 | Sella et al. |
| 8,625,411 | B2 | 1/2014 | Limaye et al. |
| 8,687,791 | B1 | 4/2014 | Cordell et al. |
| 8,699,683 | B1 | 4/2014 | Jackson |
| 8,769,057 | B1 | 7/2014 | Breau et al. |
| 8,798,060 | B1 | 8/2014 | Vautrin et al. |
| 8,854,965 | B1 | 10/2014 | Richards |
| 8,861,344 | B2 | 10/2014 | Trinh et al. |
| 8,874,680 | B1 | 10/2014 | Das |
| 8,966,075 | B1 | 2/2015 | Chickering et al. |
| 8,976,798 | B2 | 3/2015 | Border et al. |
| 9,015,310 | B2 | 4/2015 | Ochi |
| 9,036,589 | B2 * | 5/2015 | Kakadia ................ H04W 40/02 370/329 |
| 9,038,151 | B1 | 5/2015 | Chua et al. |
| 9,110,820 | B1 | 8/2015 | Bent et al. |
| 9,164,702 | B1 | 10/2015 | Nesbit et al. |
| 9,164,795 | B1 | 10/2015 | Vincent |
| 9,167,501 | B2 | 10/2015 | Kempf et al. |
| 9,172,603 | B2 | 10/2015 | Padmanabhan et al. |
| 9,213,594 | B2 | 12/2015 | Strasser et al. |
| 9,240,818 | B2 * | 1/2016 | Solondz ................ H04B 15/00 |
| 9,241,004 | B1 | 1/2016 | April |
| 9,253,028 | B2 | 2/2016 | Decusatis et al. |
| 9,277,452 | B1 | 3/2016 | Aithal et al. |
| 9,294,304 | B2 | 3/2016 | Sindhu |
| 9,294,497 | B1 * | 3/2016 | Ben-Or .............. H04L 63/1433 |
| 9,298,719 | B2 | 3/2016 | Noronha et al. |
| 9,350,644 | B2 | 5/2016 | Desai et al. |
| 9,350,710 | B2 | 5/2016 | Herle et al. |
| 9,351,193 | B2 | 5/2016 | Raleigh et al. |
| 9,369,433 | B1 | 6/2016 | Paul et al. |
| 9,432,258 | B2 | 8/2016 | Van Der Merwe et al. |
| 9,432,336 | B2 | 8/2016 | Ostrowski et al. |
| 9,444,823 | B2 * | 9/2016 | Narayanan ............. H04L 67/14 |
| 9,450,817 | B1 | 9/2016 | Bahadur et al. |
| 9,455,924 | B2 | 9/2016 | Cicic et al. |
| 9,461,996 | B2 | 10/2016 | Hayton et al. |
| 9,525,663 | B2 | 12/2016 | Yuan et al. |
| 9,525,696 | B2 | 12/2016 | Kapoor et al. |
| 9,544,137 | B1 | 1/2017 | Brandwine |
| 9,554,061 | B1 | 1/2017 | Proctor, Jr. et al. |
| 9,565,117 | B2 | 2/2017 | Dahod et al. |
| 9,569,587 | B2 | 2/2017 | Ansari et al. |
| 9,590,820 | B1 | 3/2017 | Shukla |
| 9,590,902 | B2 | 3/2017 | Lin et al. |
| 9,609,003 | B1 * | 3/2017 | Chmielewski ........ H04L 67/025 |
| 9,609,482 | B1 | 3/2017 | Want et al. |
| 9,641,612 | B2 | 5/2017 | Yu et al. |
| 9,647,952 | B2 * | 5/2017 | Williams ............ H04L 43/0829 |
| 9,699,001 | B2 | 7/2017 | Addanki et al. |
| 9,699,135 | B2 | 7/2017 | Dinha et al. |

(56) References Cited

U.S. PATENT DOCUMENTS

| Patent/Publication No. | Date | Inventor(s) | Classification |
|---|---|---|---|
| 9,729,539 B1 | 8/2017 | Agrawal et al. | |
| 9,807,613 B2 * | 10/2017 | Egner | H04W 4/027 |
| 9,858,559 B2 | 1/2018 | Raleigh et al. | |
| 9,888,042 B2 | 2/2018 | Annamalaisami et al. | |
| 9,898,317 B2 | 2/2018 | Nakil et al. | |
| 9,948,649 B1 | 4/2018 | Zhao et al. | |
| 9,996,548 B2 * | 6/2018 | Grube | G06F 11/1092 |
| 10,009,287 B2 * | 6/2018 | Djukic | H04L 47/70 |
| 10,044,678 B2 | 8/2018 | Van Der Merwe et al. | |
| 10,061,664 B2 | 8/2018 | Verkaik et al. | |
| 10,070,369 B2 | 9/2018 | Lynn, Jr. et al. | |
| 10,078,754 B1 | 9/2018 | Brandwine et al. | |
| 10,079,839 B1 | 9/2018 | Bryan et al. | |
| 10,091,304 B2 | 10/2018 | Hoffmann et al. | |
| 10,177,957 B1 | 1/2019 | Hankins et al. | |
| 10,237,253 B2 | 3/2019 | Chen et al. | |
| 10,275,267 B1 | 4/2019 | de Kadt et al. | |
| 10,331,472 B2 | 6/2019 | Wang et al. | |
| 10,574,482 B2 | 2/2020 | Oré et al. | |
| 10,587,576 B2 * | 3/2020 | Cooper | H04L 63/0209 |
| 10,630,505 B2 | 4/2020 | Rubenstein et al. | |
| 10,673,712 B1 | 6/2020 | Gosar et al. | |
| 10,756,929 B2 | 8/2020 | Knutsen et al. | |
| 10,789,367 B2 * | 9/2020 | Joseph Durairaj | G06N 3/043 |
| 10,904,201 B1 | 1/2021 | Ermagan et al. | |
| 10,922,286 B2 | 2/2021 | Rubenstein et al. | |
| 11,032,187 B2 | 6/2021 | Hassan | |
| 11,092,447 B2 | 8/2021 | Aiello et al. | |
| 11,108,595 B2 | 8/2021 | Knutsen et al. | |
| 11,240,064 B2 | 2/2022 | Rubenstein et al. | |
| 11,418,955 B2 * | 8/2022 | Marinho | H04L 49/208 |
| 11,526,403 B1 * | 12/2022 | Ruslyakov | G06F 11/2097 |
| 11,632,323 B2 * | 4/2023 | Singh | H04L 45/14 709/238 |
| 11,881,964 B2 | 1/2024 | Rubenstein et al. | |
| 11,888,818 B2 * | 1/2024 | Syvänne | H04L 63/0272 |
| 11,929,907 B2 * | 3/2024 | Trakinat | H04L 45/24 |
| 2002/0007350 A1 | 1/2002 | Yen | |
| 2002/0029267 A1 | 3/2002 | Sankuratripati et al. | |
| 2002/0046253 A1 | 4/2002 | Uchida et al. | |
| 2002/0049901 A1 | 4/2002 | Carvey | |
| 2002/0087447 A1 | 7/2002 | McDonald et al. | |
| 2002/0186654 A1 | 12/2002 | Tornar | |
| 2003/0023351 A1 | 1/2003 | Fukui | |
| 2003/0046529 A1 | 3/2003 | Loison et al. | |
| 2003/0072433 A1 | 4/2003 | Brown et al. | |
| 2003/0110214 A1 | 6/2003 | Sato | |
| 2003/0147403 A1 | 8/2003 | Border et al. | |
| 2003/0195973 A1 | 10/2003 | Savarda | |
| 2003/0233551 A1 | 12/2003 | Kouznetsov et al. | |
| 2004/0090972 A1 * | 5/2004 | Barrett | H04L 63/0272 370/401 |
| 2004/0205339 A1 | 10/2004 | Medin | |
| 2004/0268151 A1 | 12/2004 | Matsuda | |
| 2005/0180319 A1 | 8/2005 | Hutnik et al. | |
| 2005/0203892 A1 | 9/2005 | Wesley et al. | |
| 2005/0208926 A1 | 9/2005 | Hamada | |
| 2005/0235352 A1 | 10/2005 | Staats et al. | |
| 2006/0020793 A1 | 1/2006 | Rogers et al. | |
| 2006/0031407 A1 | 2/2006 | Dispensa et al. | |
| 2006/0031483 A1 | 2/2006 | Lund et al. | |
| 2006/0047944 A1 | 3/2006 | Kilian-Kehr | |
| 2006/0075057 A1 | 4/2006 | Gildea et al. | |
| 2006/0179150 A1 | 8/2006 | Farley et al. | |
| 2006/0195896 A1 | 8/2006 | Fulp et al. | |
| 2006/0225072 A1 | 10/2006 | Lari et al. | |
| 2007/0083482 A1 | 4/2007 | Rathi et al. | |
| 2007/0112812 A1 | 5/2007 | Harvey et al. | |
| 2007/0150947 A1 * | 6/2007 | Vijayakumar | H04L 63/08 726/17 |
| 2007/0165672 A1 | 7/2007 | Keels et al. | |
| 2007/0168486 A1 | 7/2007 | McCoy et al. | |
| 2007/0168517 A1 | 7/2007 | Weller et al. | |
| 2007/0226043 A1 | 9/2007 | Pietsch et al. | |
| 2008/0010676 A1 | 1/2008 | Dosa et al. | |
| 2008/0043742 A1 | 2/2008 | Pong et al. | |
| 2008/0091598 A1 | 4/2008 | Fauleau | |
| 2008/0117927 A1 | 5/2008 | Donhauser et al. | |
| 2008/0130891 A1 | 6/2008 | Sun et al. | |
| 2008/0168377 A1 | 7/2008 | Stallings et al. | |
| 2008/0191598 A1 | 8/2008 | Yang et al. | |
| 2008/0240121 A1 | 10/2008 | Xiong et al. | |
| 2008/0247386 A1 | 10/2008 | Wildfeuer | |
| 2008/0256166 A1 | 10/2008 | Branson et al. | |
| 2008/0260151 A1 | 10/2008 | Fluhrer et al. | |
| 2008/0301794 A1 | 12/2008 | Lee | |
| 2009/0003223 A1 | 1/2009 | McCallum et al. | |
| 2009/0092043 A1 | 4/2009 | Lapuh et al. | |
| 2009/0100165 A1 | 4/2009 | Wesley, Sr. et al. | |
| 2009/0106569 A1 | 4/2009 | Roh et al. | |
| 2009/0122990 A1 | 5/2009 | Gundavelli et al. | |
| 2009/0129386 A1 | 5/2009 | Rune | |
| 2009/0132621 A1 | 5/2009 | Jensen et al. | |
| 2009/0141734 A1 | 6/2009 | Brown et al. | |
| 2009/0144416 A1 | 6/2009 | Chatley et al. | |
| 2009/0144443 A1 | 6/2009 | Vasseur et al. | |
| 2009/0193428 A1 | 7/2009 | Dalberg et al. | |
| 2009/0199290 A1 * | 8/2009 | McCullough | H04L 63/0485 726/12 |
| 2009/0213754 A1 | 8/2009 | Melamed | |
| 2009/0217109 A1 | 8/2009 | Sekaran et al. | |
| 2009/0259798 A1 | 10/2009 | Wang et al. | |
| 2010/0017603 A1 | 1/2010 | Jones et al. | |
| 2010/0131616 A1 | 5/2010 | Walter et al. | |
| 2010/0250700 A1 | 9/2010 | O'Brien et al. | |
| 2010/0275017 A1 | 10/2010 | Iyer et al. | |
| 2010/0316052 A1 | 12/2010 | Petersen et al. | |
| 2010/0325309 A1 | 12/2010 | Cicic et al. | |
| 2011/0007652 A1 | 1/2011 | Bai | |
| 2011/0185006 A1 | 7/2011 | Raghav et al. | |
| 2011/0231917 A1 | 9/2011 | Chaturvedi et al. | |
| 2011/0247063 A1 | 10/2011 | Aabye et al. | |
| 2011/0268435 A1 | 11/2011 | Mizutani et al. | |
| 2011/0314473 A1 | 12/2011 | Yang et al. | |
| 2012/0005264 A1 | 1/2012 | McWhirter et al. | |
| 2012/0005307 A1 | 1/2012 | Das et al. | |
| 2012/0082057 A1 | 4/2012 | Welin et al. | |
| 2012/0105637 A1 | 5/2012 | Yousefi et al. | |
| 2012/0158882 A1 | 6/2012 | Oehme et al. | |
| 2012/0179904 A1 | 7/2012 | Dunn et al. | |
| 2012/0185559 A1 | 7/2012 | Wesley, Sr. et al. | |
| 2012/0188867 A1 | 7/2012 | Fiorone et al. | |
| 2012/0196646 A1 | 8/2012 | Crinon et al. | |
| 2012/0210417 A1 | 8/2012 | Shieh | |
| 2012/0210434 A1 | 8/2012 | Curtis et al. | |
| 2012/0270580 A1 | 10/2012 | Anisimov et al. | |
| 2012/0320916 A1 | 12/2012 | Sebastian | |
| 2013/0070751 A1 | 3/2013 | Atwal et al. | |
| 2013/0110787 A1 | 5/2013 | Garimella et al. | |
| 2013/0111038 A1 | 5/2013 | Girard | |
| 2013/0173900 A1 | 7/2013 | Liu | |
| 2013/0247167 A1 | 9/2013 | Paul et al. | |
| 2013/0259465 A1 | 10/2013 | Blair | |
| 2013/0275570 A1 | 10/2013 | Treuhaft et al. | |
| 2013/0283118 A1 | 10/2013 | Rayner | |
| 2013/0286835 A1 | 10/2013 | Plamondon et al. | |
| 2013/0287037 A1 | 10/2013 | Bush et al. | |
| 2013/0308471 A1 | 11/2013 | Krzanowski et al. | |
| 2013/0318233 A1 | 11/2013 | Biswas et al. | |
| 2013/0322255 A1 | 12/2013 | Dillon et al. | |
| 2013/0343180 A1 | 12/2013 | Kini et al. | |
| 2014/0020942 A1 | 1/2014 | Cho et al. | |
| 2014/0026179 A1 | 1/2014 | Devarajan et al. | |
| 2014/0071835 A1 | 3/2014 | Sun et al. | |
| 2014/0086253 A1 | 3/2014 | Yong | |
| 2014/0101036 A1 | 4/2014 | Phillips et al. | |
| 2014/0108665 A1 | 4/2014 | Arora et al. | |
| 2014/0149549 A1 | 5/2014 | Fu et al. | |
| 2014/0149552 A1 | 5/2014 | Carney et al. | |
| 2014/0169214 A1 | 6/2014 | Nakajima | |
| 2014/0181248 A1 | 6/2014 | Deutsch et al. | |
| 2014/0199962 A1 | 7/2014 | Mohammed et al. | |
| 2014/0210693 A1 | 7/2014 | Bhamidipati et al. | |
| 2014/0215059 A1 | 7/2014 | Astiz et al. | |

(56) References Cited

U.S. PATENT DOCUMENTS

| | | |
|---|---|---|
| 2014/0226456 A1 | 8/2014 | Khan et al. |
| 2014/0229945 A1 | 8/2014 | Barkai et al. |
| 2014/0237464 A1 | 8/2014 | Waterman et al. |
| 2014/0250066 A1 | 9/2014 | Calkowski et al. |
| 2014/0269712 A1 | 9/2014 | Kidambi |
| 2014/0269728 A1 | 9/2014 | Jalan et al. |
| 2014/0278543 A1 | 9/2014 | Kasdon |
| 2014/0280911 A1 | 9/2014 | Wood et al. |
| 2014/0289826 A1 | 9/2014 | Croome |
| 2014/0304728 A1 | 10/2014 | Wendling et al. |
| 2014/0310243 A1 | 10/2014 | McGee et al. |
| 2014/0324931 A1 | 10/2014 | Grube et al. |
| 2014/0331309 A1 | 11/2014 | Spiers et al. |
| 2014/0337459 A1 | 11/2014 | Kuang et al. |
| 2014/0341023 A1 | 11/2014 | Kim et al. |
| 2014/0351939 A1 | 11/2014 | Moore et al. |
| 2014/0359704 A1 | 12/2014 | Chen et al. |
| 2014/0362712 A1 | 12/2014 | Agarwal et al. |
| 2014/0366119 A1 | 12/2014 | Floyd et al. |
| 2014/0369230 A1 | 12/2014 | Nallur |
| 2015/0006596 A1 | 1/2015 | Fukui et al. |
| 2015/0056960 A1 | 2/2015 | Egner et al. |
| 2015/0063117 A1 | 3/2015 | DiBurro et al. |
| 2015/0063360 A1 | 3/2015 | Thakkar et al. |
| 2015/0086018 A1 | 3/2015 | Harjula et al. |
| 2015/0089582 A1 | 3/2015 | Dilley et al. |
| 2015/0095384 A1 | 4/2015 | Antony et al. |
| 2015/0121532 A1 | 4/2015 | Barel |
| 2015/0128246 A1 | 5/2015 | Feghali et al. |
| 2015/0207812 A1 | 7/2015 | Back et al. |
| 2015/0215303 A1* | 7/2015 | Shigapov ............ H04W 12/03 726/3 |
| 2015/0222633 A1 | 8/2015 | Smith et al. |
| 2015/0222637 A1 | 8/2015 | Hung et al. |
| 2015/0248434 A1 | 9/2015 | Avati et al. |
| 2015/0271104 A1 | 9/2015 | Chikkamath et al. |
| 2015/0281176 A1 | 10/2015 | Banfield |
| 2015/0326588 A1 | 11/2015 | Vissamsetty et al. |
| 2015/0341223 A1 | 11/2015 | Shen et al. |
| 2015/0363230 A1 | 12/2015 | Kasahara et al. |
| 2016/0006695 A1 | 1/2016 | Prodoehl et al. |
| 2016/0028586 A1 | 1/2016 | Blair et al. |
| 2016/0028770 A1 | 1/2016 | Raleigh et al. |
| 2016/0048938 A1 | 2/2016 | Jones et al. |
| 2016/0055323 A1 | 2/2016 | Stuntebeck et al. |
| 2016/0077745 A1 | 3/2016 | Patel et al. |
| 2016/0105530 A1 | 4/2016 | Shribman et al. |
| 2016/0117277 A1 | 4/2016 | Raindel et al. |
| 2016/0119279 A1 | 4/2016 | Maslak et al. |
| 2016/0127492 A1 | 5/2016 | Malwankar et al. |
| 2016/0134528 A1 | 5/2016 | Lin et al. |
| 2016/0134543 A1 | 5/2016 | Zhang et al. |
| 2016/0165463 A1 | 6/2016 | Zhang et al. |
| 2016/0224460 A1 | 8/2016 | Bryant et al. |
| 2016/0226755 A1 | 8/2016 | Hammam et al. |
| 2016/0255556 A1 | 9/2016 | Michel et al. |
| 2016/0261575 A1 | 9/2016 | Maldaner |
| 2016/0285977 A1 | 9/2016 | Ng et al. |
| 2016/0308762 A1 | 10/2016 | Teng et al. |
| 2016/0330736 A1 | 11/2016 | Polehn et al. |
| 2016/0337223 A1 | 11/2016 | Mackay |
| 2016/0337484 A1 | 11/2016 | Tola et al. |
| 2016/0352628 A1 | 12/2016 | Tirumaleswar et al. |
| 2016/0364158 A1 | 12/2016 | Narayanan et al. |
| 2016/0366233 A1 | 12/2016 | Le et al. |
| 2017/0063920 A1 | 3/2017 | Thomas et al. |
| 2017/0078922 A1 | 3/2017 | Raleigh et al. |
| 2017/0105142 A1 | 4/2017 | Hecht et al. |
| 2017/0201556 A1 | 7/2017 | Fox et al. |
| 2017/0230821 A1 | 8/2017 | Chong et al. |
| 2017/0344703 A1 | 11/2017 | Ansari et al. |
| 2018/0013583 A1 | 1/2018 | Rubenstein et al. |
| 2018/0024873 A1 | 1/2018 | Milliron et al. |
| 2018/0091417 A1 | 3/2018 | Oréet al. |
| 2018/0198756 A1 | 7/2018 | Dawes |
| 2020/0213153 A1 | 7/2020 | Rubenstein et al. |
| 2020/0382341 A1 | 12/2020 | Oréet al. |
| 2021/0044453 A1 | 2/2021 | Knutsen et al. |
| 2021/0342725 A1 | 11/2021 | Marsden et al. |
| 2021/0345188 A1 | 11/2021 | Shaheen |
| 2022/0158867 A1 | 5/2022 | Rubenstein et al. |
| 2023/0028646 A1* | 1/2023 | Nainar ................ H04L 12/4633 |
| 2023/0077361 A1* | 3/2023 | Sundararajan ...... H04L 12/4641 370/351 |
| 2024/0205049 A1 | 6/2024 | Rubenstein et al. |

FOREIGN PATENT DOCUMENTS

| | | |
|---|---|---|
| CN | 1392708 A | 1/2003 |
| CN | 1536824 A | 10/2004 |
| CN | 1754161 A | 3/2006 |
| CN | 1829177 A | 9/2006 |
| CN | 101079896 A | 11/2007 |
| CN | 101282448 A | 10/2008 |
| CN | 101478533 A | 7/2009 |
| CN | 101599888 A | 12/2009 |
| CN | 101765172 A | 6/2010 |
| CN | 101855865 A | 10/2010 |
| CN | 101969414 A | 2/2011 |
| CN | 102006646 A | 4/2011 |
| CN | 102209355 A | 10/2011 |
| CN | 102255794 A | 11/2011 |
| CN | 102340538 A | 2/2012 |
| CN | 102457539 A | 5/2012 |
| CN | 102687480 A | 9/2012 |
| CN | 102739434 A | 10/2012 |
| CN | 103118089 A | 5/2013 |
| CN | 103384992 A | 11/2013 |
| CN | 103828297 A | 5/2014 |
| CN | 104320472 A | 1/2015 |
| EP | 1498809 A1 | 1/2005 |
| EP | 1530761 A2 | 5/2005 |
| EP | 1635253 A2 | 3/2006 |
| EP | 2154834 A1 | 2/2010 |
| EP | 2357763 A1 | 8/2011 |
| JP | 6430499 B | 11/2018 |
| WO | 0233551 A1 | 4/2002 |
| WO | 03025709 A2 | 3/2003 |
| WO | 03041360 A2 | 5/2003 |
| WO | 03088047 A1 | 10/2003 |
| WO | 03090017 A2 | 10/2003 |
| WO | 03090018 A2 | 10/2003 |
| WO | 2005065035 A2 | 7/2005 |
| WO | 2006055838 A2 | 5/2006 |
| WO | 2008058088 A1 | 5/2008 |
| WO | 2008067323 A2 | 6/2008 |
| WO | 2010072030 A1 | 7/2010 |
| WO | 2012100087 A2 | 7/2012 |
| WO | 2013068530 A2 | 5/2013 |
| WO | 2013120069 A1 | 8/2013 |
| WO | 2013135753 A1 | 9/2013 |
| WO | 2015021343 A1 | 2/2015 |
| WO | 2016073361 A1 | 5/2016 |
| WO | 2016094291 A1 | 6/2016 |
| WO | 2016110785 A1 | 7/2016 |
| WO | 2016123293 A1 | 8/2016 |
| WO | 2016162748 A1 | 10/2016 |
| WO | 2016162749 A1 | 10/2016 |
| WO | 2016164612 A1 | 10/2016 |
| WO | 2016198961 A2 | 12/2016 |
| WO | 2018049649 A1 | 3/2018 |

OTHER PUBLICATIONS

"Open Radio Equipment Interface (ORI); ORI Interface Specification; Part 2: Control and Management (Release 4)," Group Specification, European Telecommunications Standards Institute (ETSI), 650, Route des Lucioles, F-06921 Sophia-Antipolis, France, vol. ORI, No. V4.1.1, Oct. 1, 2014 (185 pages). (Previously submitted in related U.S. Appl. No. 15/546,247.).

"Operations and Quality of Service Telegraph Services, Global Virtual Network Service," ITU-T Standard, International Telecom-

(56) References Cited

OTHER PUBLICATIONS munication Union, Geneva, Switzerland, No. F. 16, Feb. 21, 1995, pp. 1-23, (23 pages). (Previously submitted in related U.S. Appl. No. 15/546,247.).

Baumgartner, A., et al., "Mobile core network virtualization: A model for combined virtual core network function placement and topology optimization," Proceedings of the 2015 1st IEEE Conference on Network Softwarization (NetSoft), London, UK, 2015, pp. 1-9, doi: 10.1109/NETSOFT, 2015, (9 pages). (Previously submitted in related U.S. Appl. No. 16/815,864.).

Chen, Y., et al., "Resilient Virtual Network Service Provision in Network Virtualization Environments," 2010 IEEE 16th International Conference on Parallel and Distributed Systems, Shanghai, China, 2010, pp. 51-58, doi: 10.1109/ICPADS.2010.26., 2010, (8 pages). (Previously submitted in related U.S. Appl. No. 16/815,864.).

Chowdhury, N.M.M.K., et al., "Virtual Network Embedding with Coordinated Node and Link Mapping," IEEE Communications Society Subject Matter Experts for Publication in the IEEE INFOCOM 2009, pp. 783-791, (Year: 2009), (9 pages). (Previously submitted in related U.S. Appl. No. 16/815,864.).

Definition of "backbone" in Microsoft Computer Dictionary, 2002, Fifth Edition, Microsoft Press (2 pages). (Previously submitted in related U.S. Appl. No. 16/815,864.).

Definition of "server" in Microsoft Computer Dictionary, 2002, Fifth Edition, Microsoft Press (3 pages). (Previously submitted in related U.S. Appl. No. 16/815,864.).

Examination Report, dated Aug. 2, 2018, for European Patent Application No. 16734942.2, (8 pages). (Previously submitted in related U.S. Appl. No. 16/815,864.).

Examination Report, dated Jul. 20, 2017, for Chinese Application No. 20168004969.3, (1 page). (Previously submitted in related U.S. Appl. No. 16/815,864.).

Examination Report, dated Mar. 3, 2020, for Chinese Application No. 201680020937.2, (9 pages). (Previously submitted in related U.S. Appl. No. 16/815,864.).

Examination Report, dated Mar. 5, 2020, for Chinese Application No. 201580066318.2, (10 pages). (Previously submitted in related U.S. Appl. No. 16/815,864.).

Examination Report, dated Oct. 19, 2018, for European Patent Application No. 16727220.2, (11 pages). (Previously submitted in related U.S. Appl. No. 16/815,864.).

Extended European Search Report, dated Sep. 7, 2018, for European Patent Application No. 16744078.3, (7 pages). (Previously submitted in related U.S. Appl. No. 16/815,864.).

Extended European Search Report, dated Aug. 2, 2018, for European Patent Application No. 15866542.2, (8 pages). (Previously submitted in related U.S. Appl. No. 16/815,864.).

Extended European Search Report, dated Sep. 7, 2018, for European Patent Application No. 16777297.9, (4 pages). (Previously submitted in related U.S. Appl. No. 16/815,864.).

Extended Search Report, dated Nov. 29, 2018, for European Patent Application No. 16806960.7, (10 pages). (Previously submitted in related U.S. Appl. No. 16/815,864.).

Figueiredo, R.J., et al., "Social VPNs: Integrating Overlay and Social Networks for Seamless P2P Networking," 2008 IEEE 17th Workshop on Enabling Technologies: Infrastructure for Collaborative Enterprises, Rome, Italy, 2008, pp. 93-98, doi: 10.1109/WETICE.2008.43, 2008, (6 pages). (Previously submitted in related U.S. Appl. No. 16/815,864.).

First Office Action dated Jun. 3, 2020 for Chinese Patent Application No. 201680066545.X (11 pages). (Previously submitted in related U.S. Appl. No. 16/815,864.).

Gong, L. et al., "Revenue-Driven Virtual Network Embedding Based on Global Resource Information," Globecom 2013, Next Generation Networking Symposium, pp. 2294-2299, Year: 2013, (6 pages). (Previously submitted in related U.S. Appl. No. 16/815,864.).

Haeri, S. et al., "Global Resource Capacity Algorithm with Path Splitting for Virtual Network Embedding," 2016 IEEE, pp. 666-669, Year: 2016, (4 pages). (Previously submitted in related U.S. Appl. No. 16/815,864.).

International Search Report and Written Opinion mailed Apr. 8, 2016 for International Application No. PCT/US2016/015278 (9 pages). (Previously submitted in related U.S. Appl. No. 16/815,864.).

International Search Report and Written Opinion mailed Aug. 10, 2016 for International Application No. PCT/IB2016/000531 (20 pages). (Previously submitted in related U.S. Appl. No. 16/815,864.).

International Search Report and Written Opinion mailed Aug. 23, 2017 for International Application No. PCT/IB2017/000580 (6 pages). (Previously submitted in related U.S. Appl. No. 16/815,864.).

International Search Report and Written Opinion mailed Dec. 28, 2016 for International Application No. PCT/IB2016/001161 (7 pages). (Previously submitted in related U.S. Appl. No. 16/815,864.).

International Search Report and Written Opinion mailed Feb. 12, 2016 for International Application No. PCT/US2015/064242 (9 pages). (Previously submitted in related U.S. Appl. No. 16/815,864.).

International Search Report and Written Opinion mailed Jul. 28, 2017 for International Application No. PCT/IB2017/000557 (6 pages). (Previously submitted in related U.S. Appl. No. 16/815,864.).

International Search Report and Written Opinion mailed Jul. 7, 2016 for International Application No. PCT/US2016/026489 (7 pages). (Previously submitted in related U.S. Appl. No. 16/815,864.).

International Search Report and Written Opinion mailed Jun. 7, 2016 for International Application No. PCT/IB2016/000110 (8 pages). (Previously submitted in related U.S. Appl. No. 16/815,864.).

International Search Report and Written Opinion mailed May 11, 2017 for International Application No. PCT/IB2016/001867 (13 pages). (Previously submitted in related U.S. Appl. No. 16/815,864.).

International Search Report and Written Opinion mailed Sep. 1, 2017 for International Application No. PCT/IB2017/000613 (7 pages). (Previously submitted in related U.S. Appl. No. 16/815,864.).

International Search Report and Written Opinion mailed Sep. 23, 2016 for International Application No. PCT/IB2016/000528 (11 pages). (Previously submitted in related U.S. Appl. No. 16/815,864.).

Office Action dated Mar. 12, 2020 for Chinese Patent Application No. 201680032657.3 (5 pages). (Previously submitted in related U.S. Appl. No. 16/815,864.).

Office Action dated Mar. 13, 2020 received in related Chinese Patent Application No. 201680021239.4 (9 pages). (Previously submitted in related U.S. Appl. No. 16/815,864.).

Office Action dated May 7, 2020 for Chinese Patent Application No. 201680020878.9 (7 pages). (Previously submitted in related U.S. Appl. No. 16/815,864.).

Supplementary European Search Report dated Dec. 11, 2019 for European Patent Application No. 17788882.3 (8 pages). (Previously submitted in related U.S. Appl. No. 17/589,753.).

Supplementary Partial European Search Report dated May 20, 2019 for European Patent Application No. 16872483.9 (8 pages). (Previously submitted in related U.S. Appl. No. 16/815,864.).

Szeto, W. et al., "A multi-commodity flow based approach to virtual network resource allocation," GLOBECOM' 03. IEEE Global Telecommunications Conference (IEEE Cat. No. 03CH37489), San Francisco, CA, USA, 2003, pp. 3004-3008, vol. 6, doi: 10.1109/GLOCOM.2003.1258787, 2003 (5 pages). (Previously submitted in related U.S. Appl. No. 16/815,864.).

Non-Final Office Action dated Oct. 6, 2022 issued in related U.S. Appl. No. 17/589,753, 10 pages.

Cisco Systems, Inc.'s Petition for Inter Partes Review of U.S. Pat. No. 10,630,505 dated Feb. 26, 2024, Paper 2 in IPR2024-00497, 82 pages.

(56) References Cited

OTHER PUBLICATIONS

Umbra Technologies, Ltd.'s Preliminary Response dated Jun. 27, 2024, Paper 6 in IPR2024-00497, 19 pages.
Board's Decision Granting Institution of Inter Partes Review dated Sep. 5, 2024, Paper 9 in IPR2024-00497, 31 pages.
Cisco Systems, Inc.'s Request for Director Review of Panel Decision Granting Institution dated Sep. 19, 2024, Paper 13 in IPR2024-00497, 13 pages.
Board's Order Denying Request for Director Review dated Dec. 3, 2024, Paper 20 in IPR2024-00497, 3 pages.
Umbra Technologies, Ltd.'s Response dated Dec. 11, 2024, Paper 21 in IPR2024-00497, 25 pages.
Declaration of Dr. A.L. Narasimha Reddy dated Feb. 25, 2024, Ex. 1003 in IPR2024-00497, 105 pages.
Mockapetris, P., Domain Names—Concepts and Facilities, ISI, Nov. 1987, Ex. 1008 in IPR2024-00497, 55 pages.
Peterson, L. & Davie, B., Computer Networks—A Systems Approach, Second Edition, 2000, Ex. 1011 in IPR2024-00497, 61 pages.
Deposition Transcript of Dr. A.L. Narasimha Reddy dated Nov. 13, 2024, Ex. 2001 in IPR2024-00497, 28 pages.
Declaration of Dr. Micah Beck dated Dec. 11, 2024, Ex. 2002 in IPR2024-00497, 13 pages.

* cited by examiner

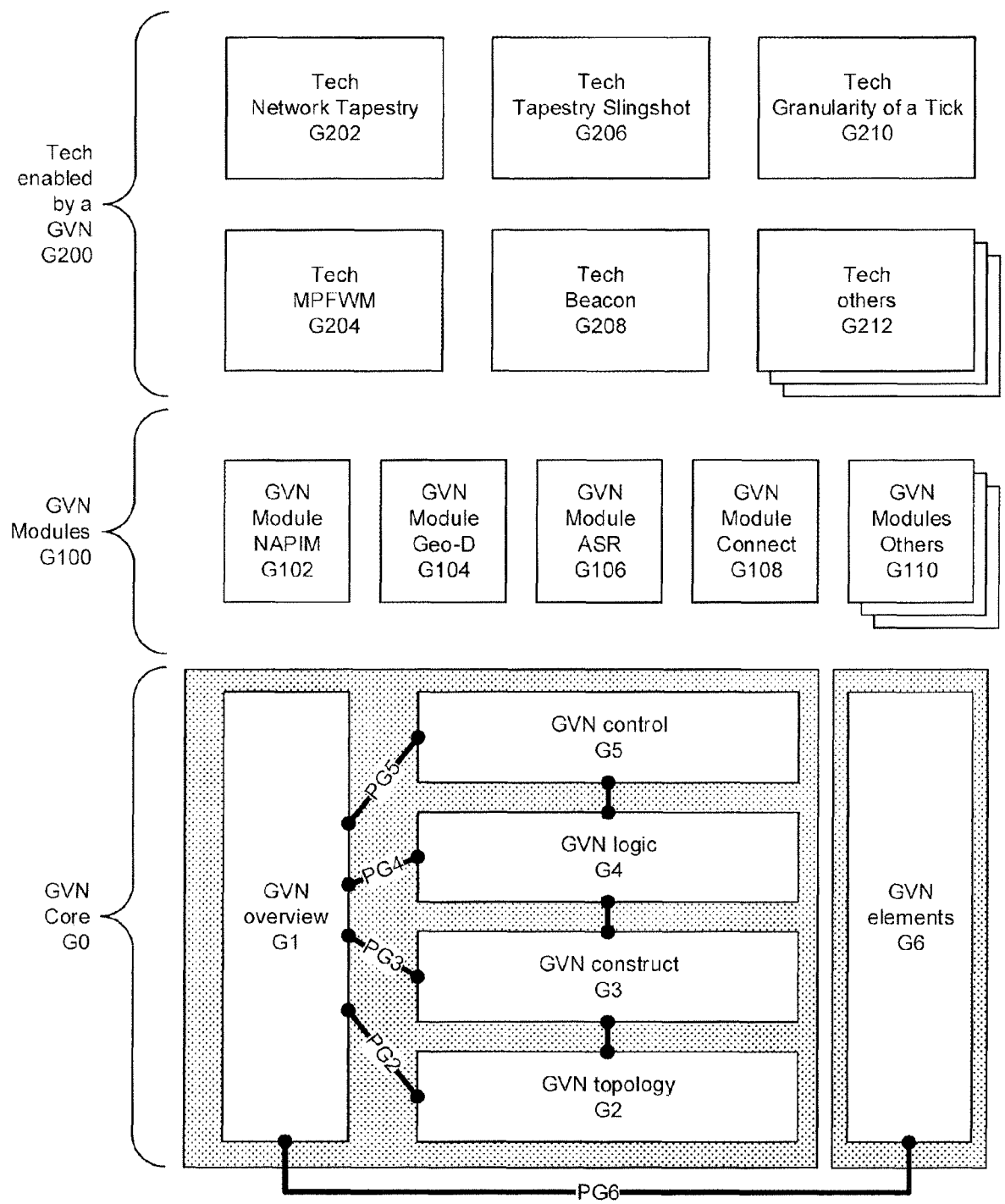
Figure # 1

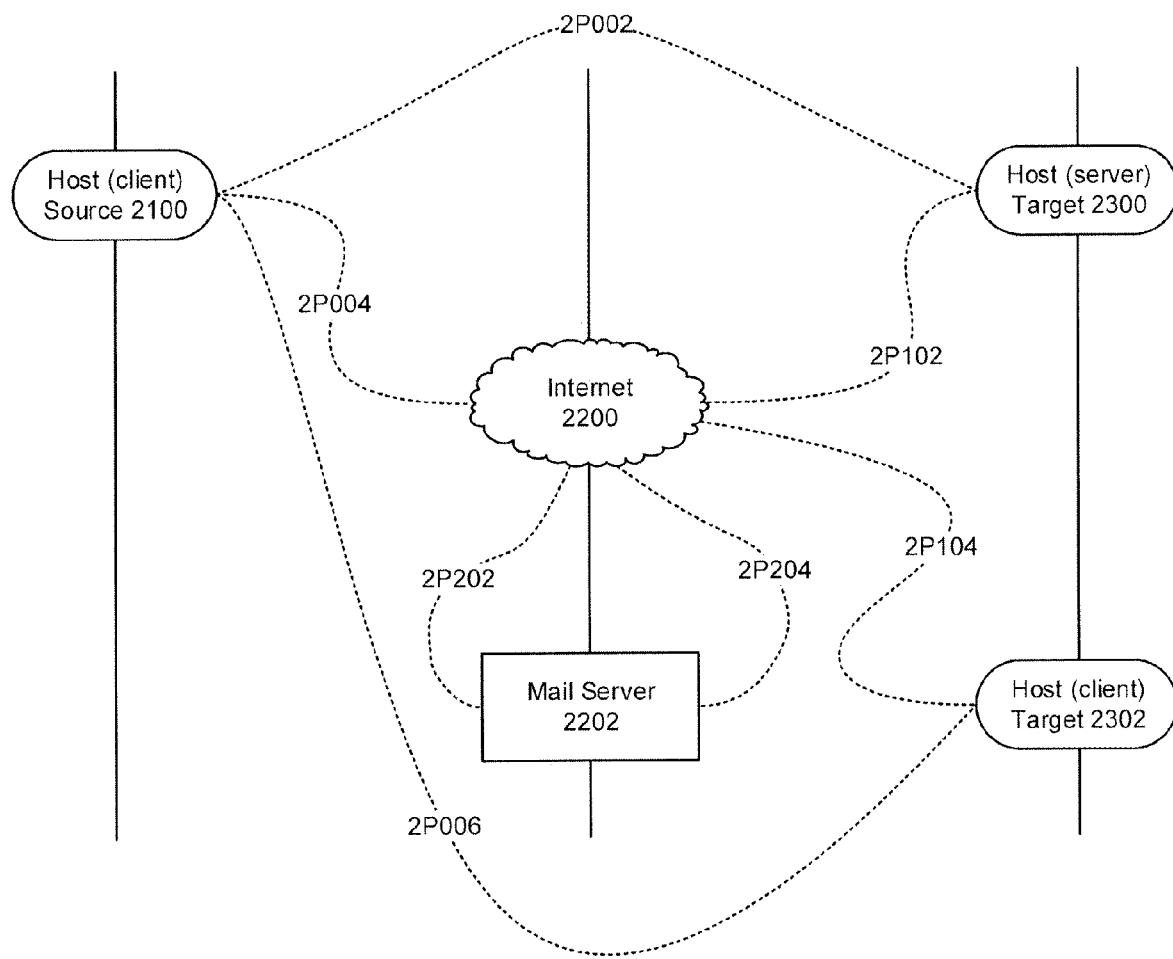
Figure # 2

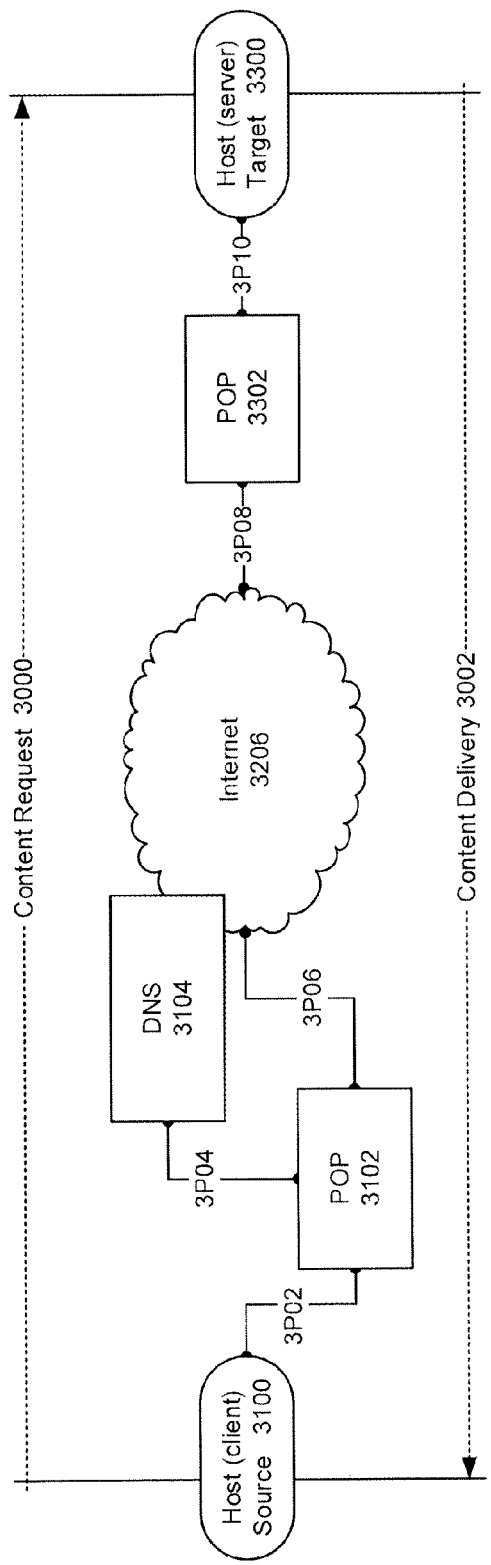
Figure # 3

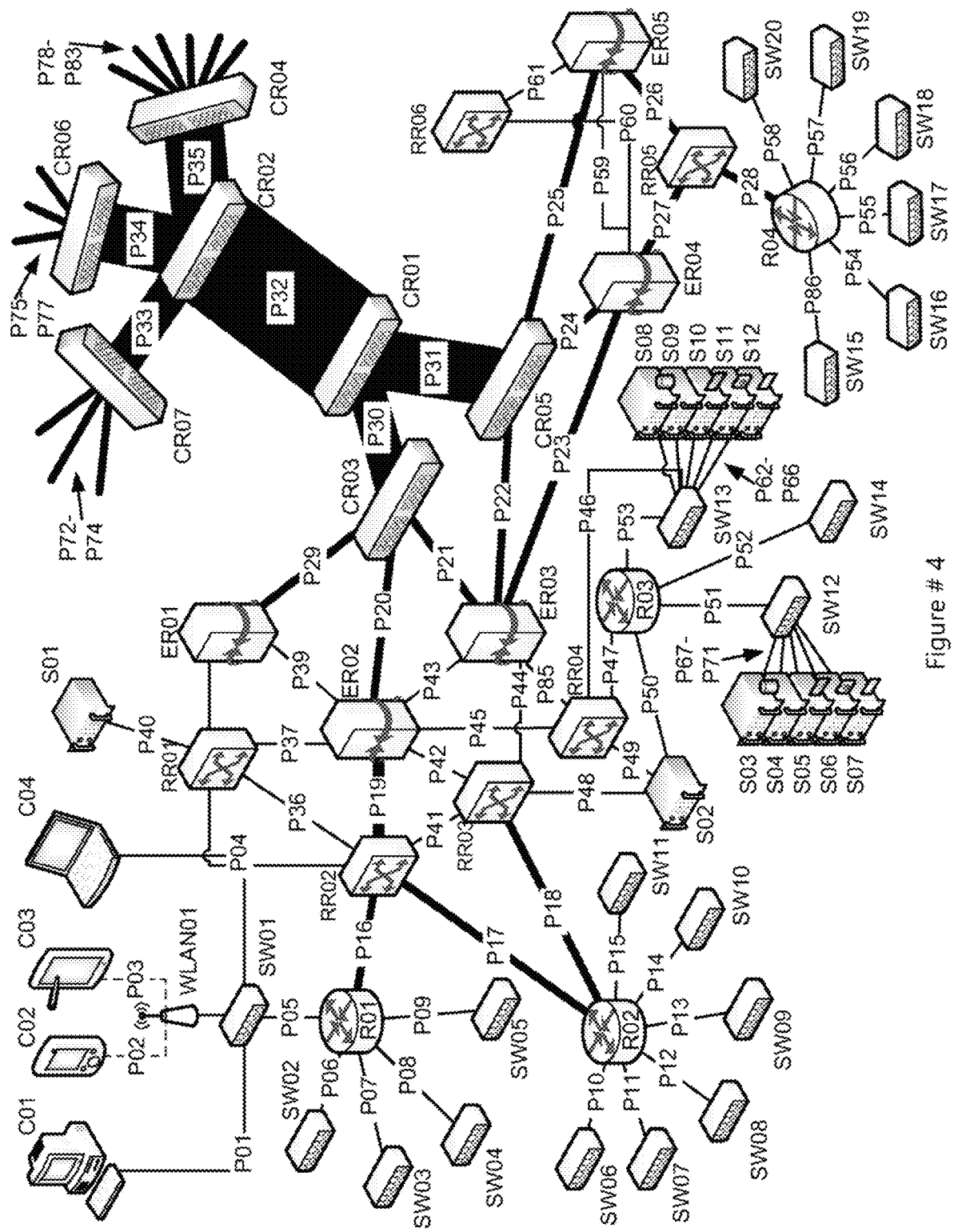
Figure # 4

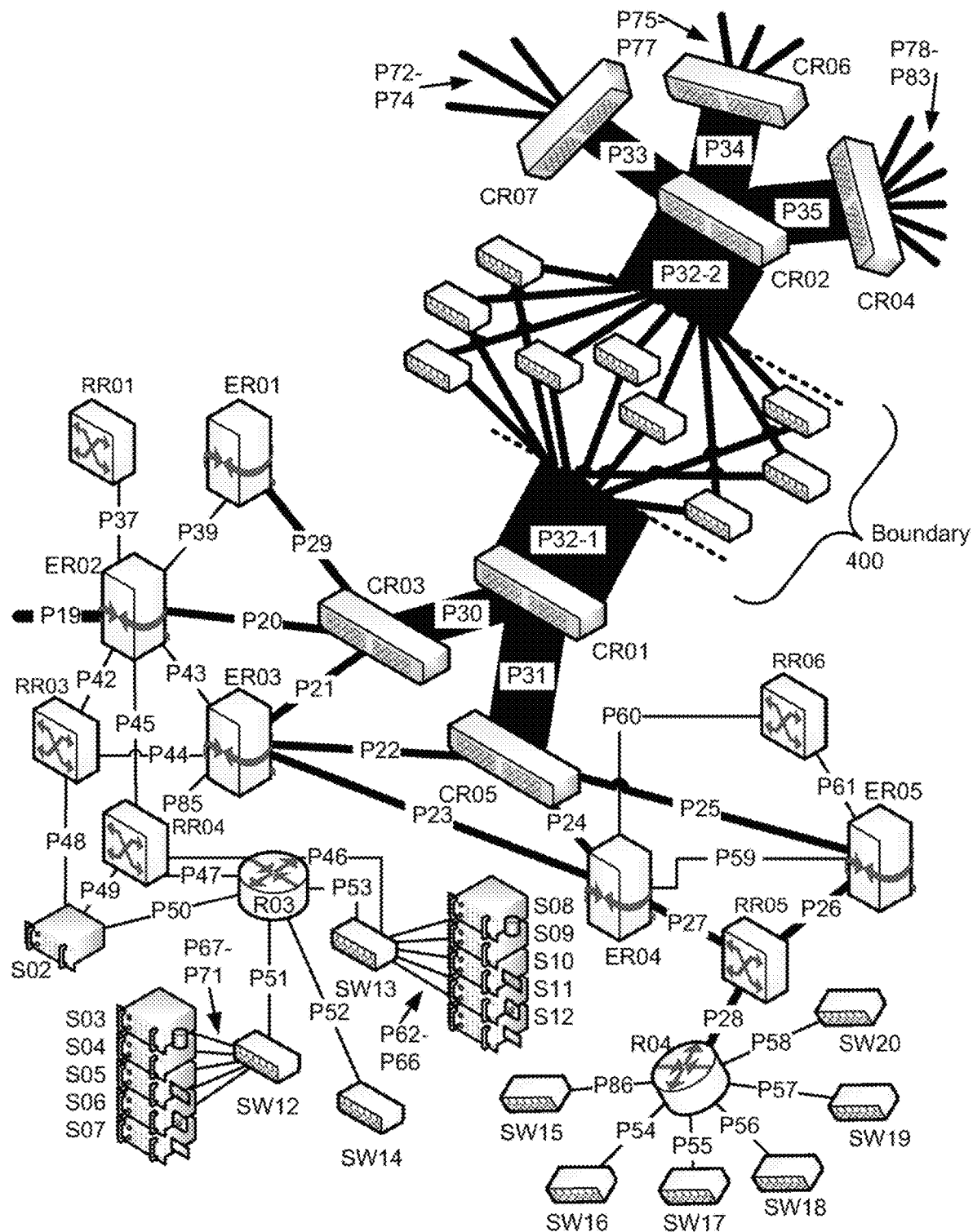
Figure # 5

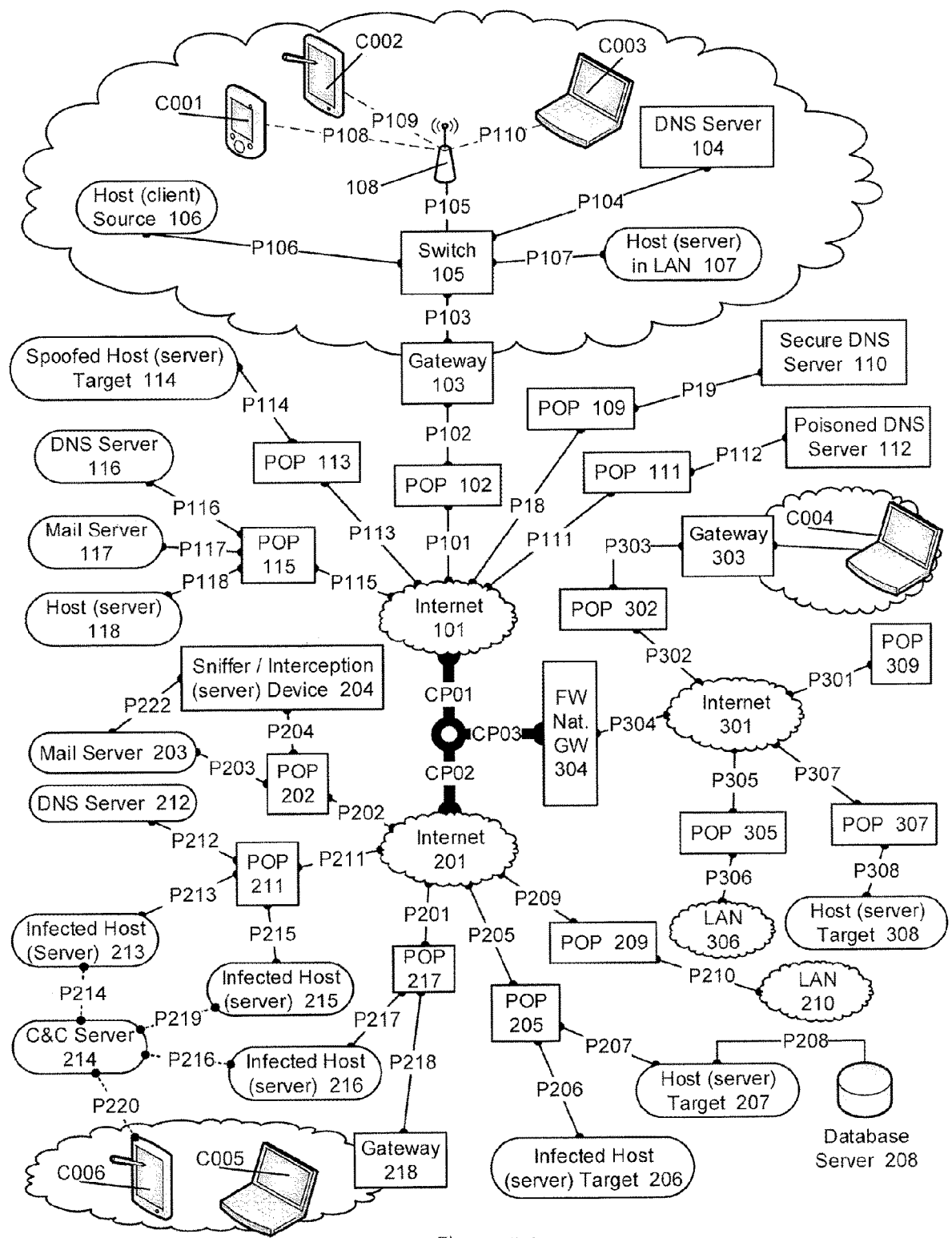
Figure # 6

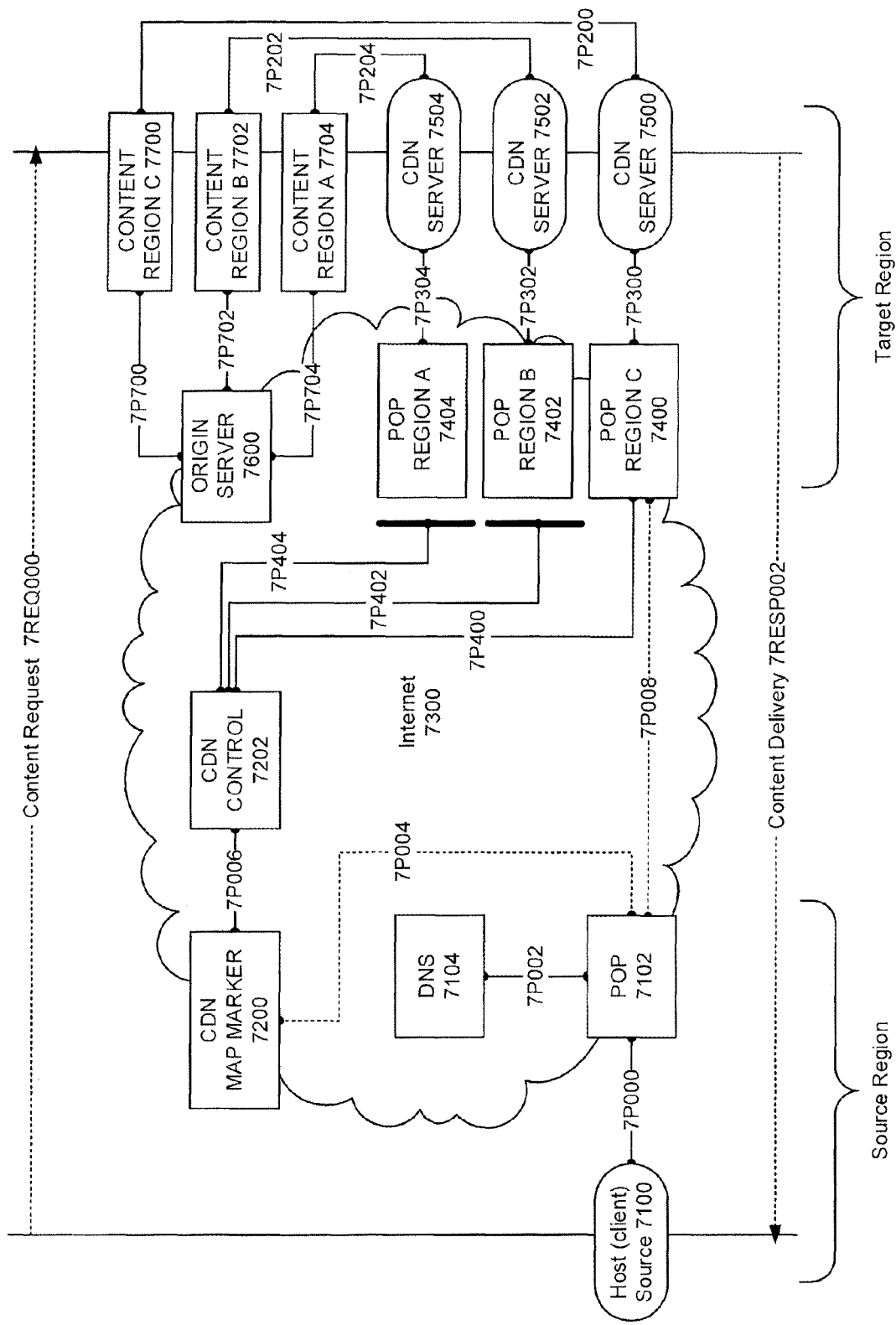
Figure # 7

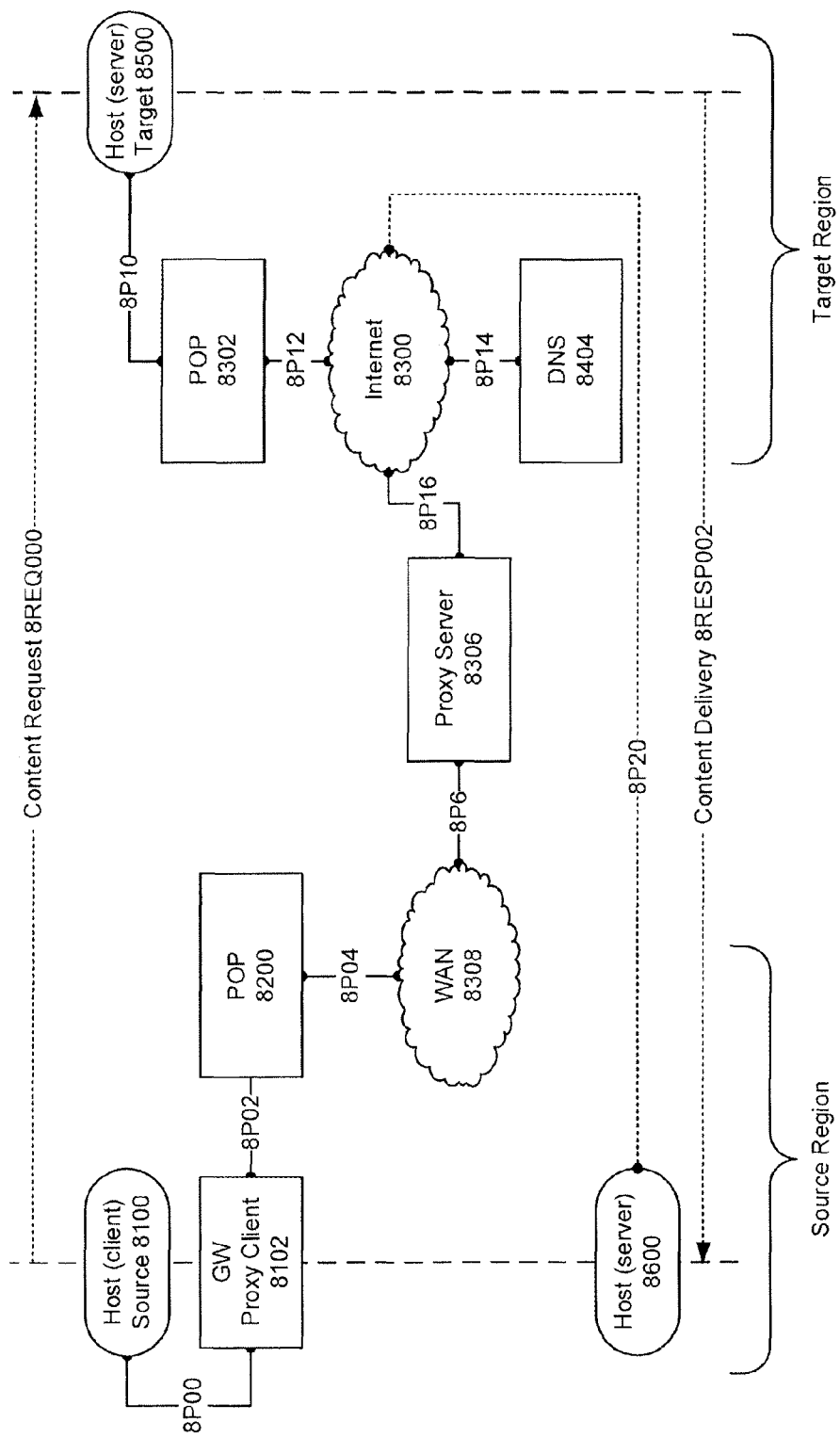
Figure # 8

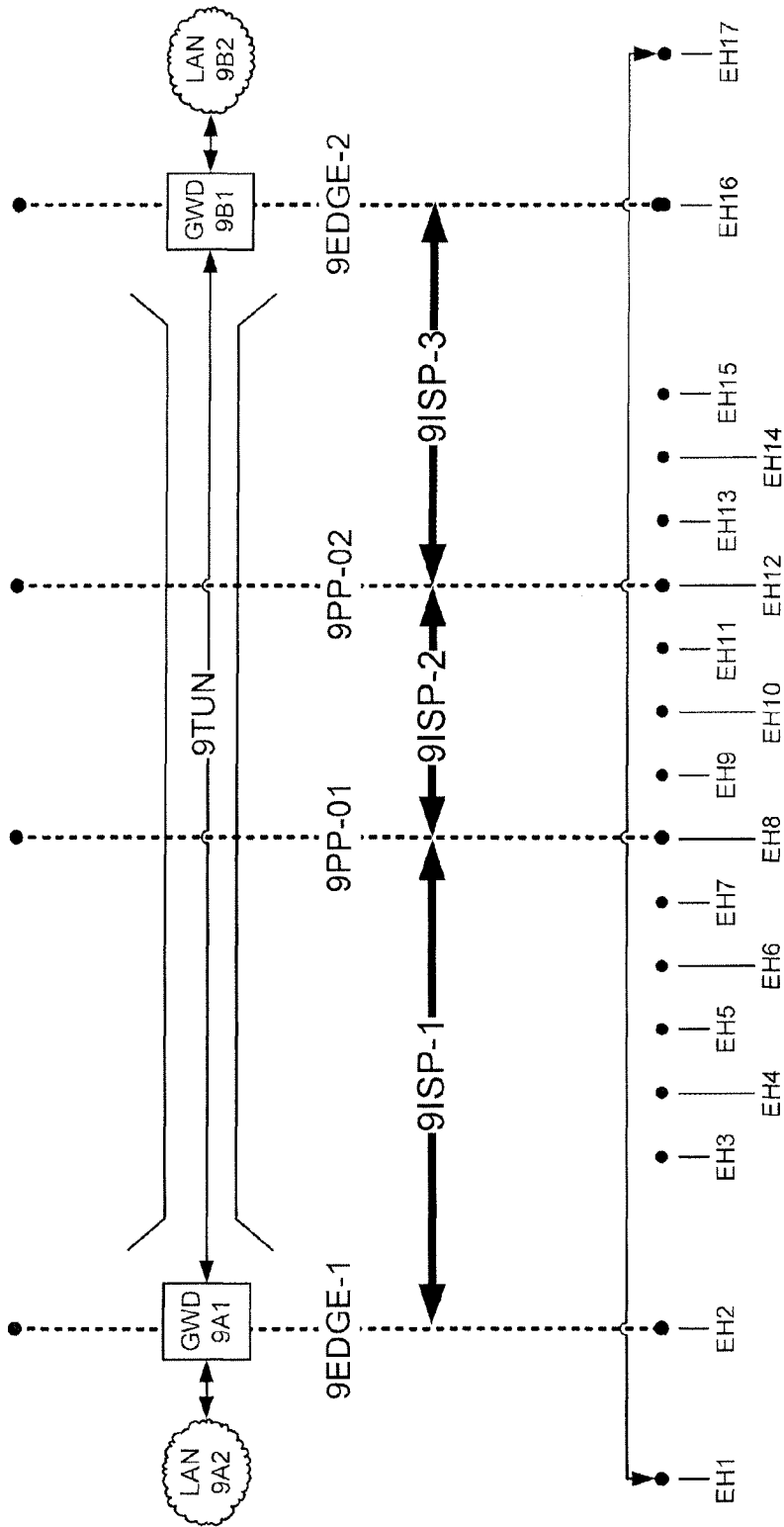
Figure # 9

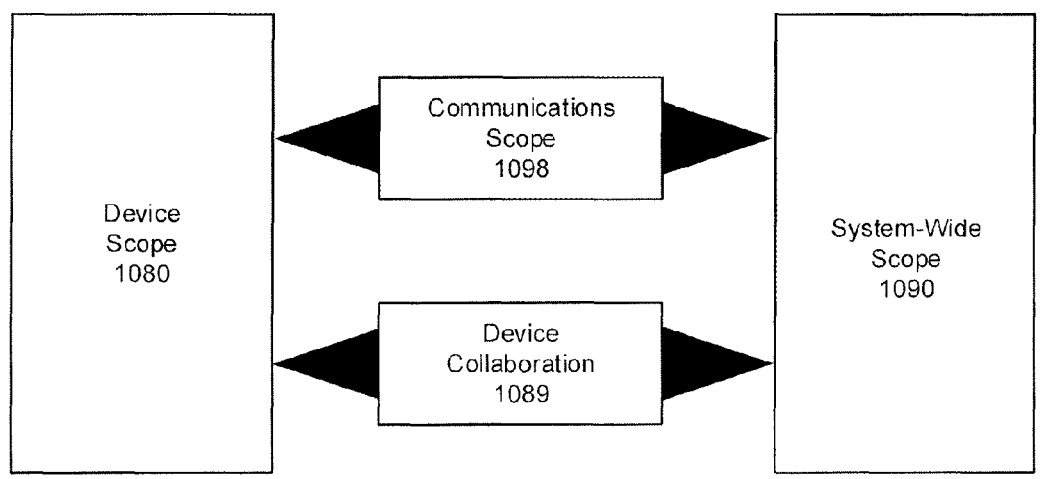
Figure # 10

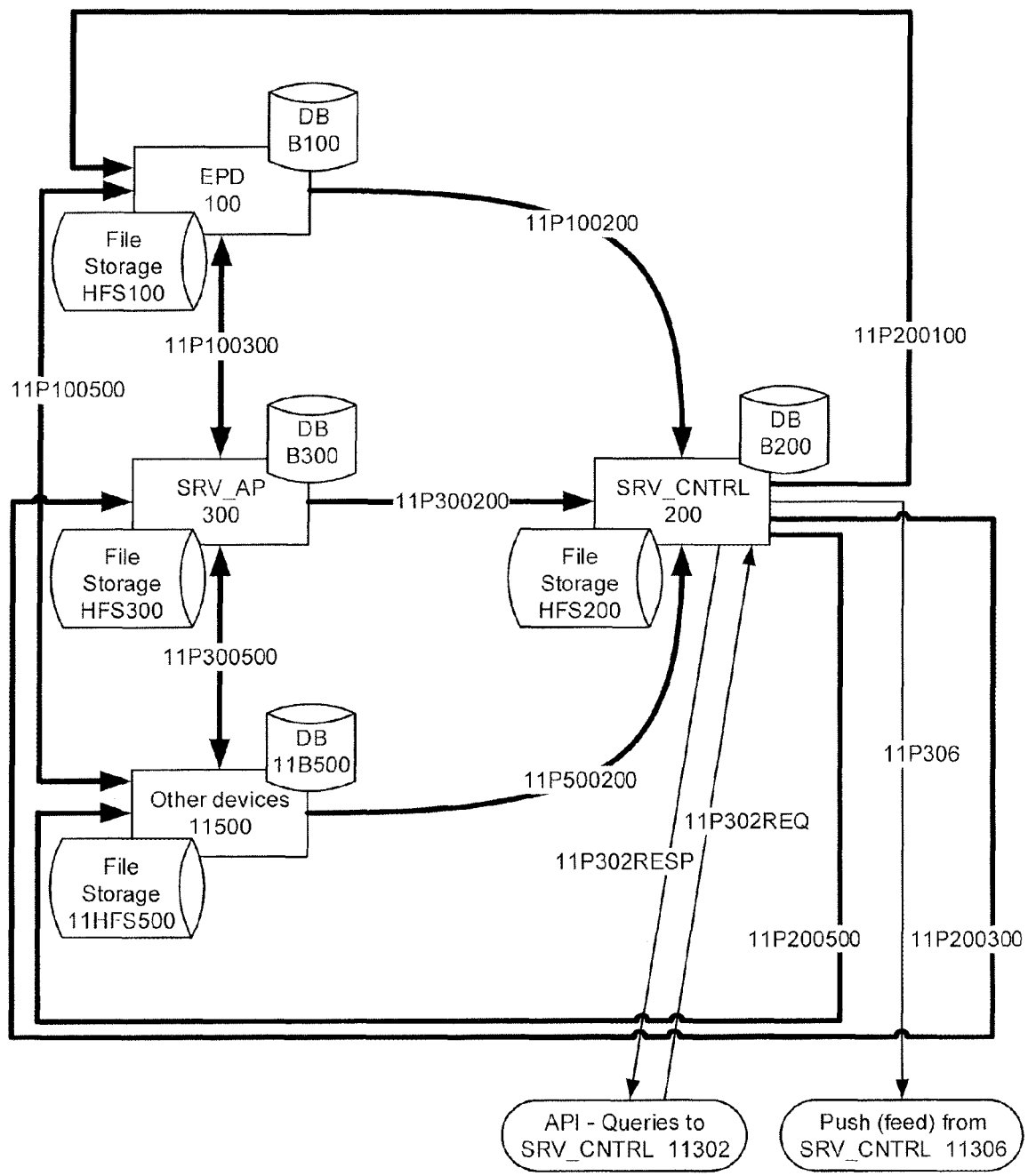
Figure # 11

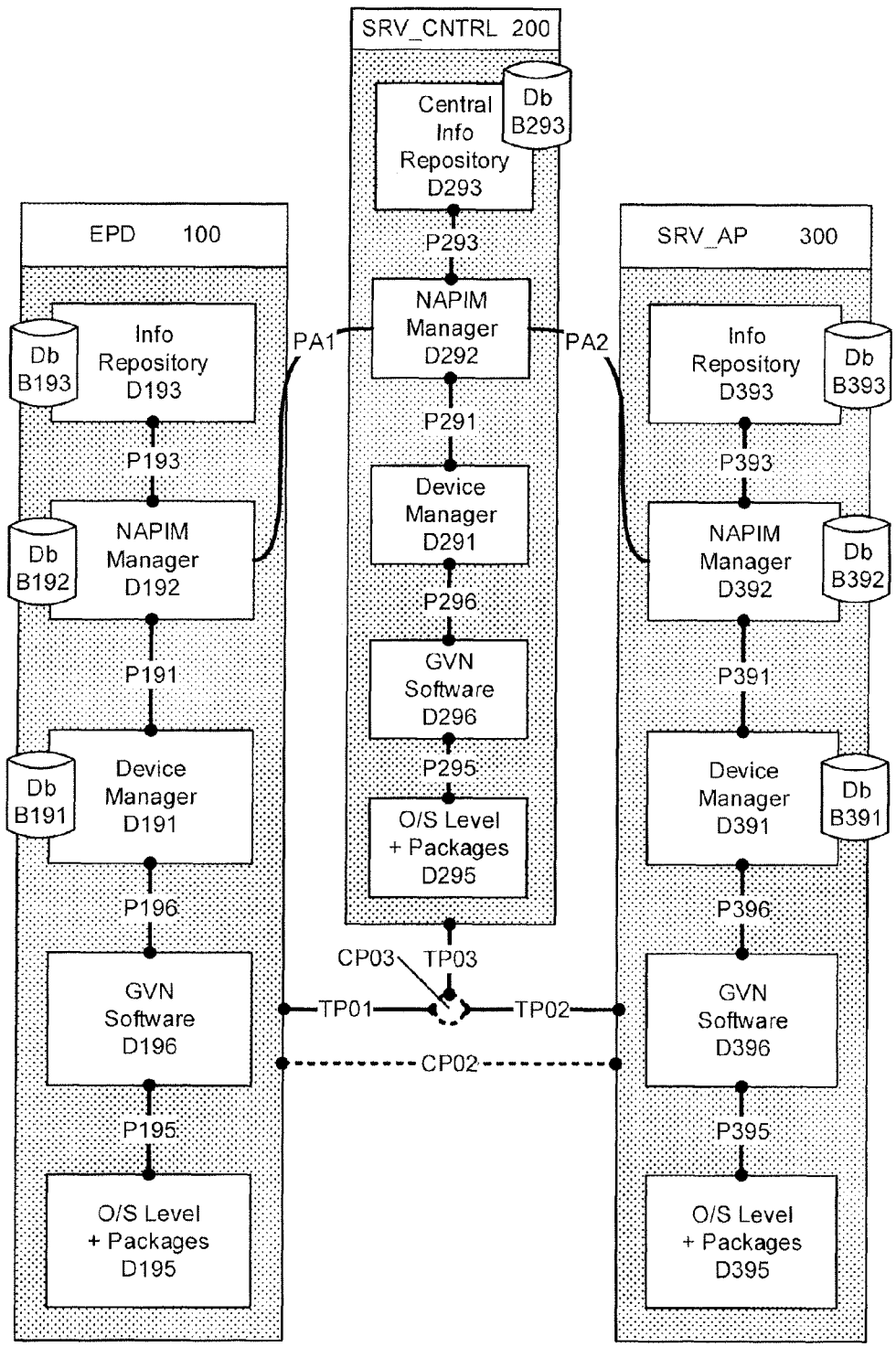
Figure # 12

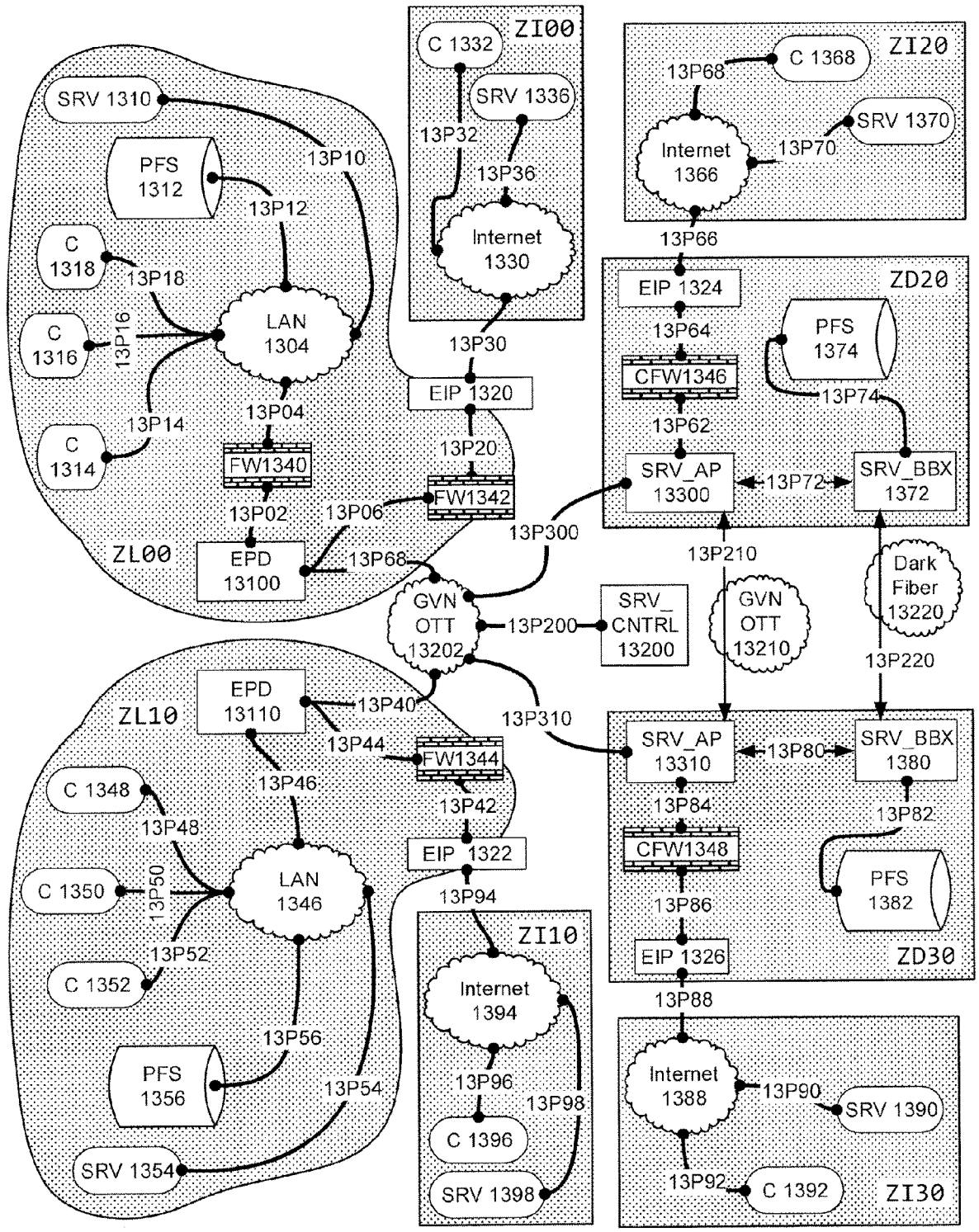
Figure # 13

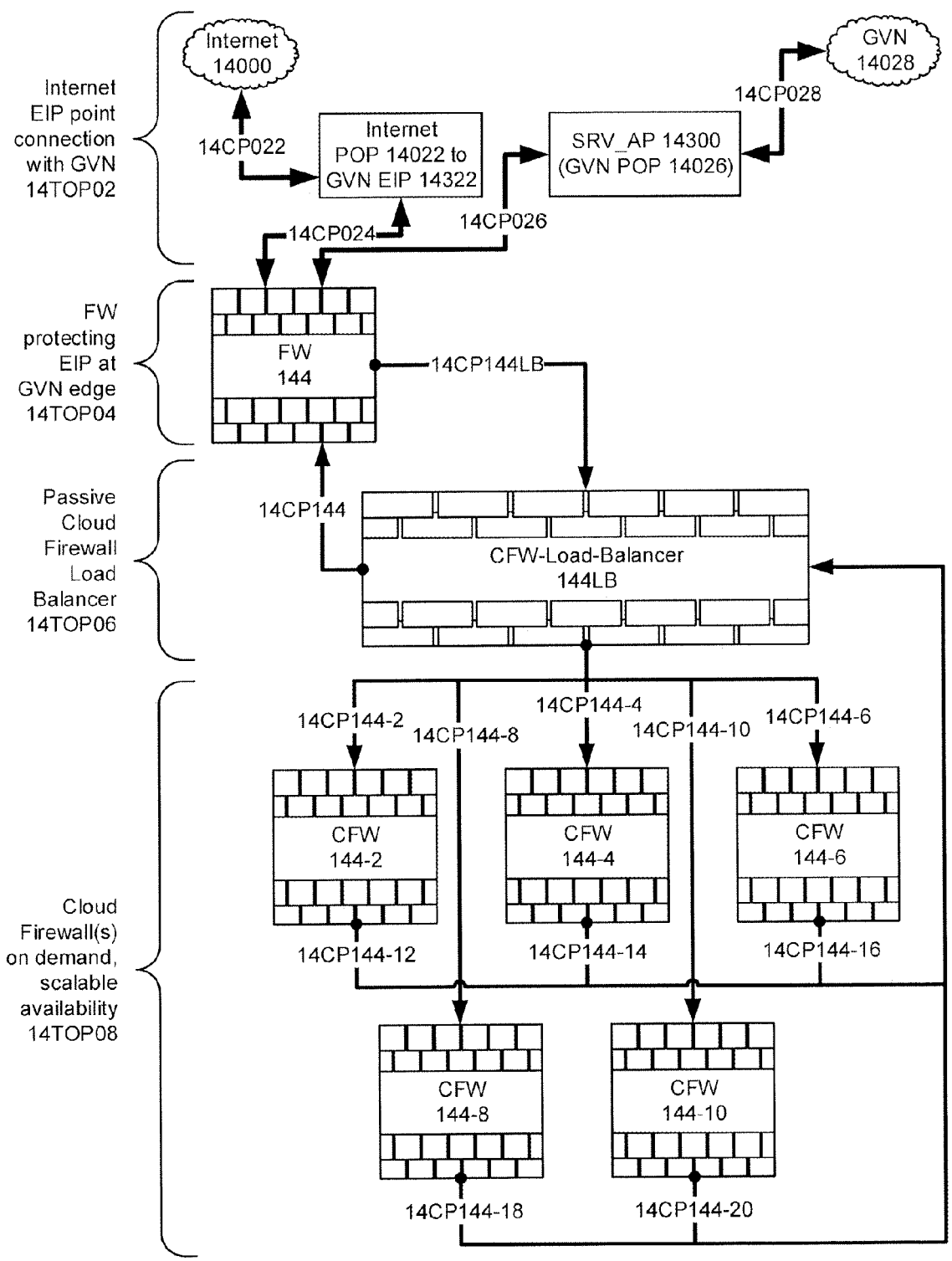
Figure # 14

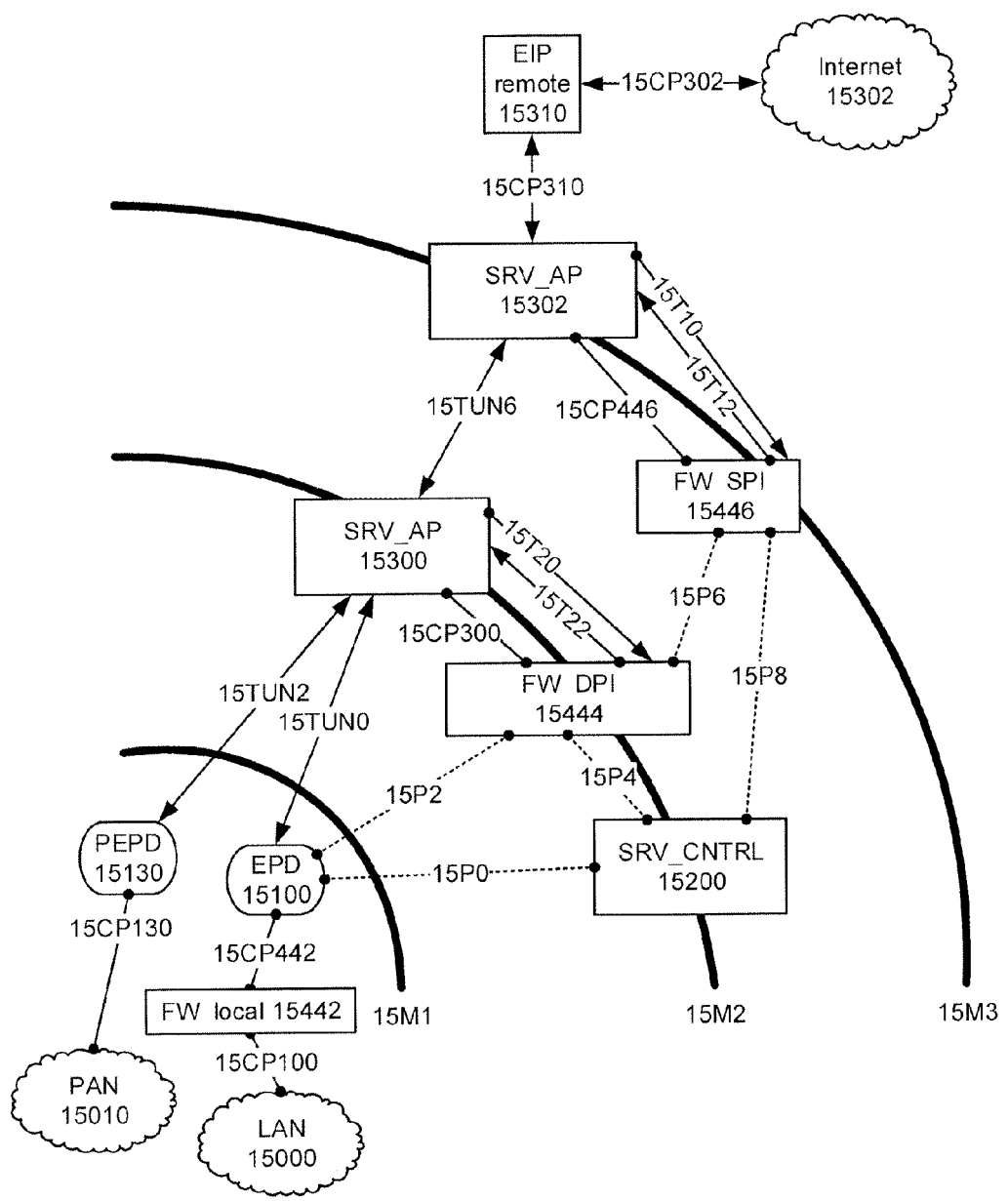
Figure # 15

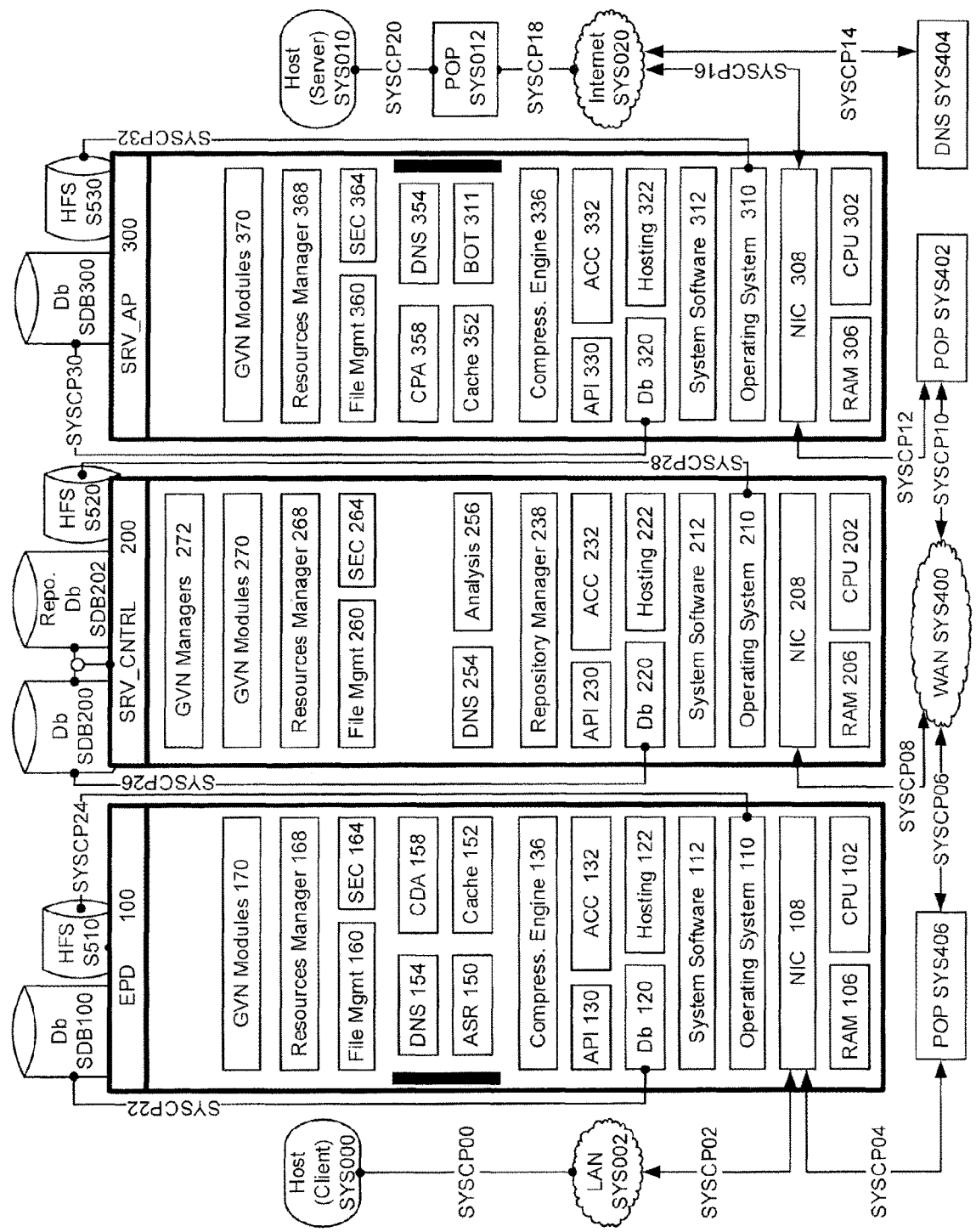

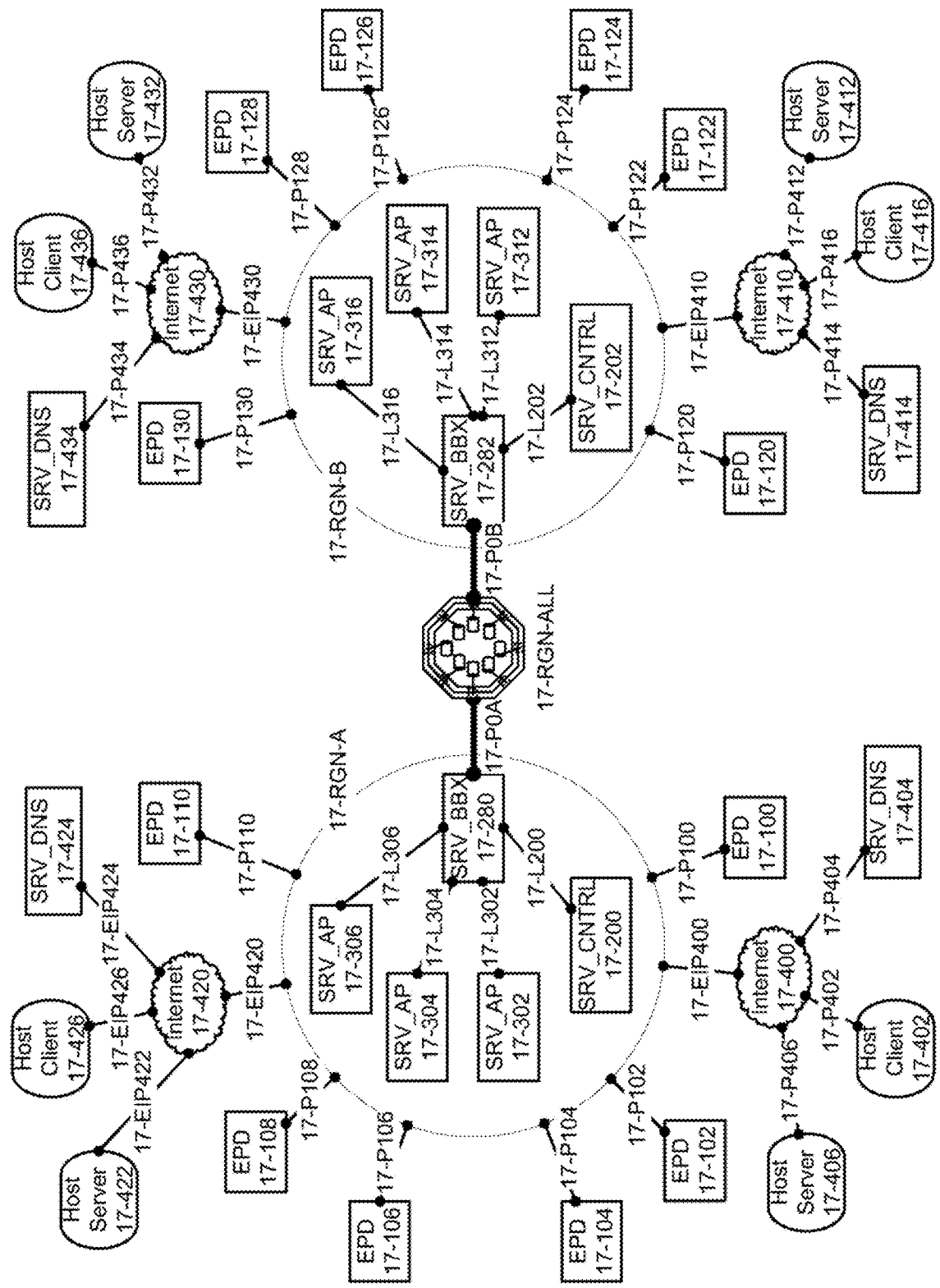
Figure # 17

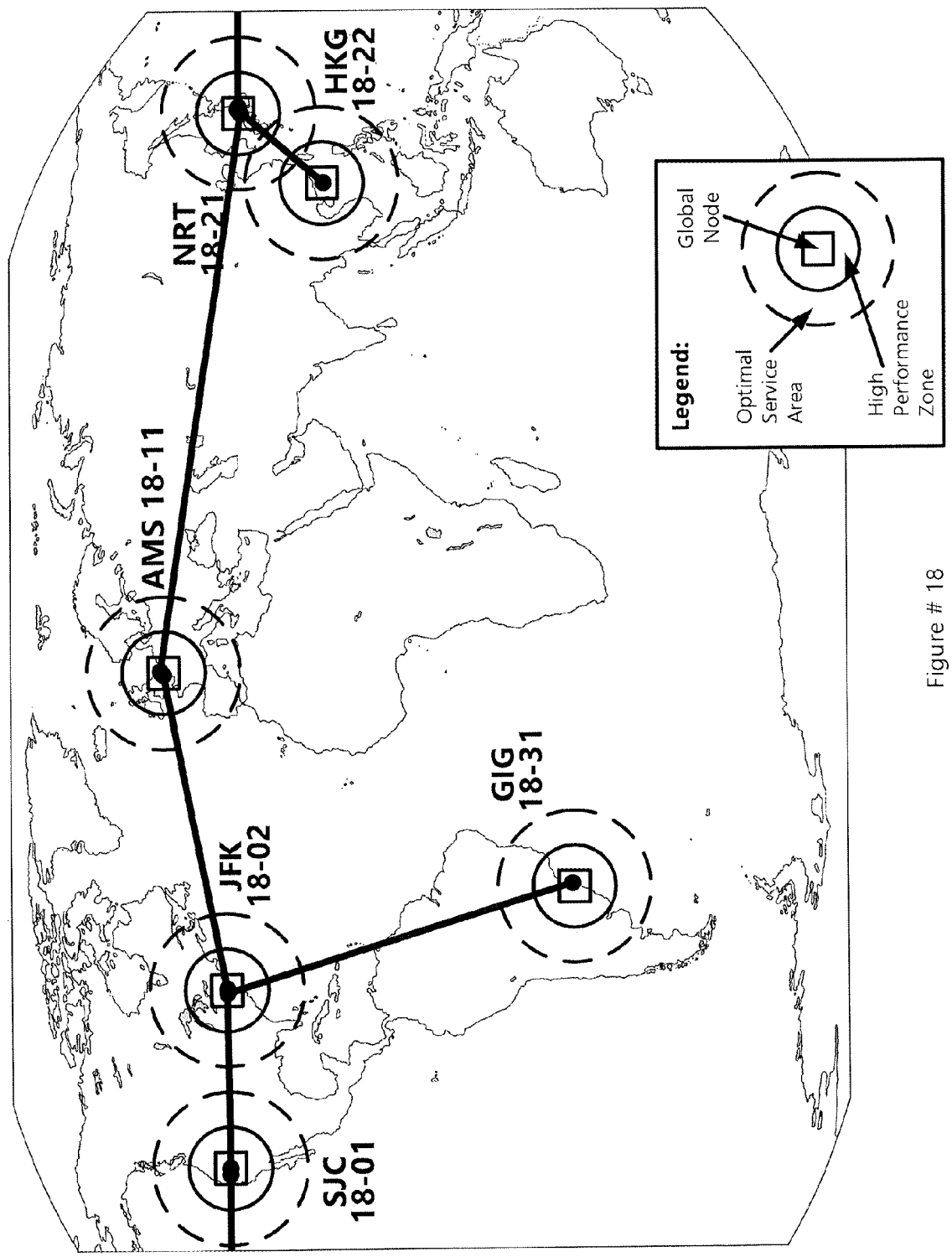
Figure # 18

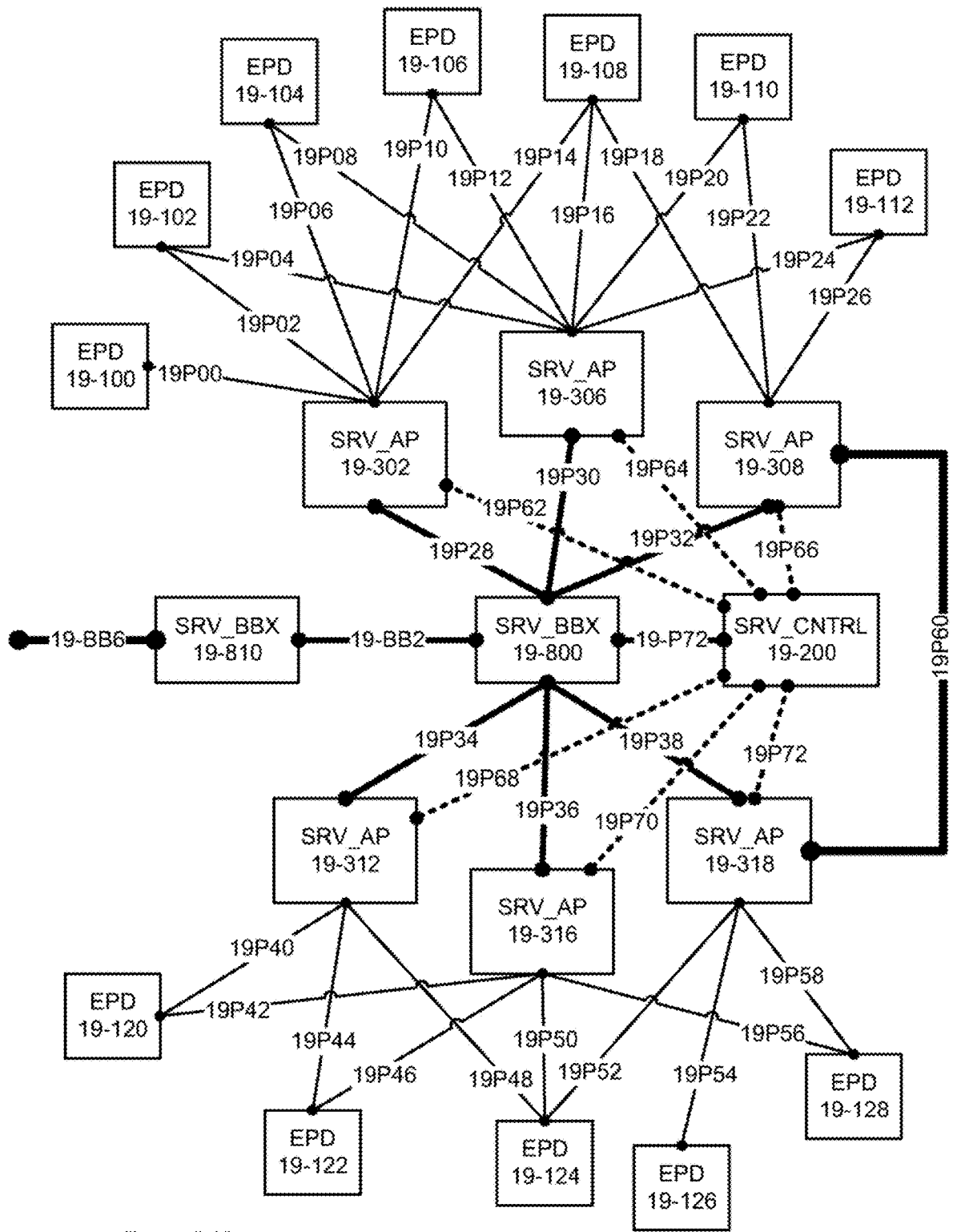
Figure # 19

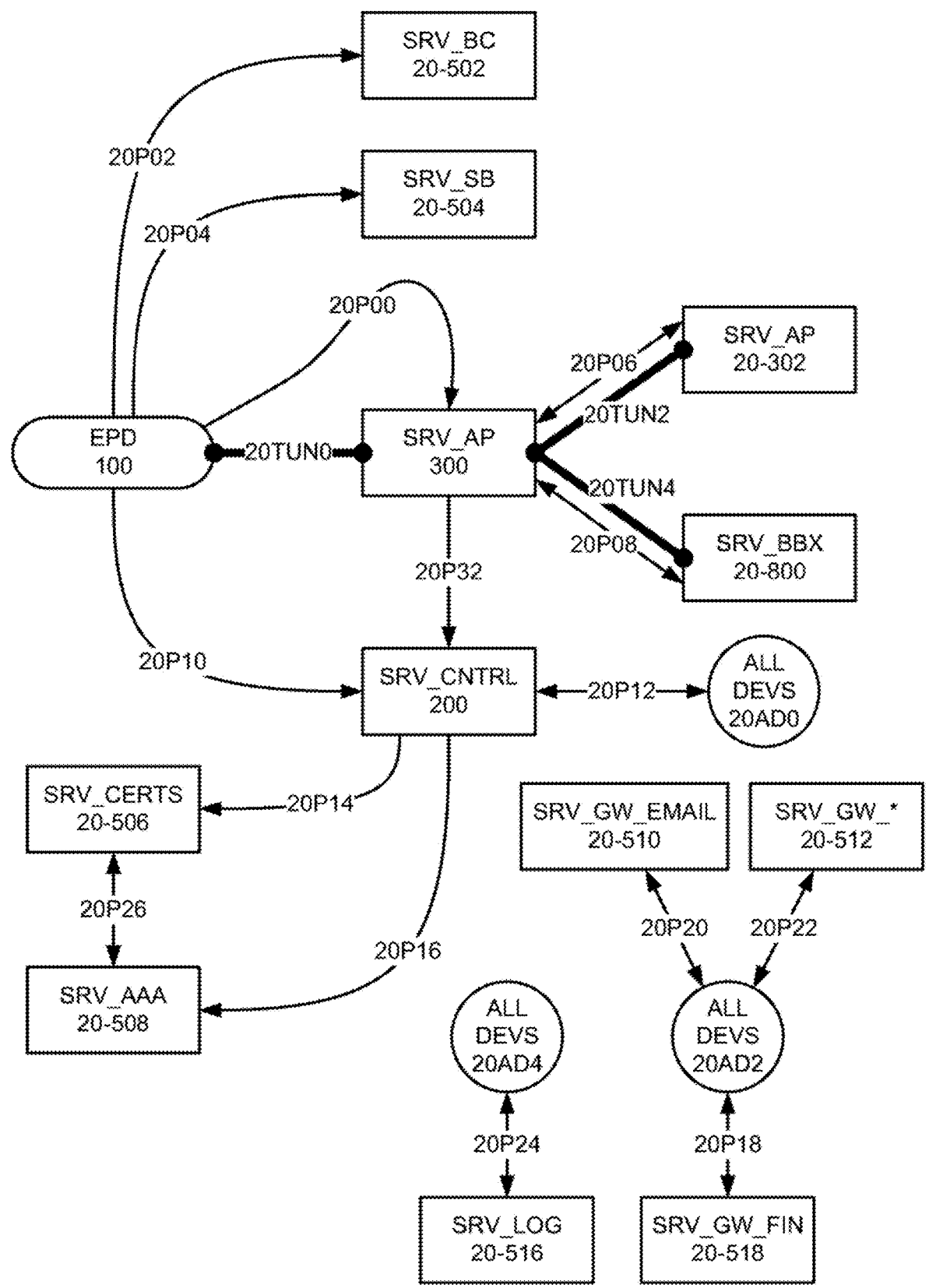
Figure # 20

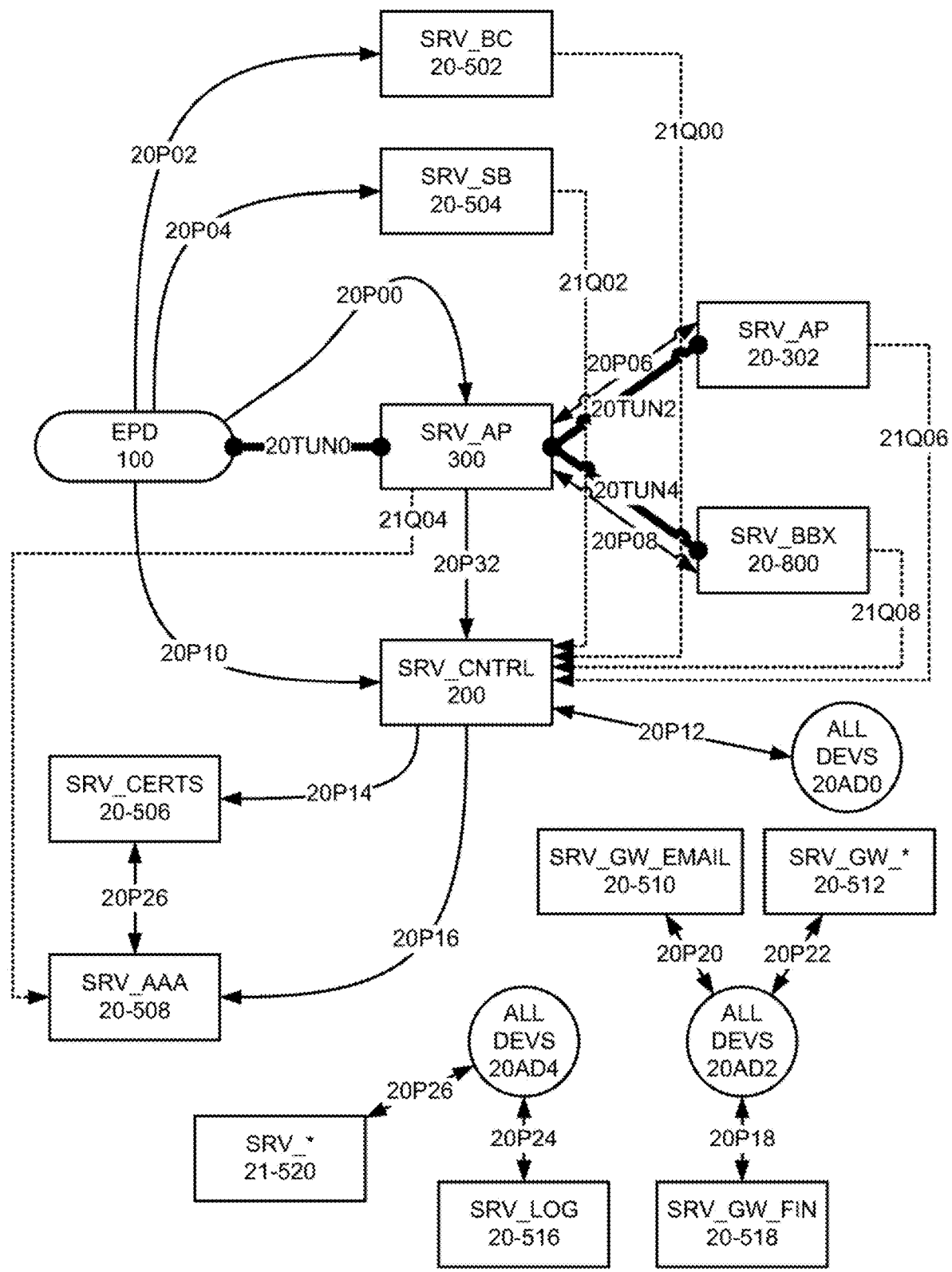
Figure # 21

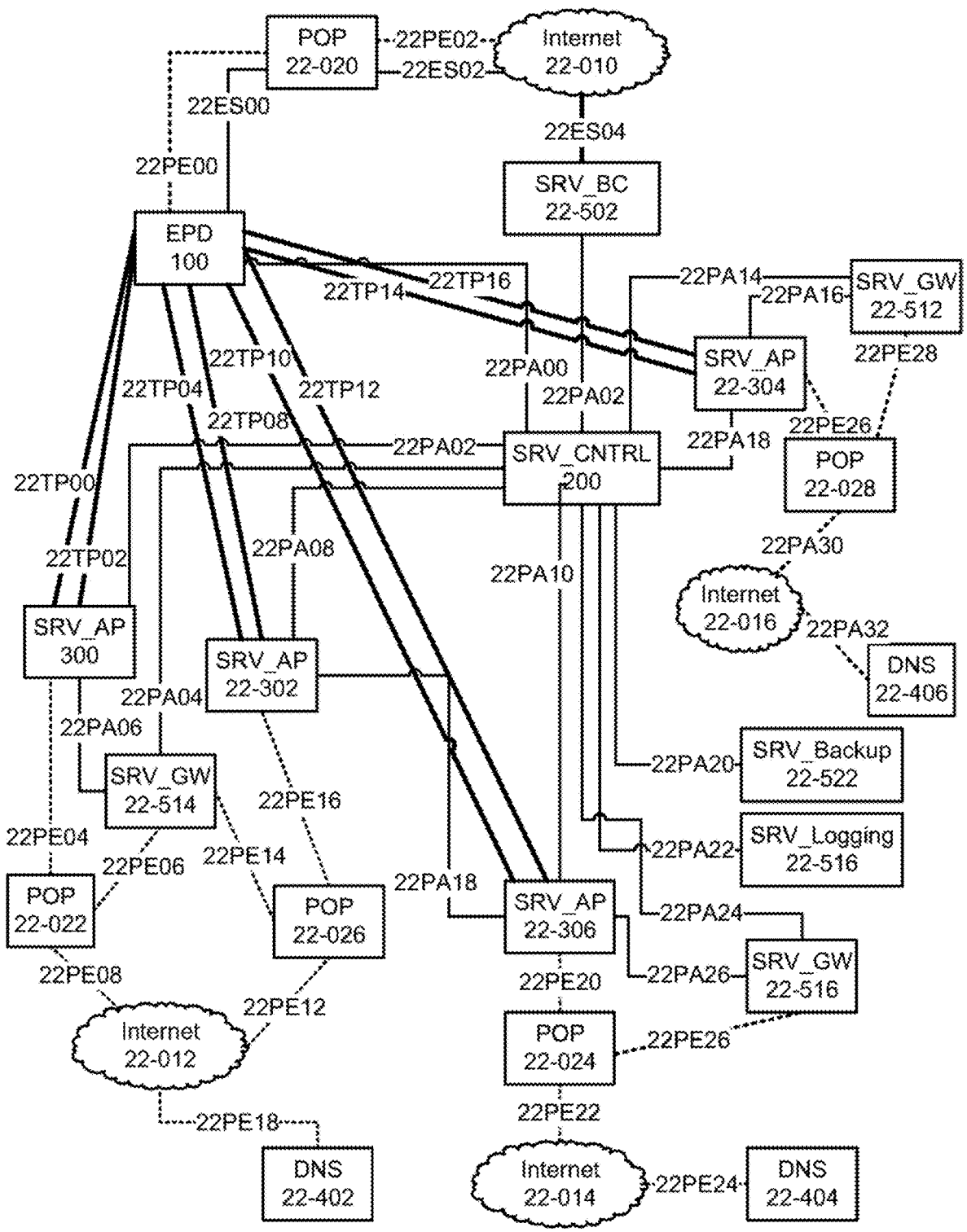
Figure # 22

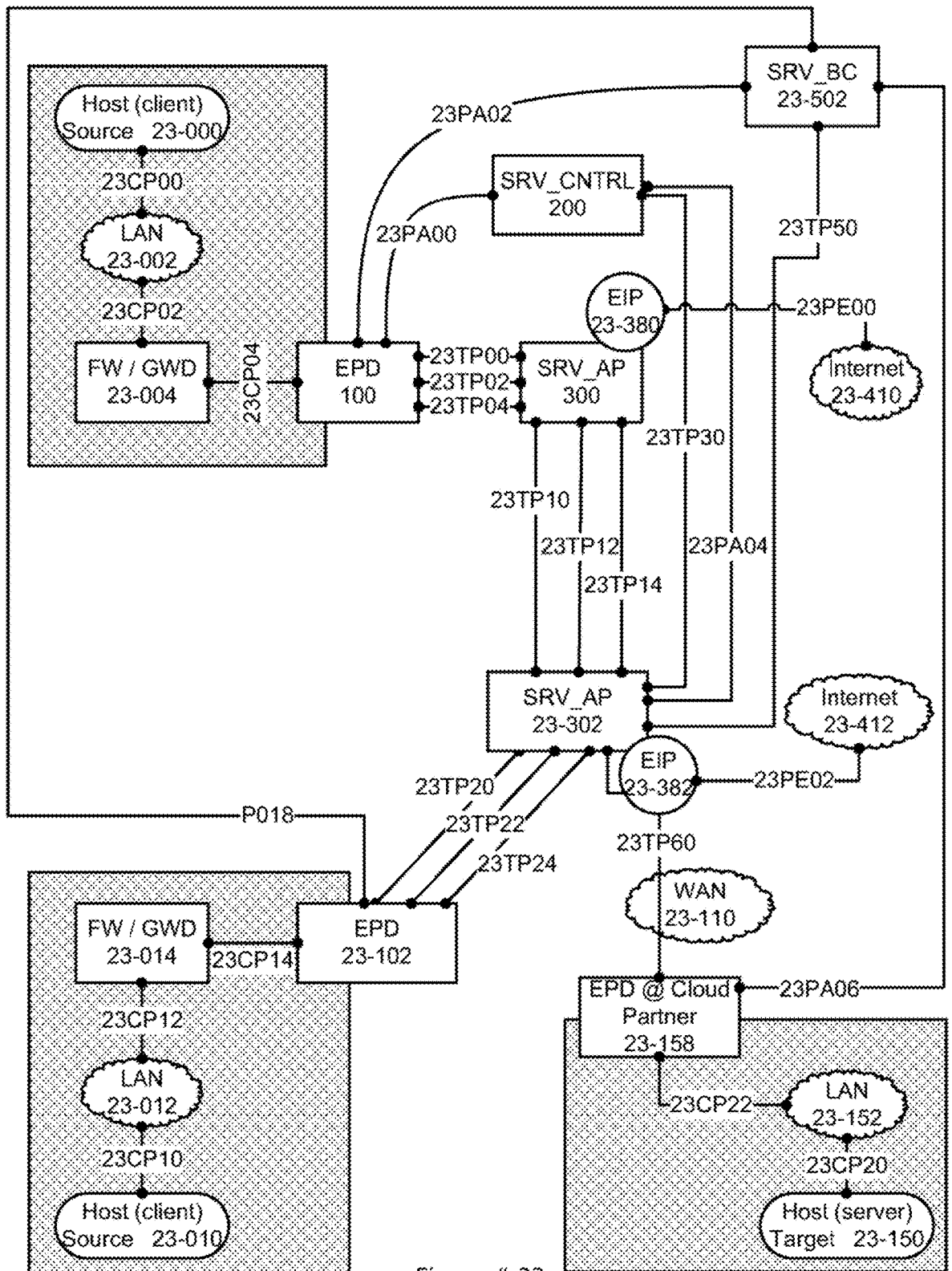
Figure # 23

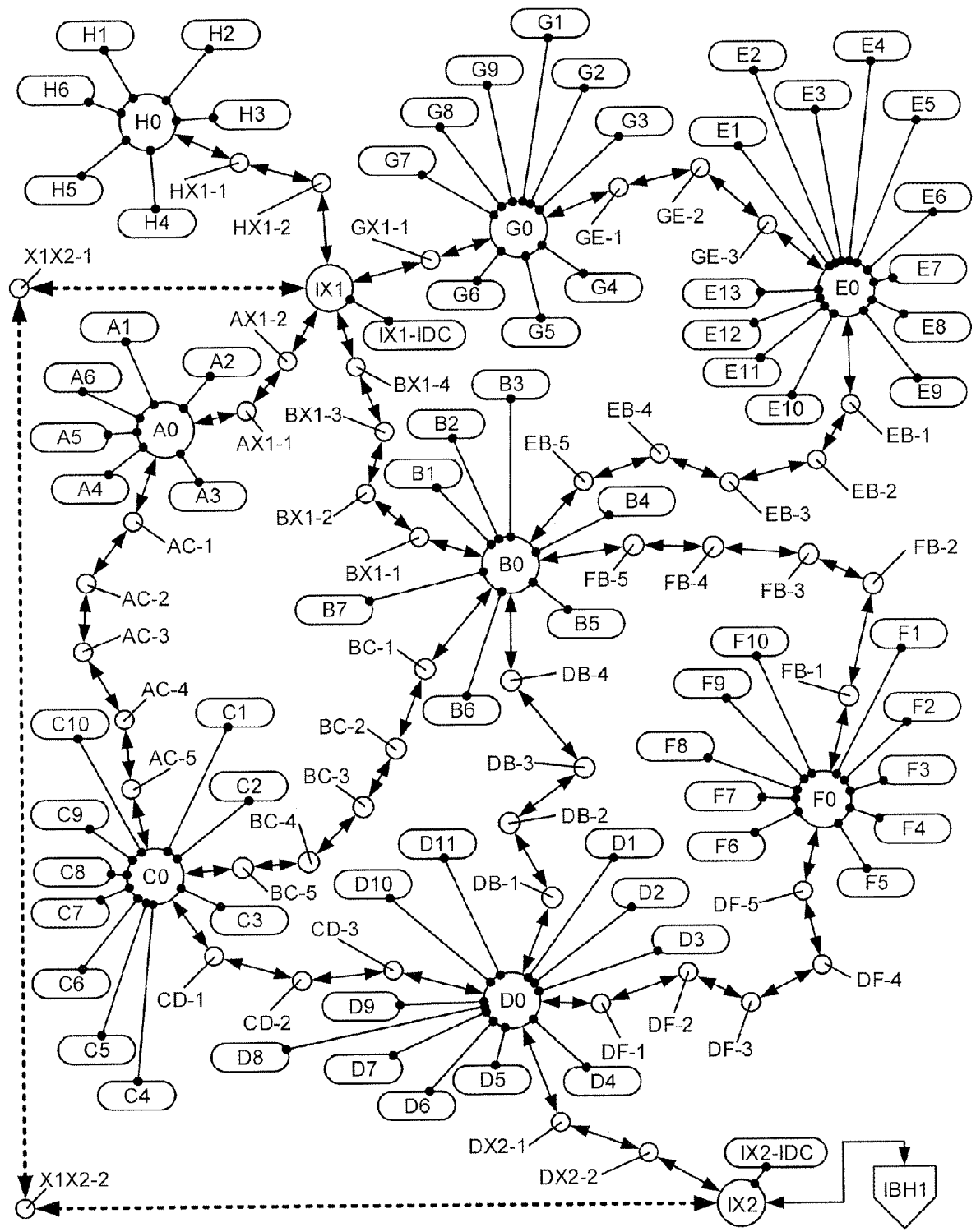
Figure # 24

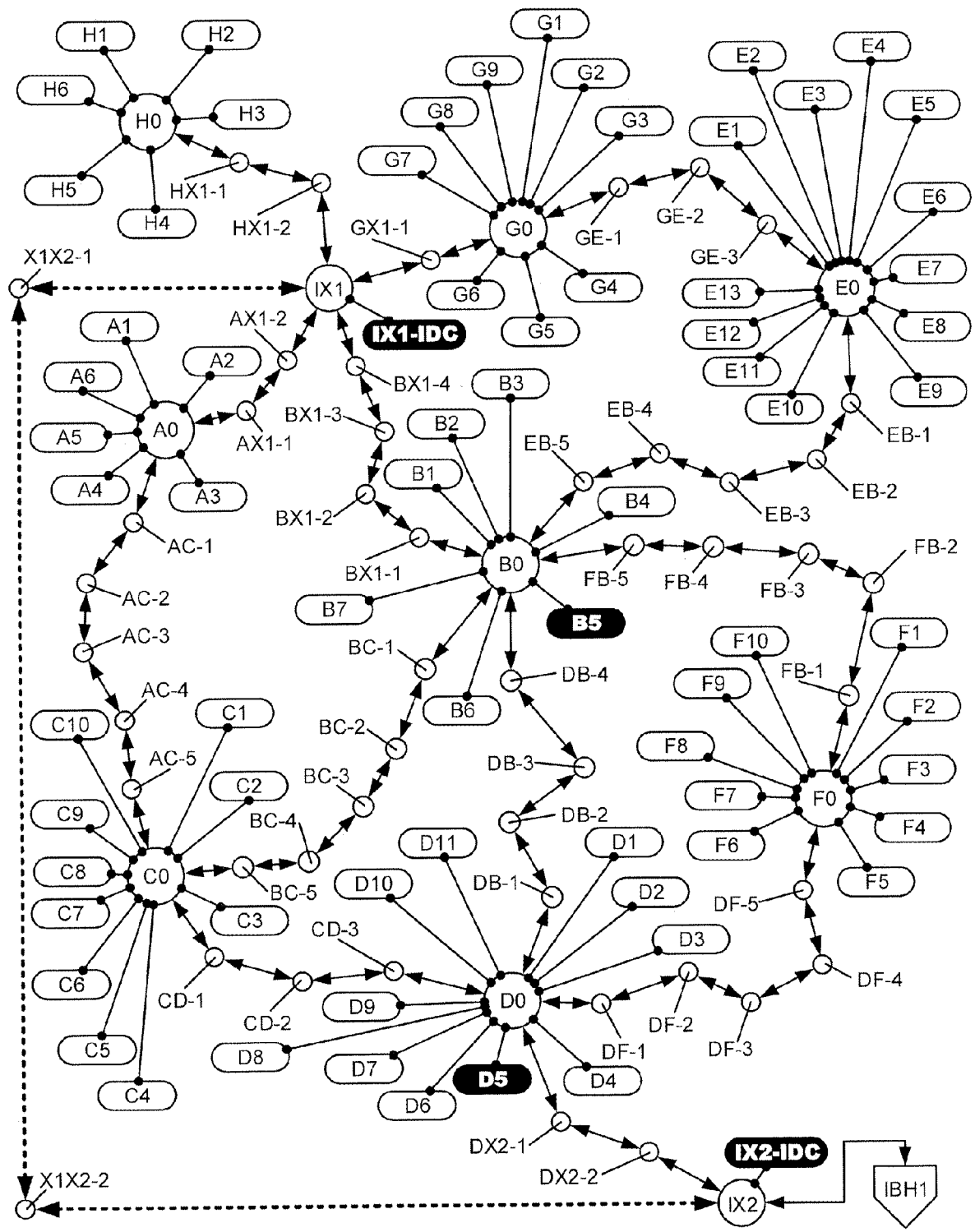
Figure # 25

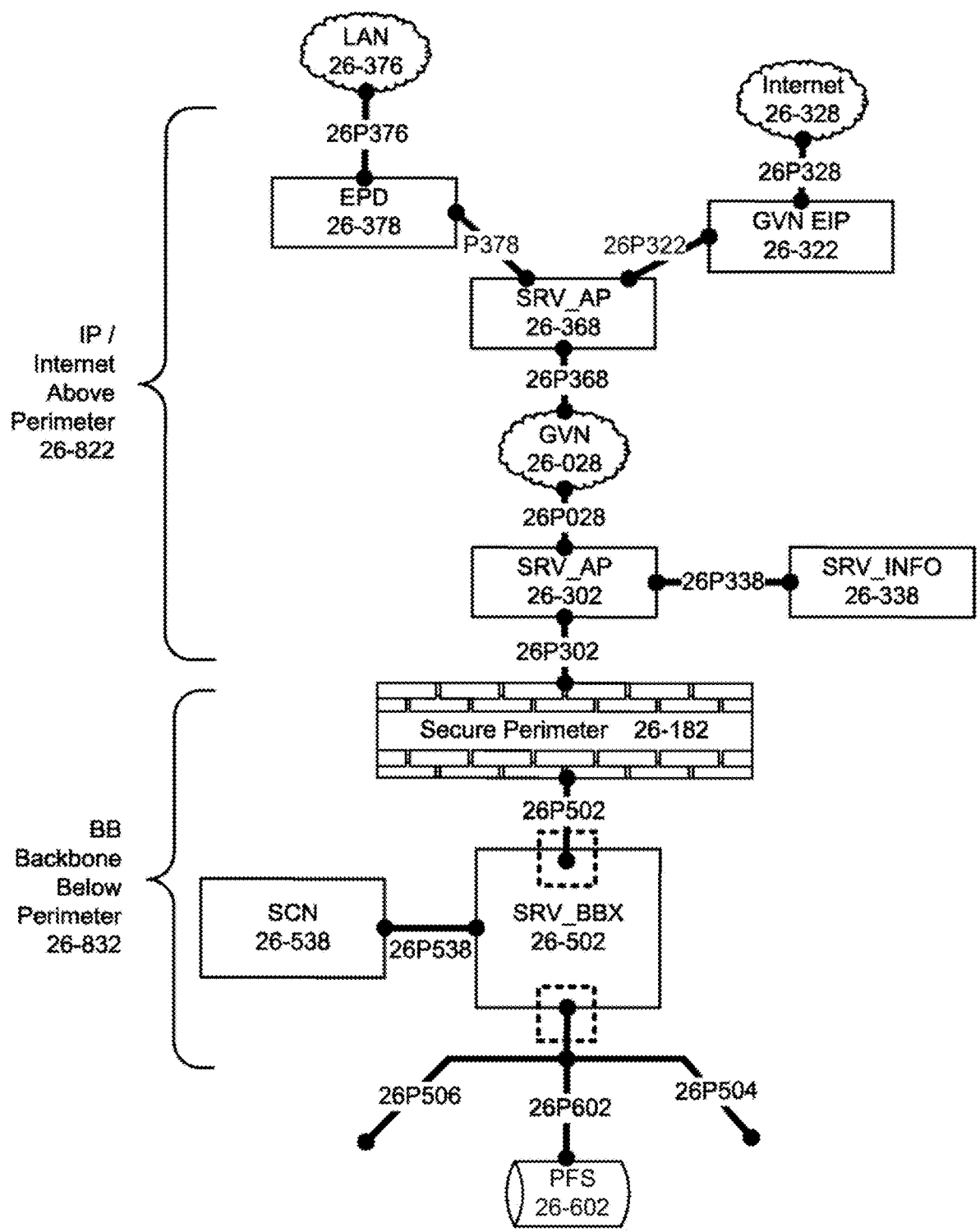
Figure # 26

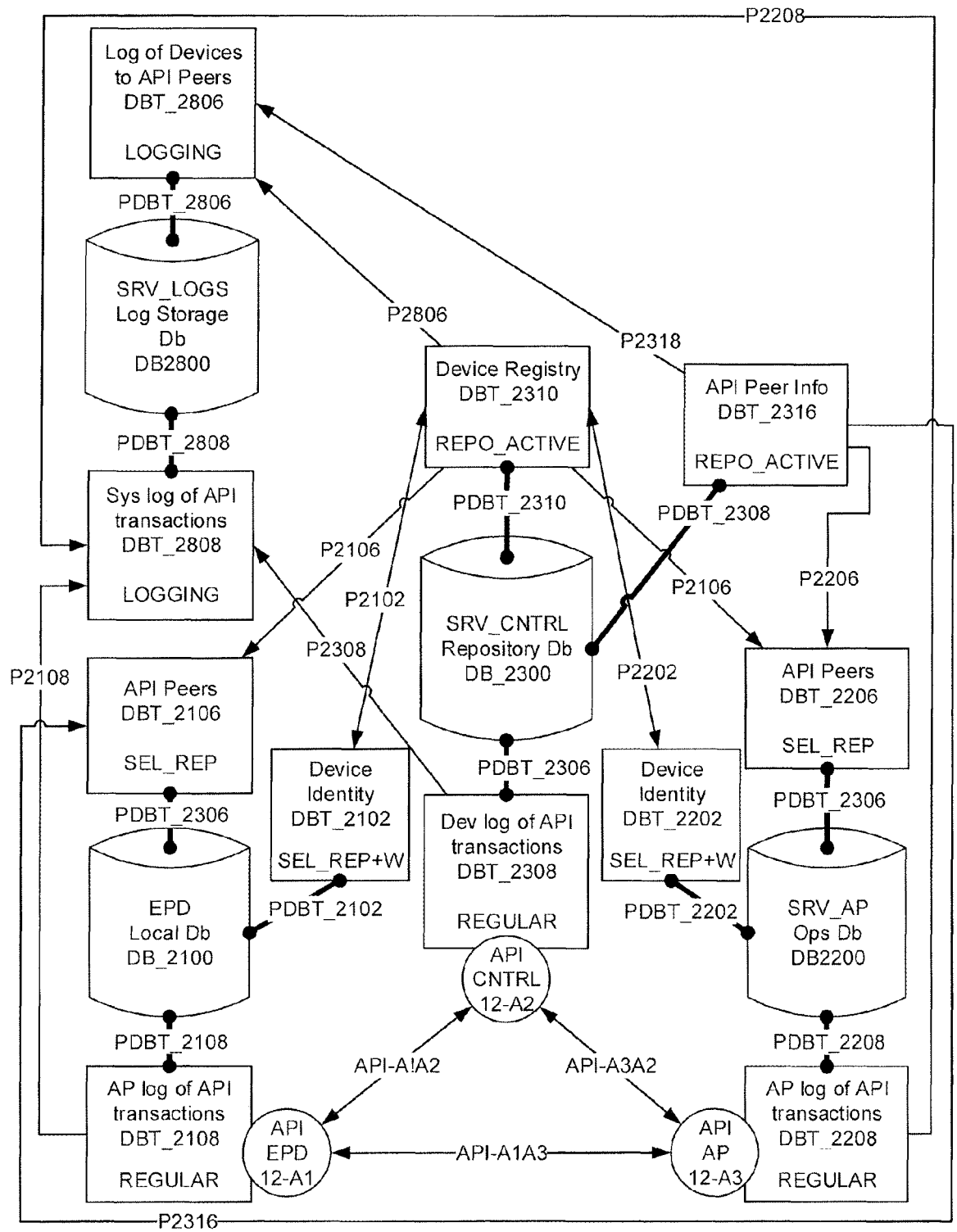
Figure # 27

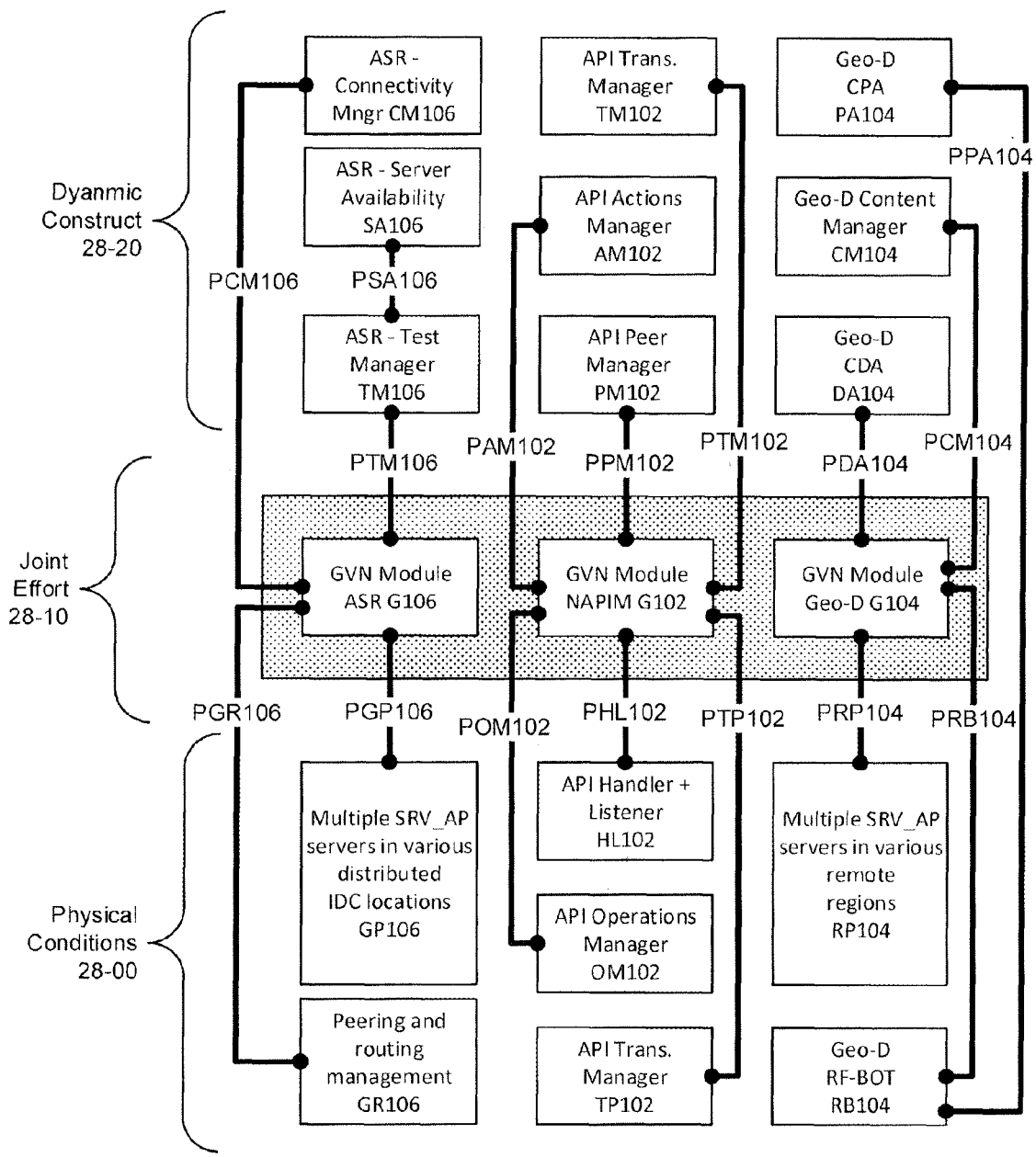
Figure # 28

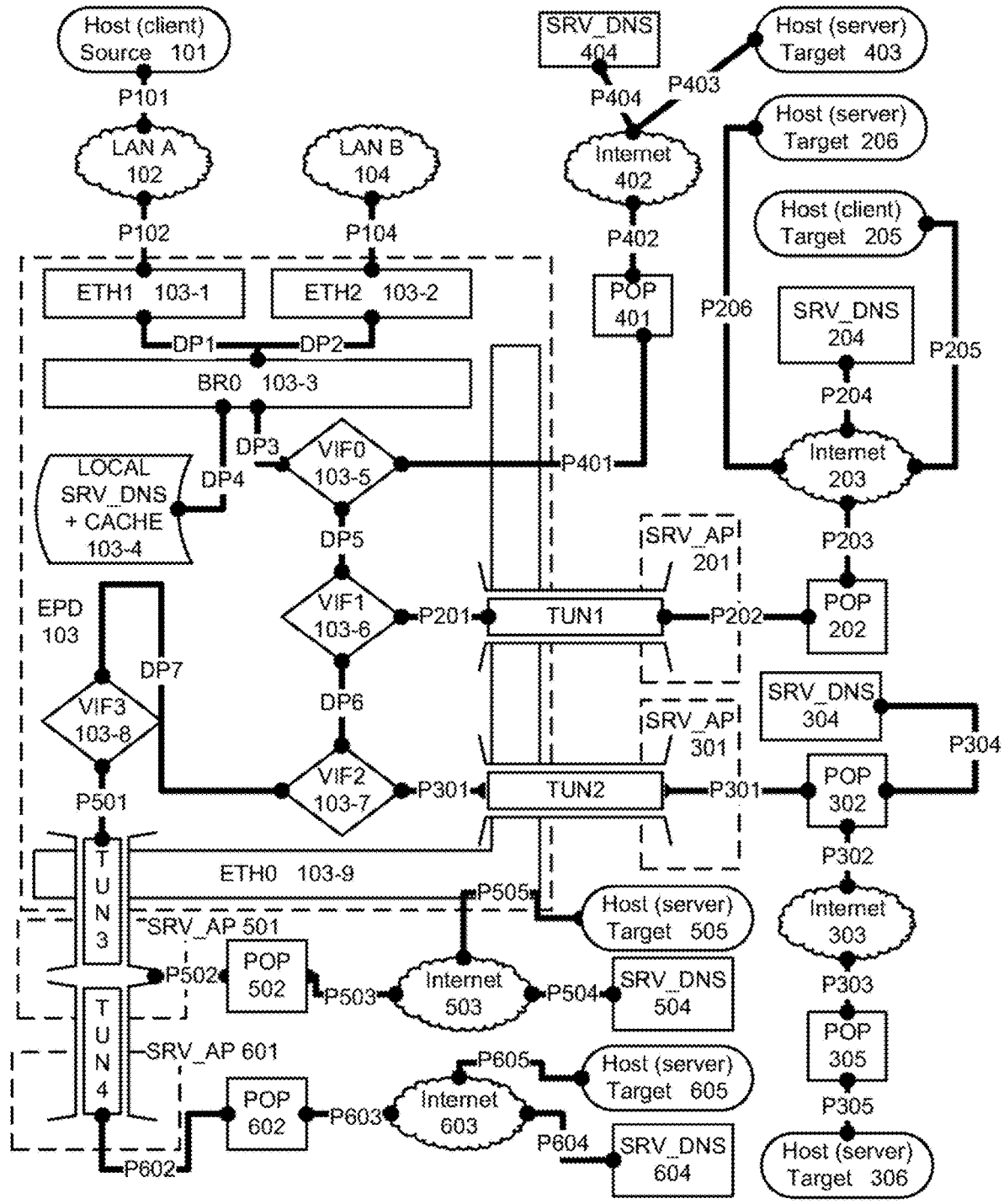
Figure # 29

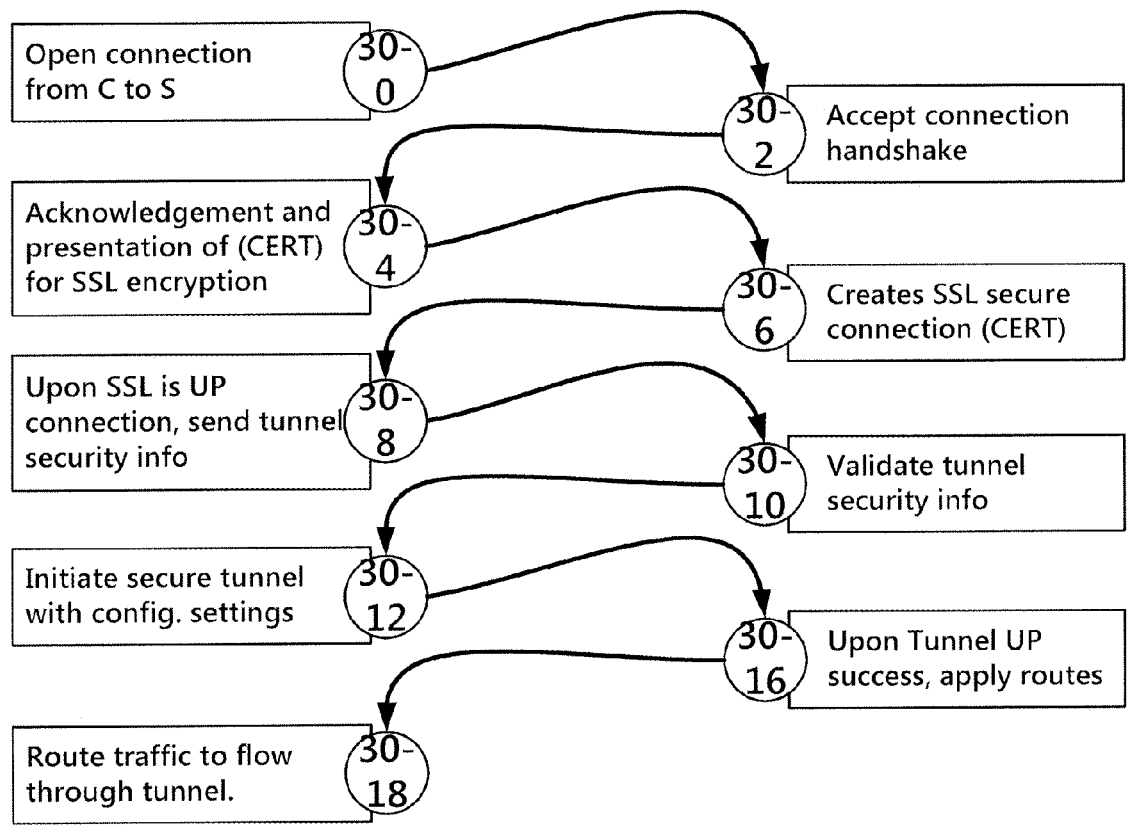
Figure # 30

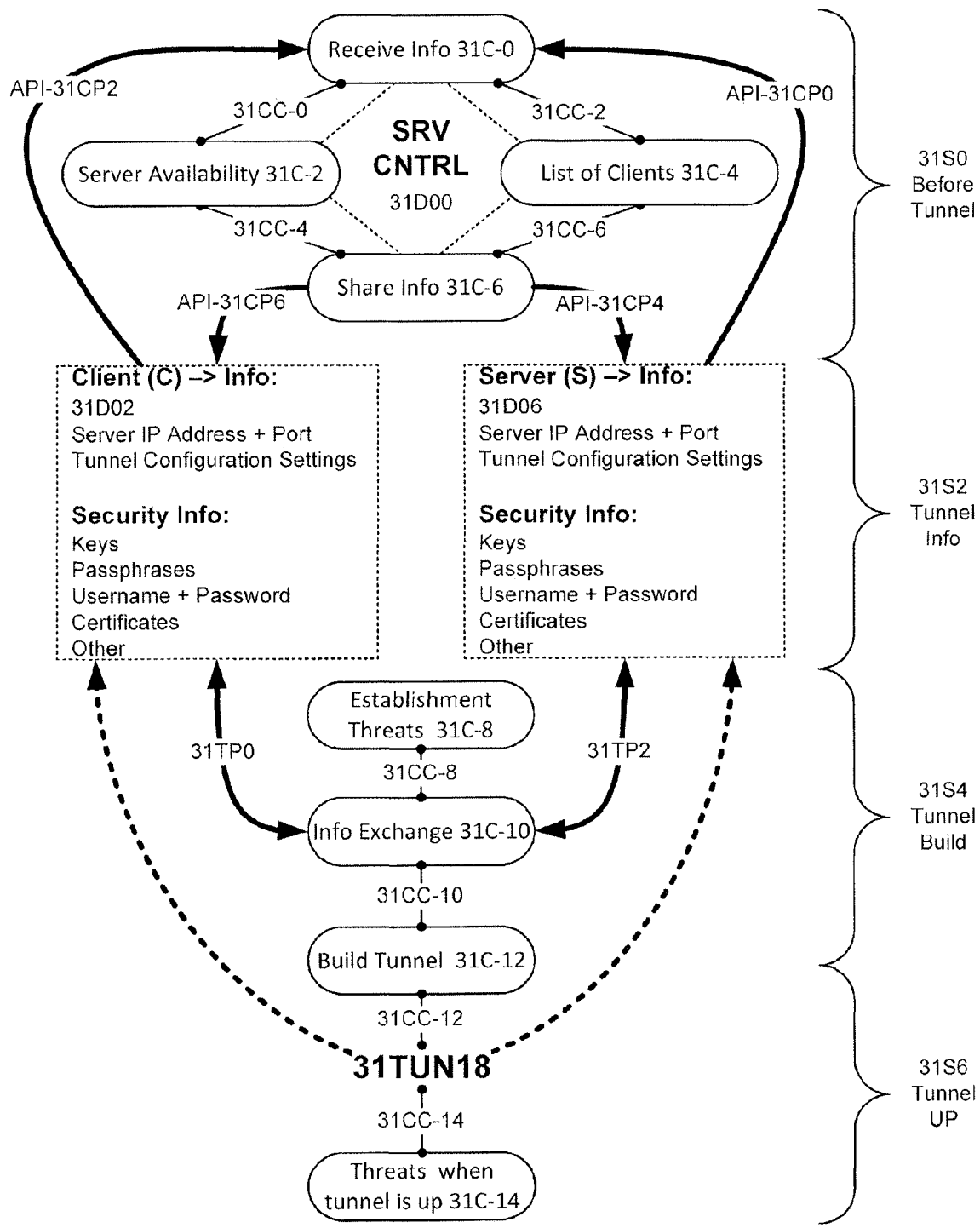
Figure # 31

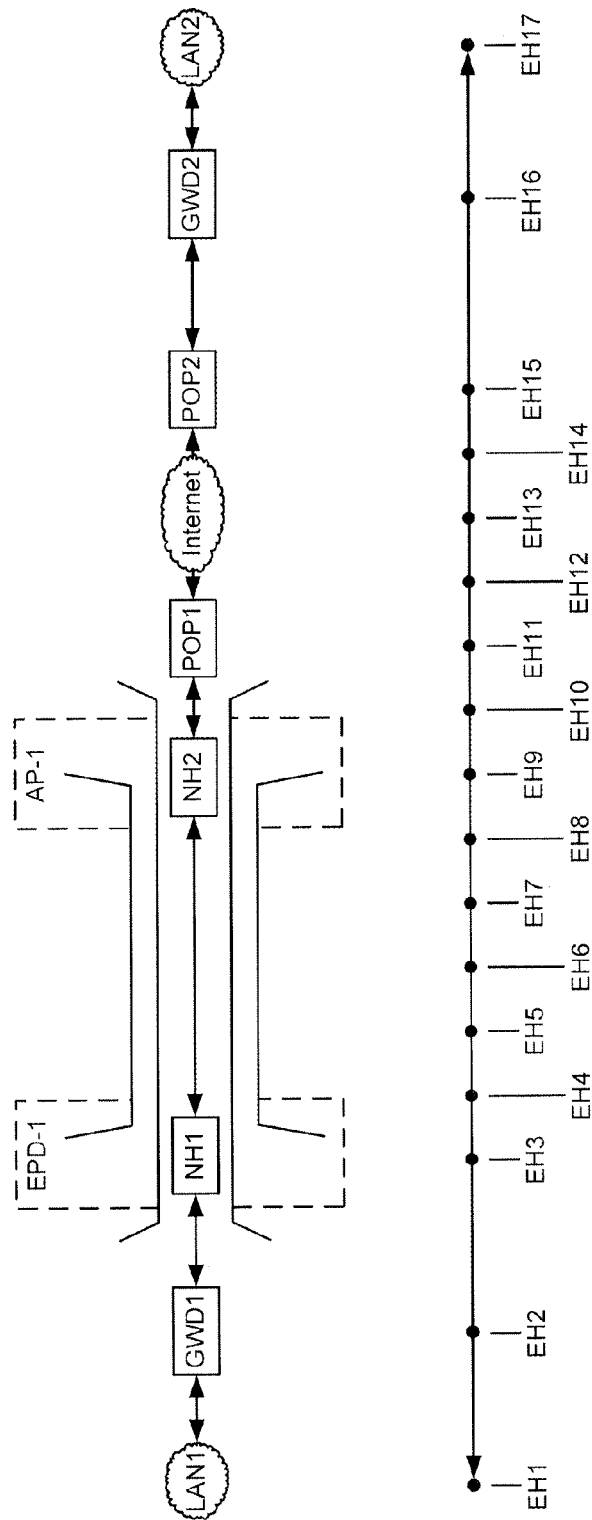
Figure # 32

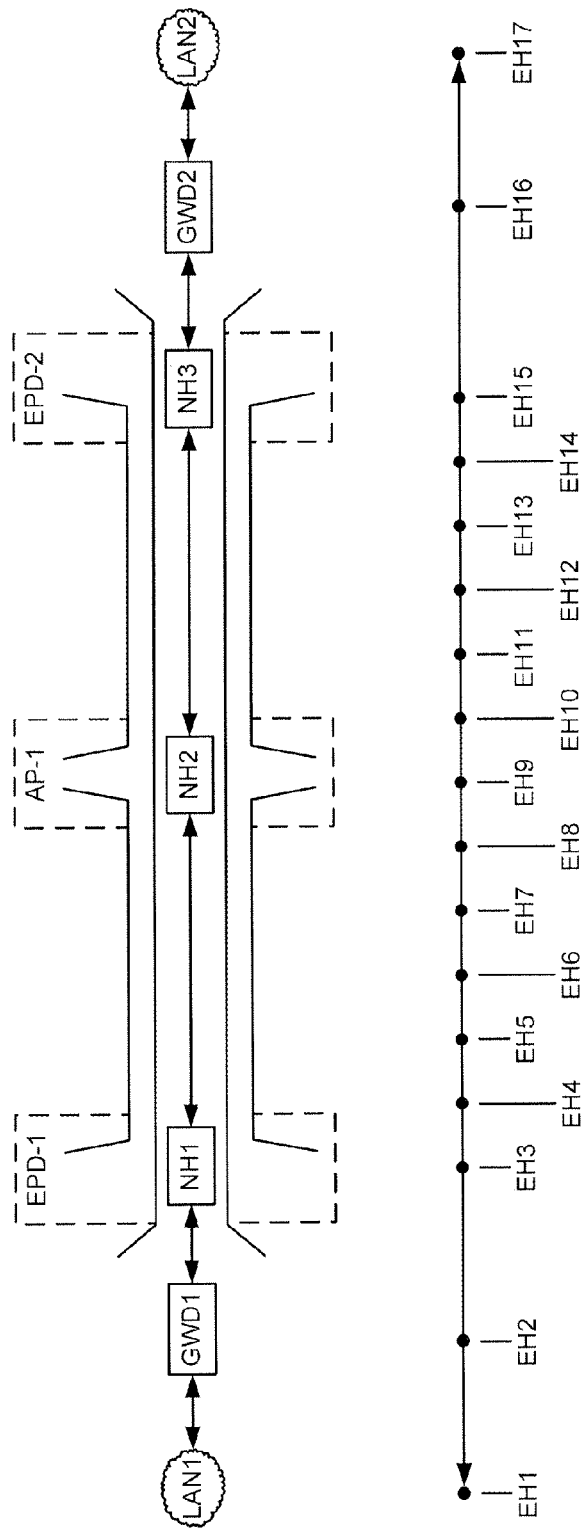
Figure # 33

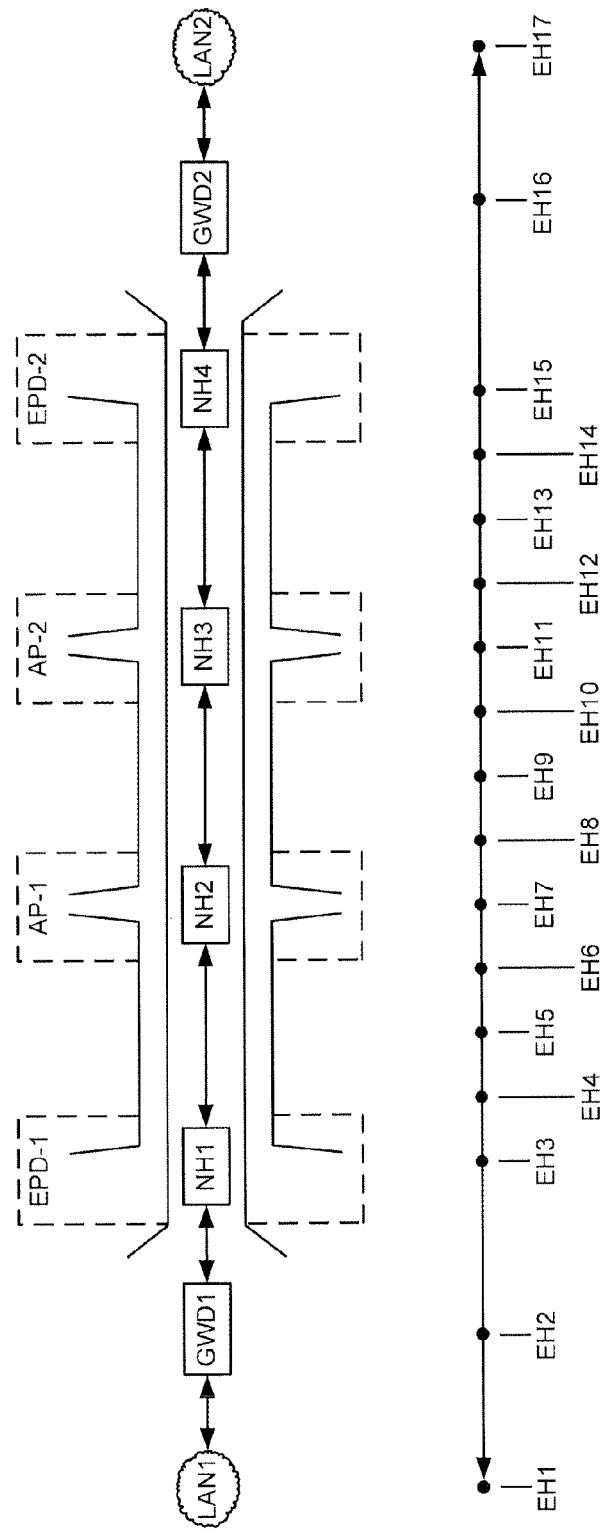
Figure # 34

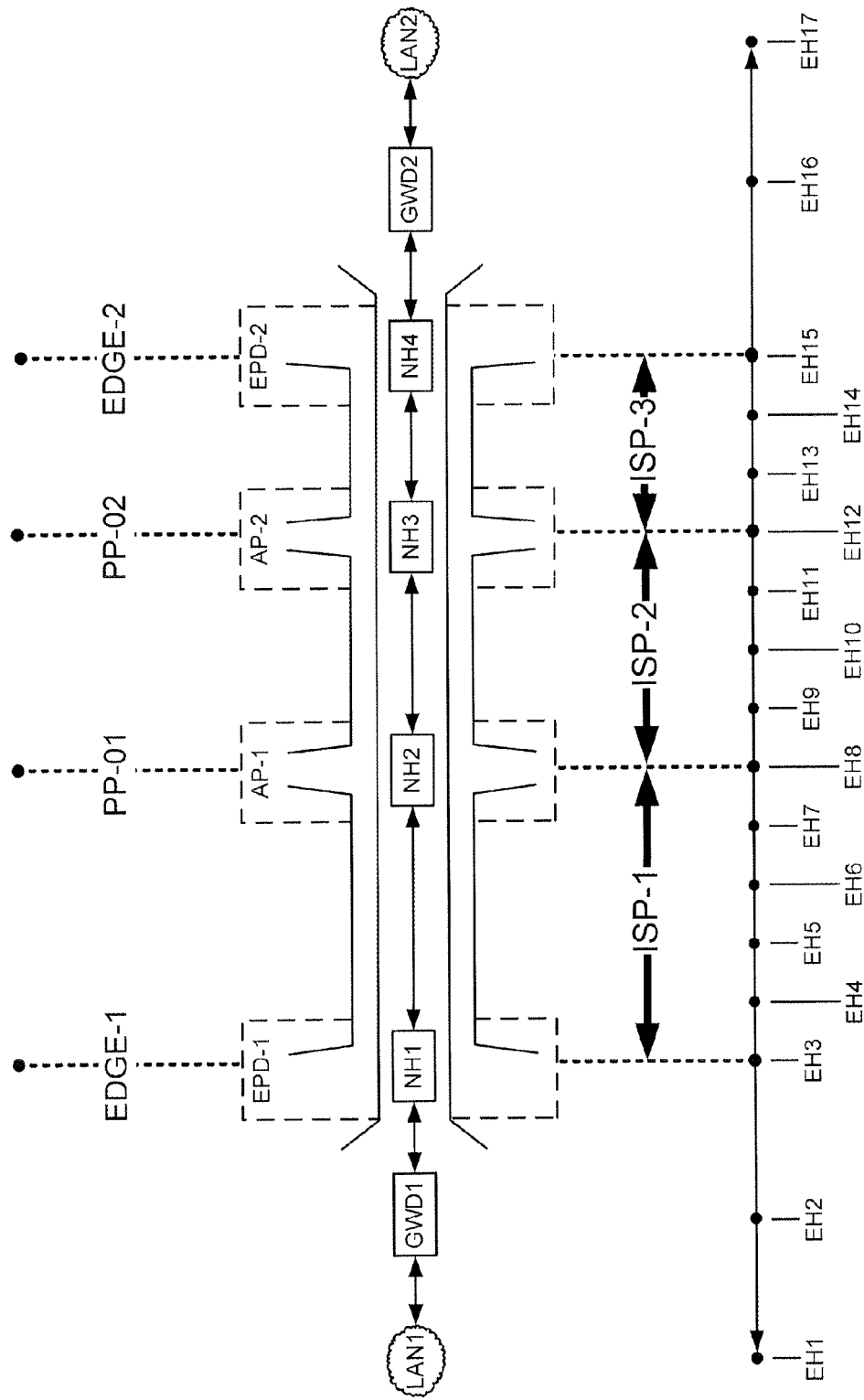
Figure # 35

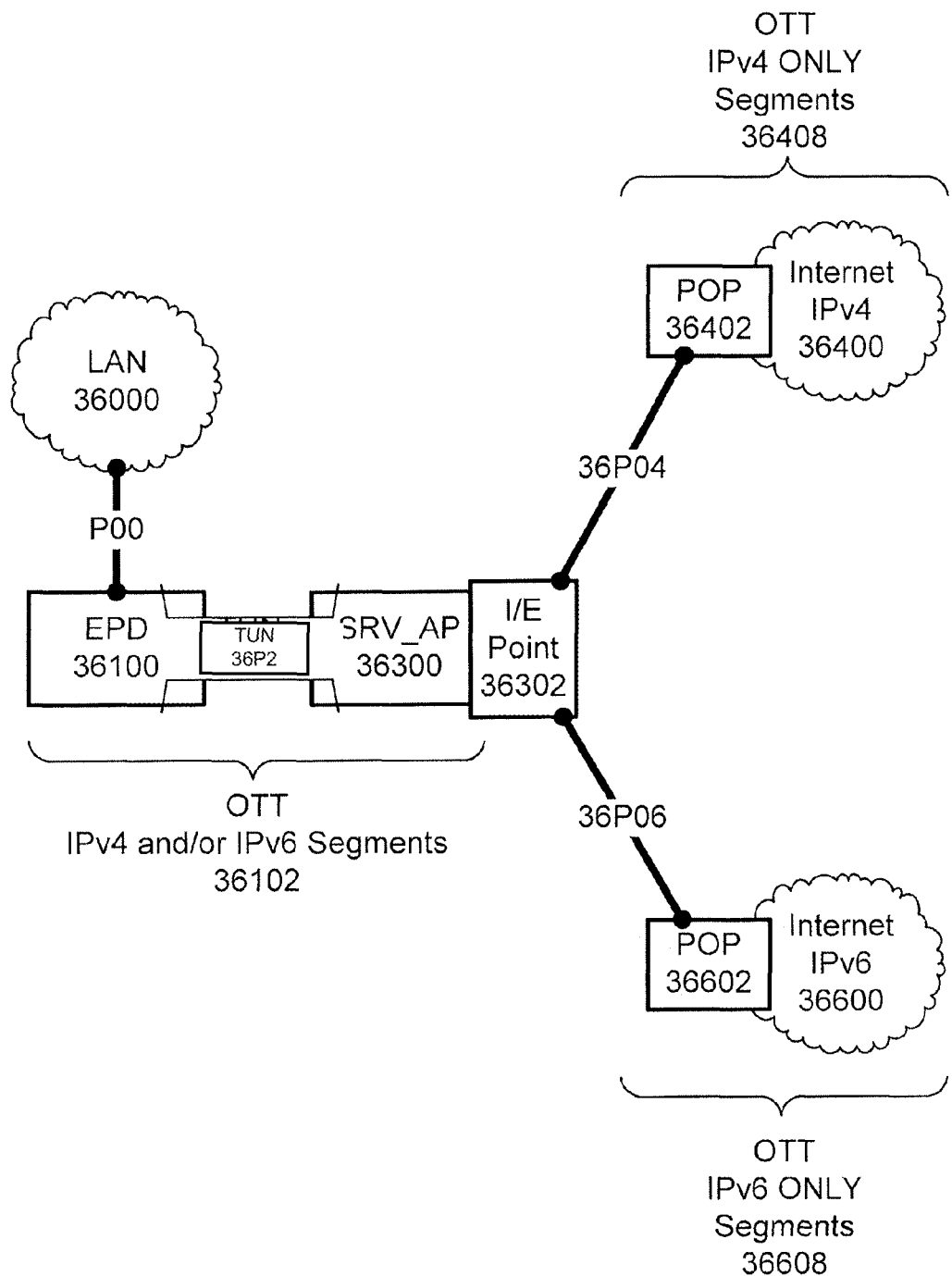
Figure # 36

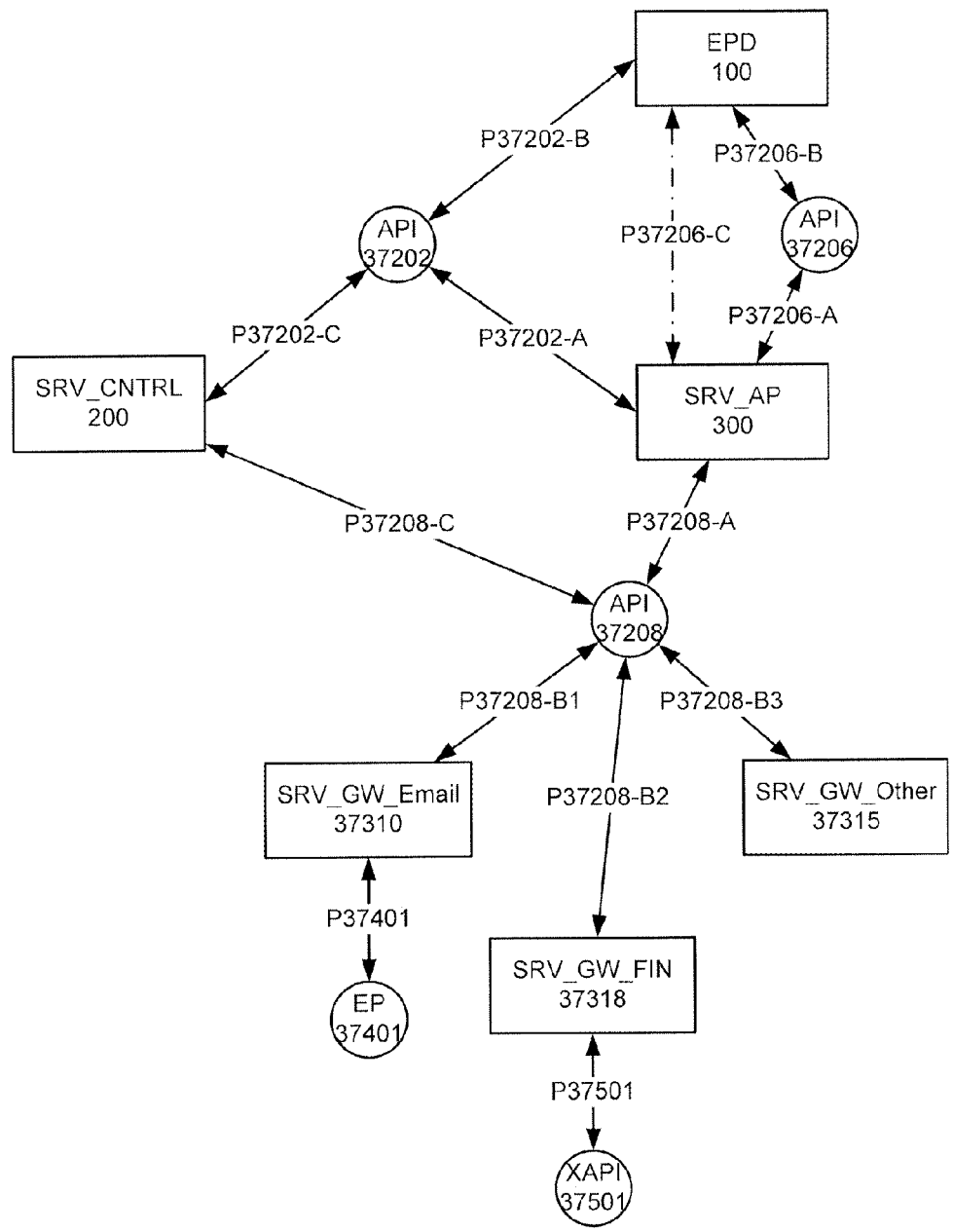
Figure # 37

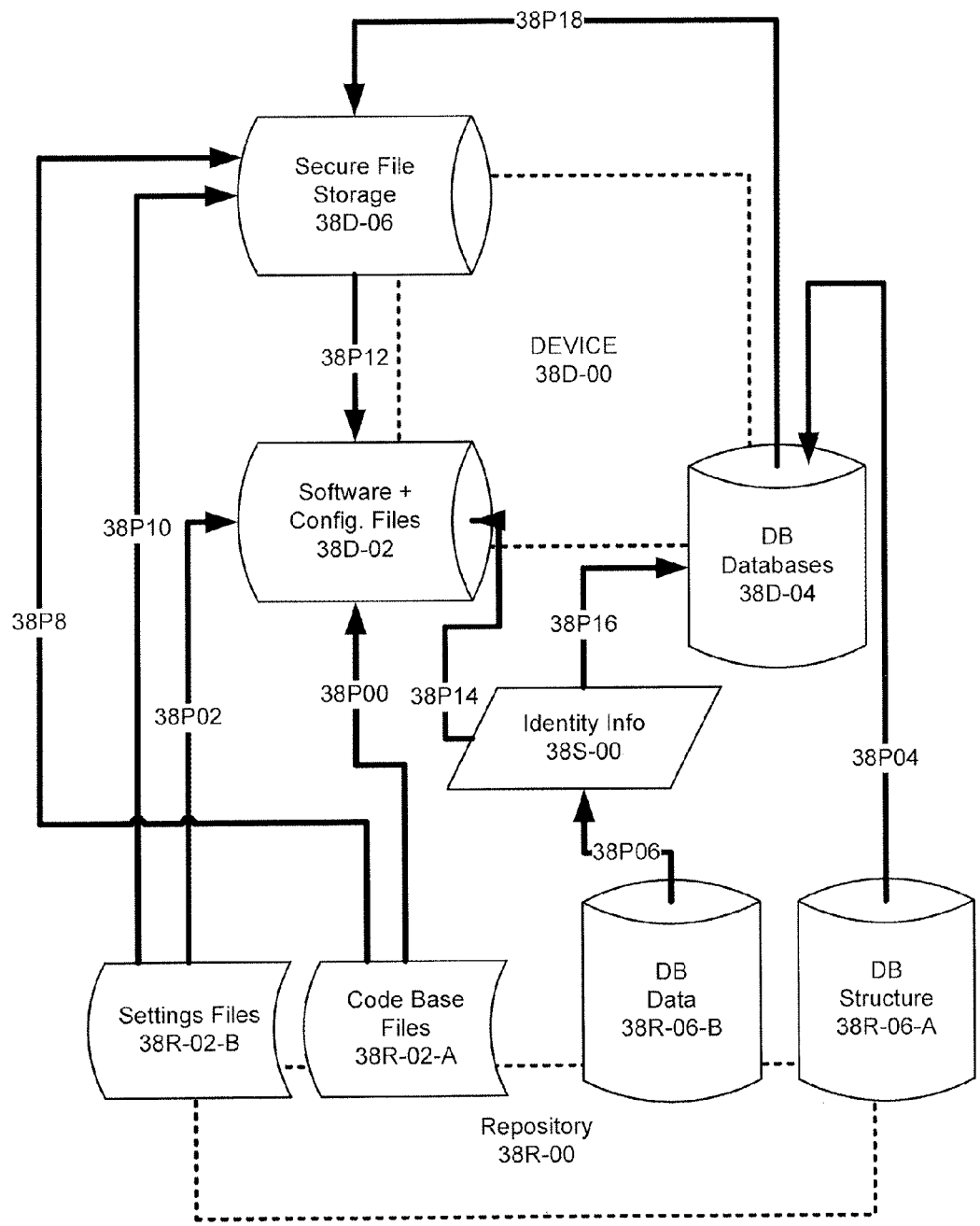
Figure # 38

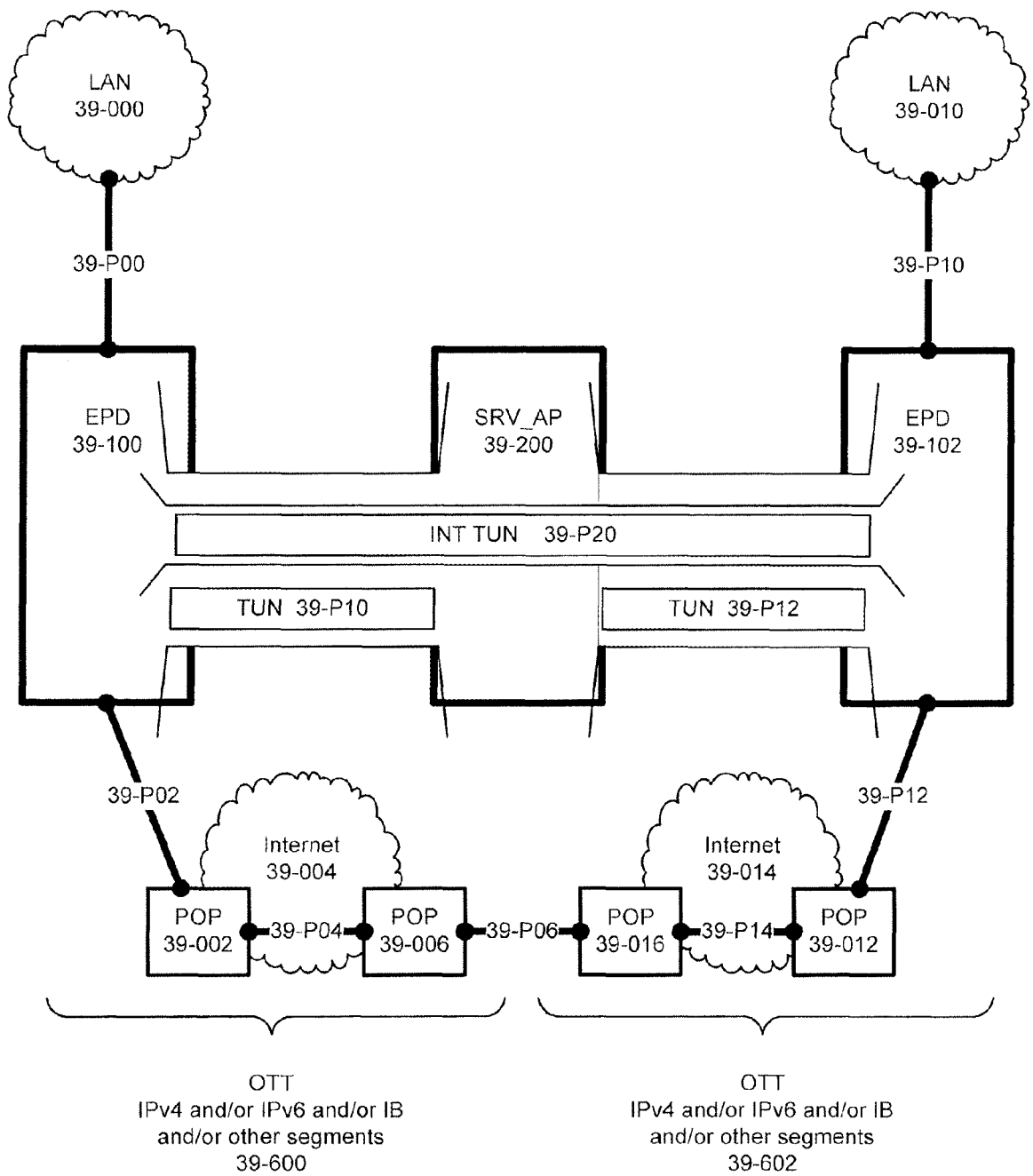
Figure # 39

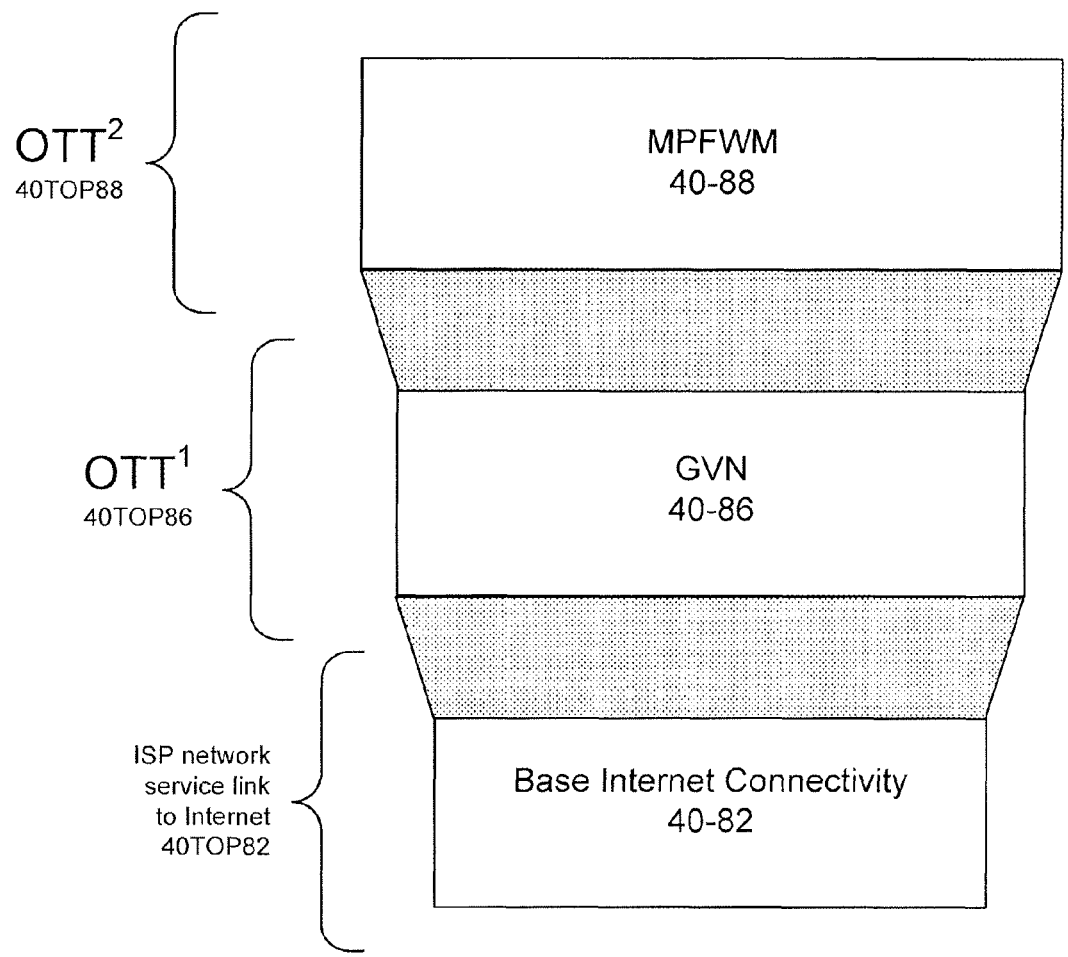
Figure # 40

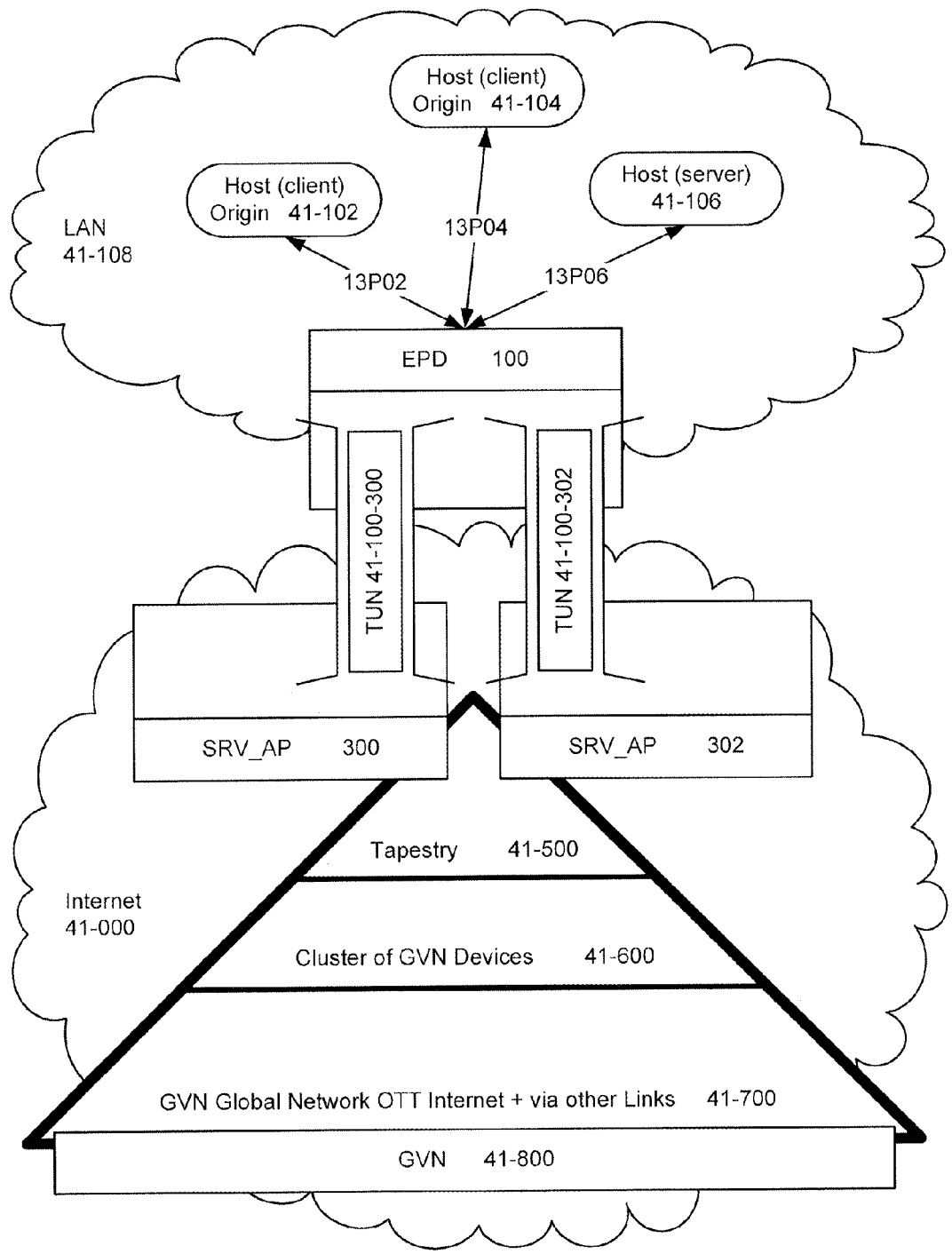
Figure # 41

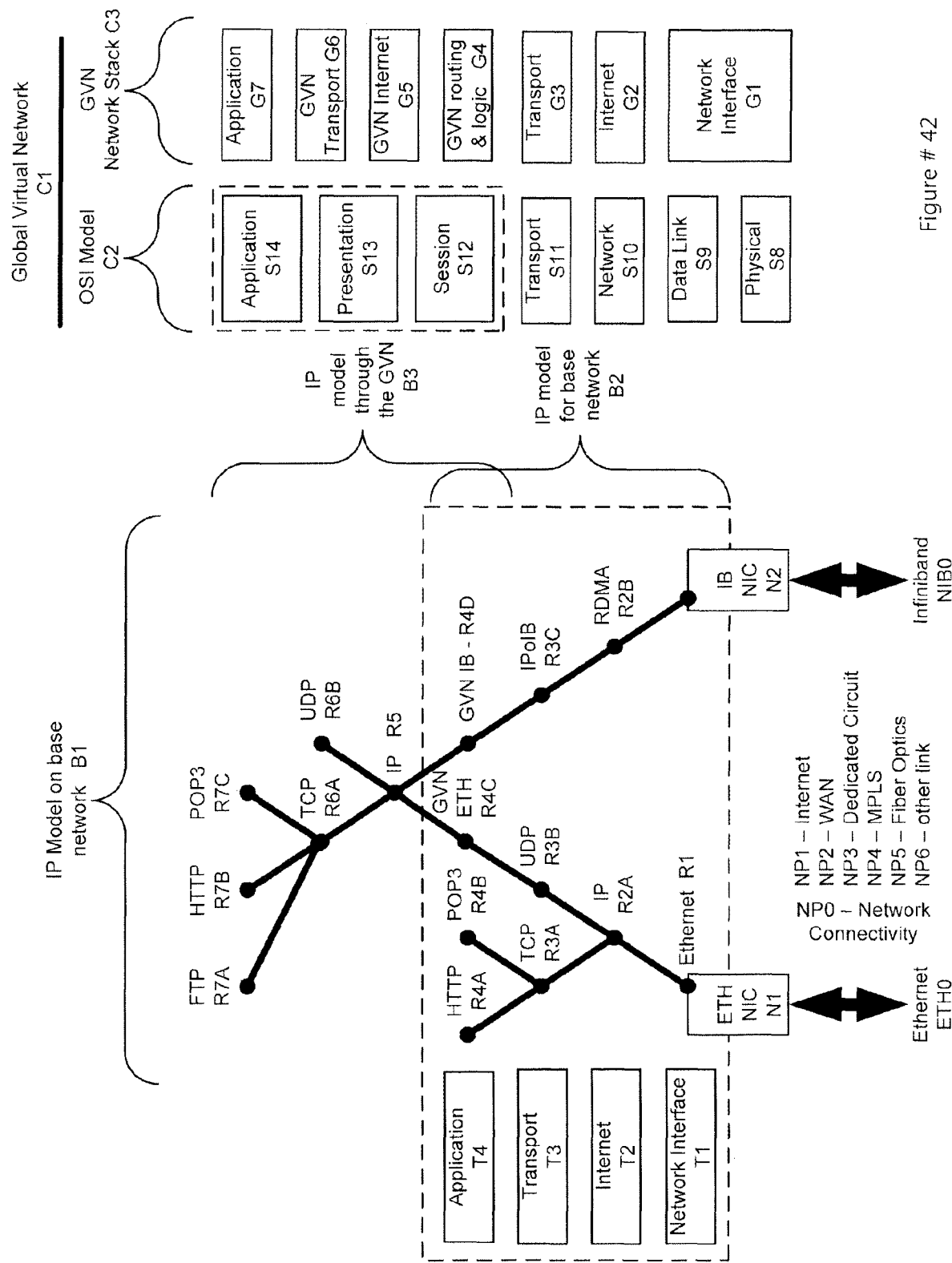
Figure # 42

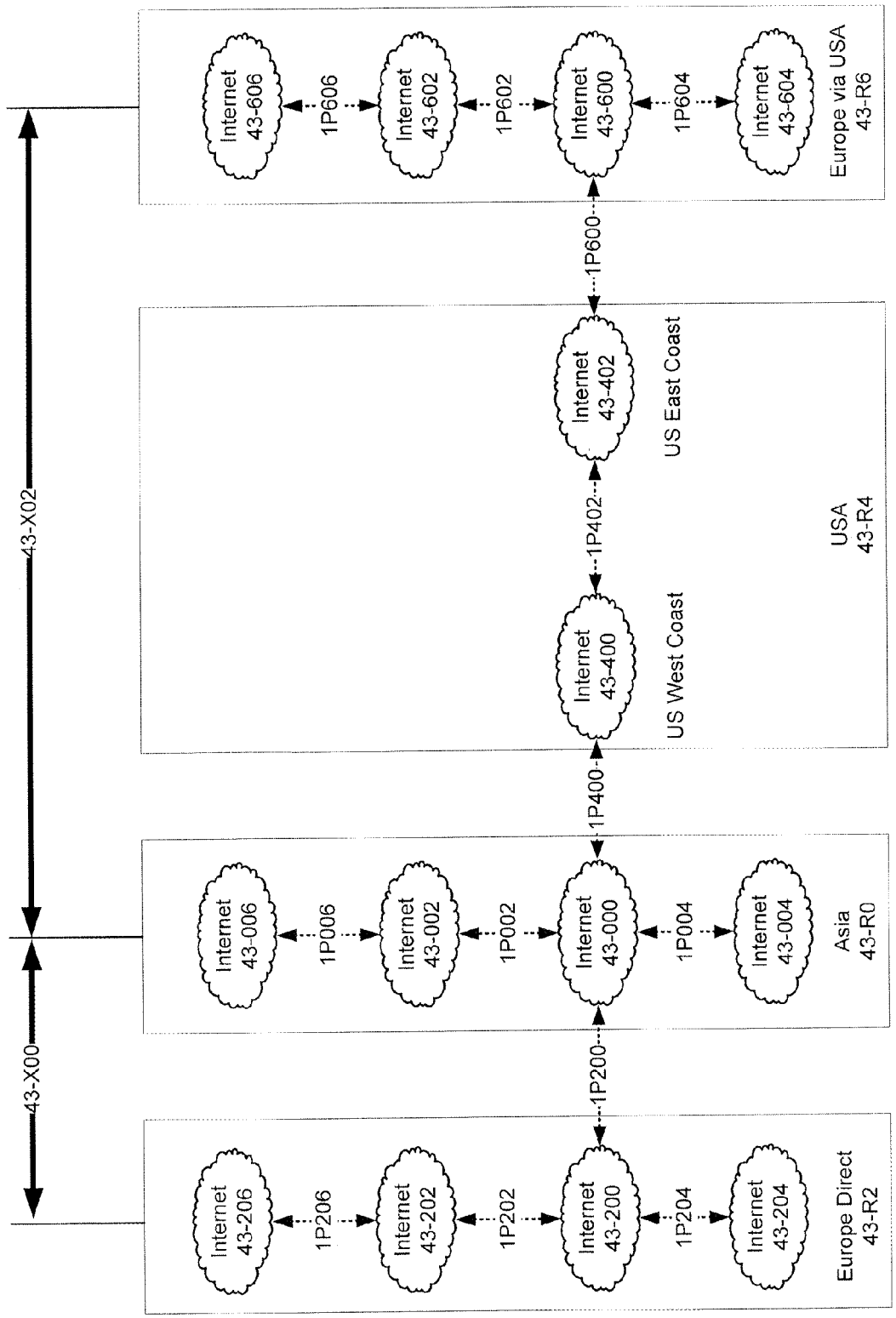
Figure # 43

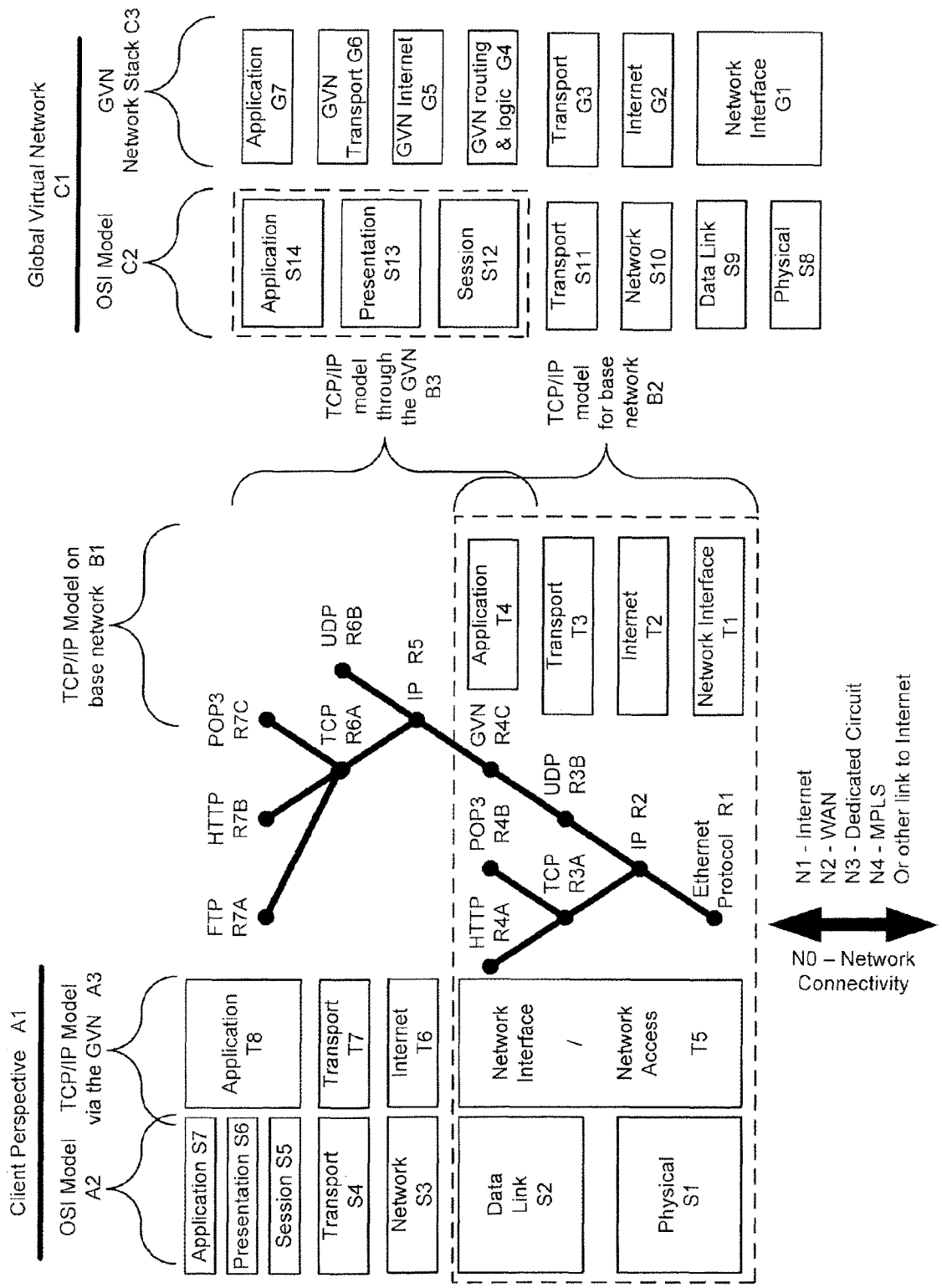
Figure # 44

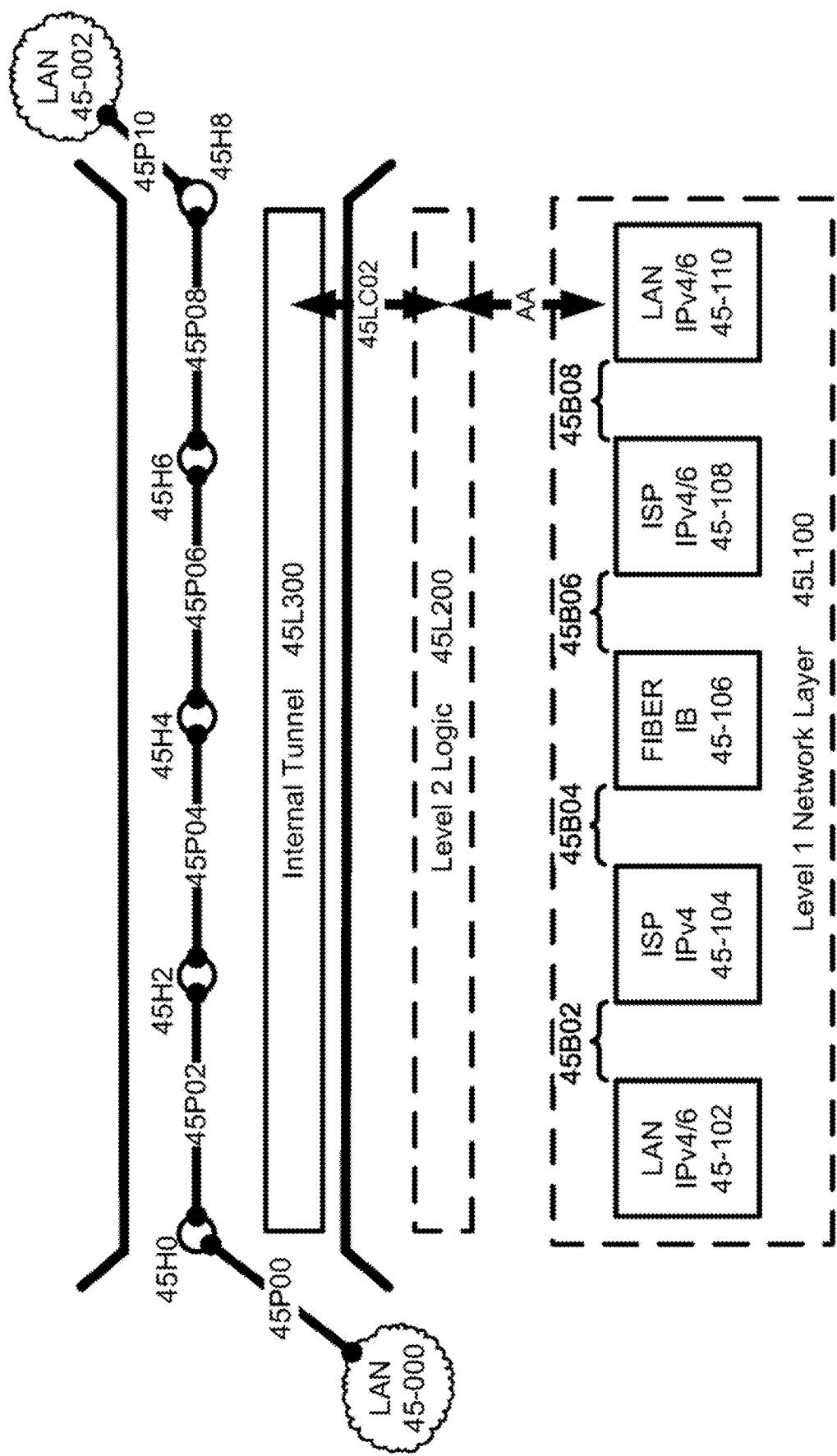
Figure # 45

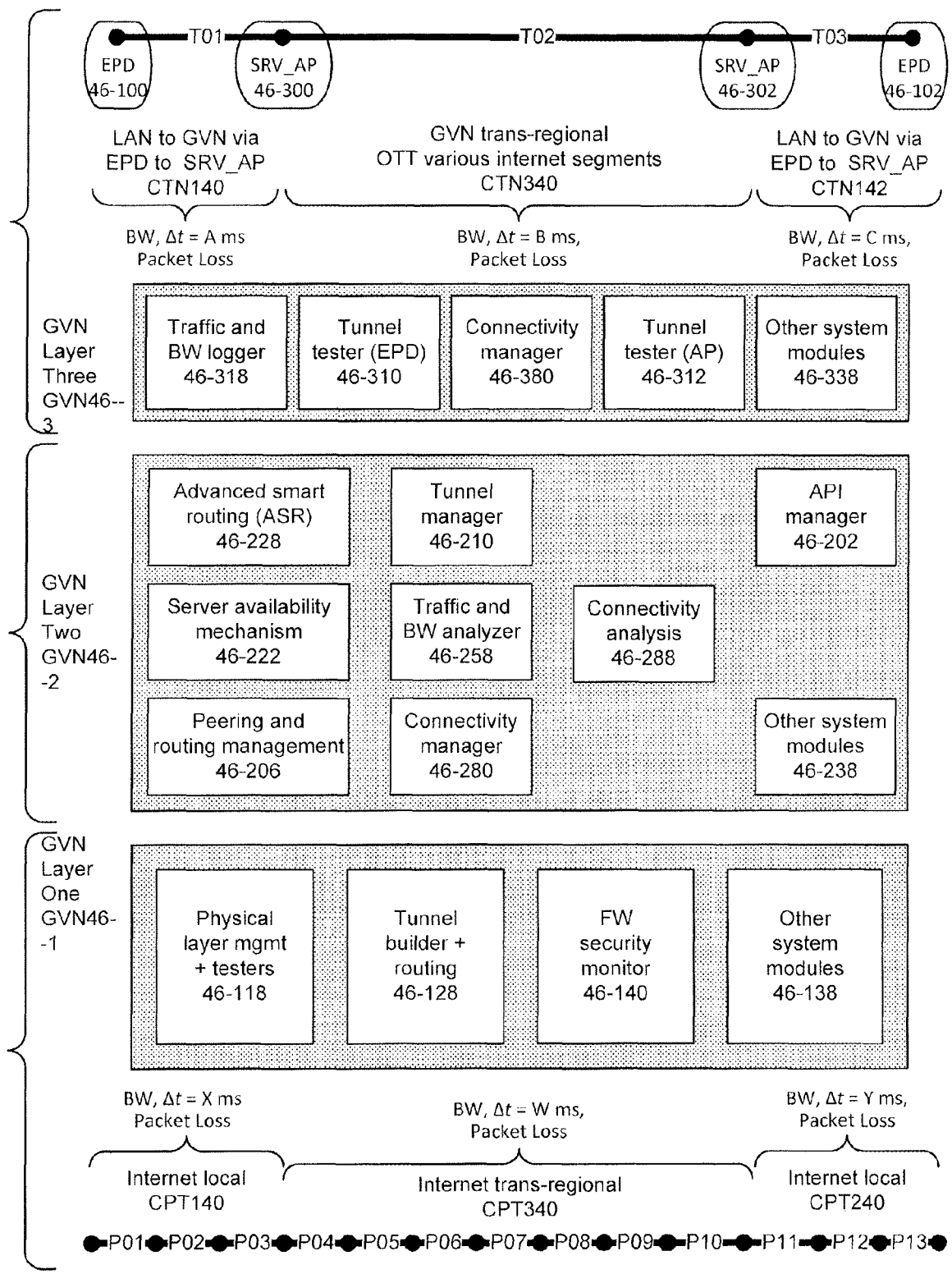
Figure # 46

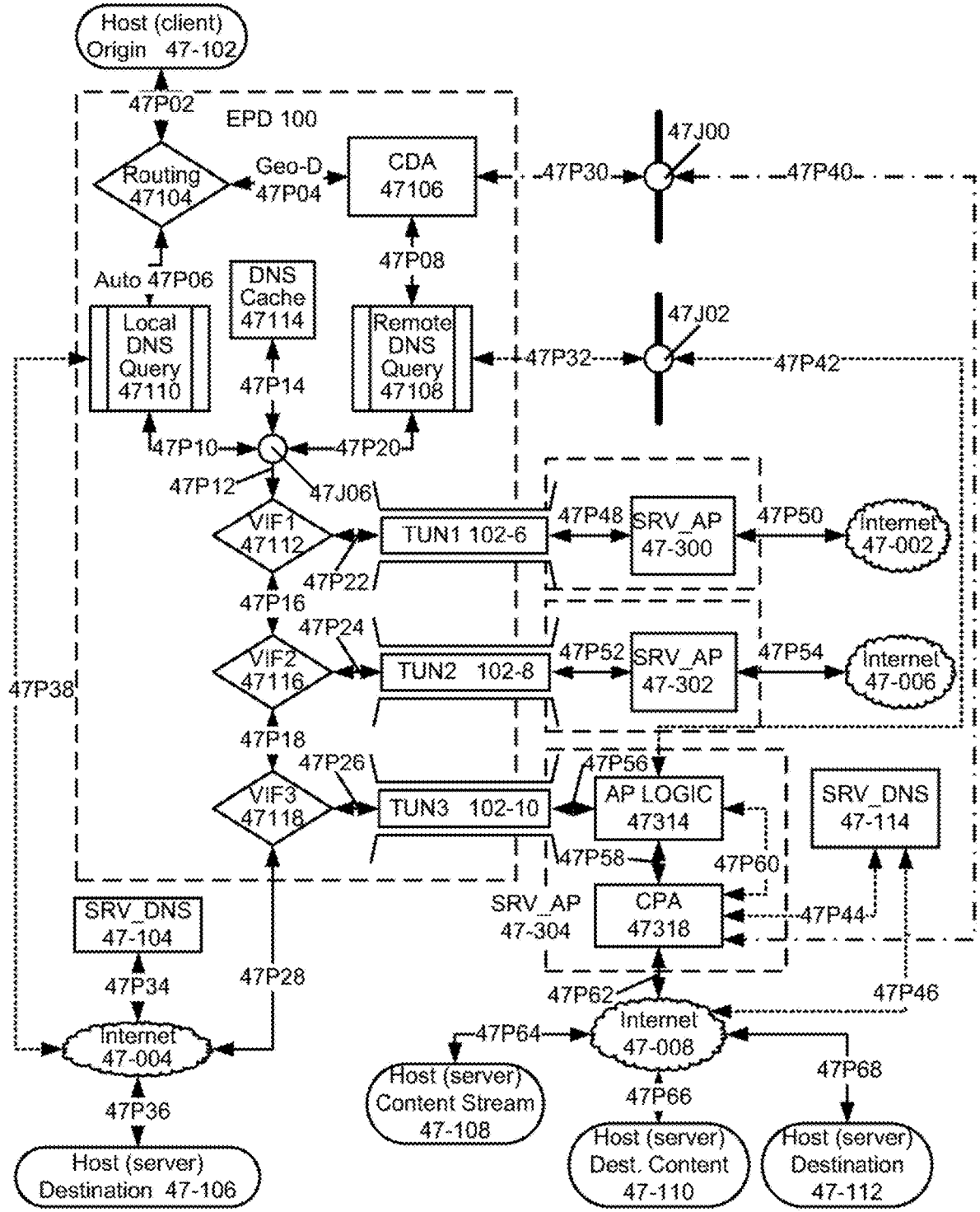
Figure # 47

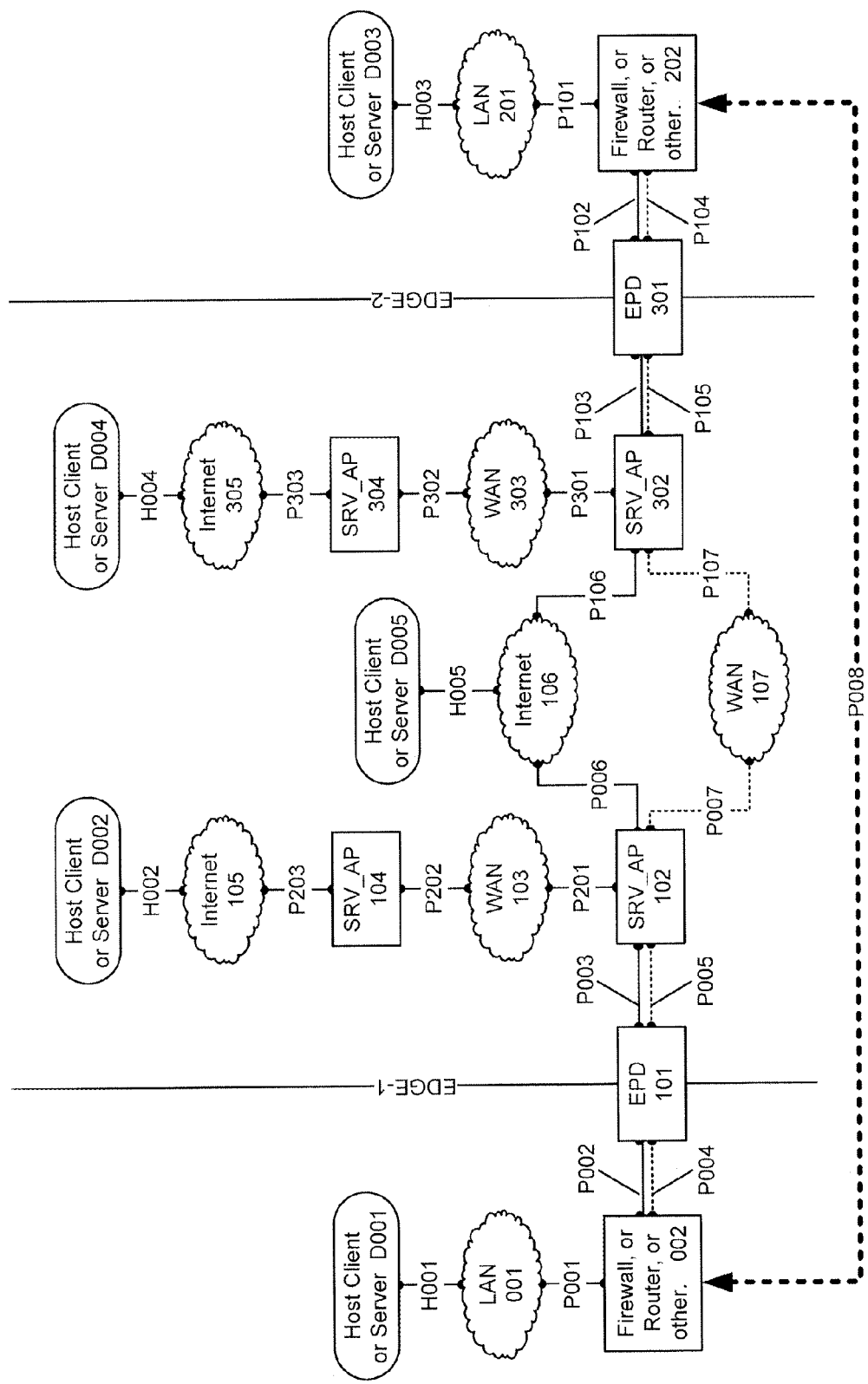
Figure # 48

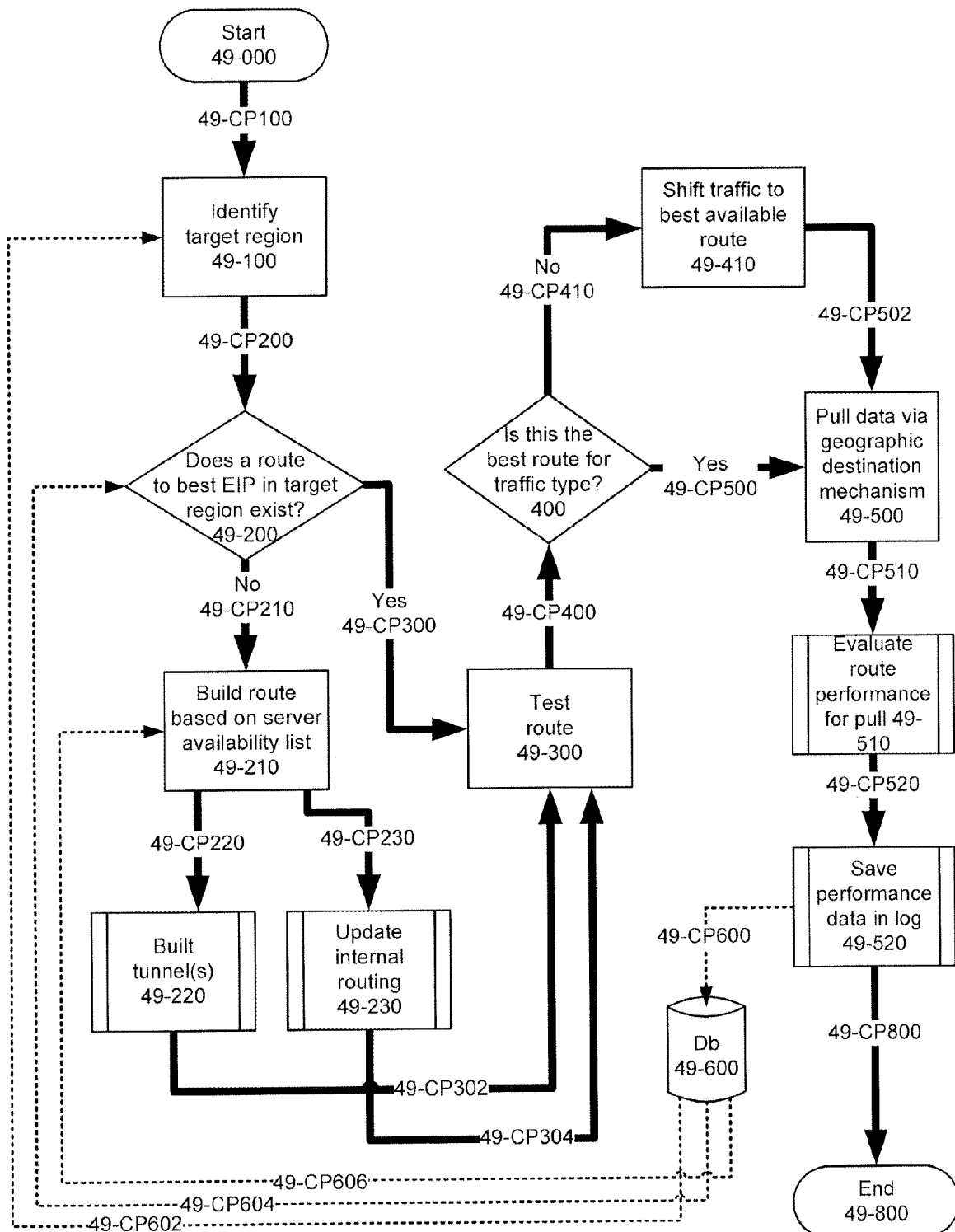
Figure # 49

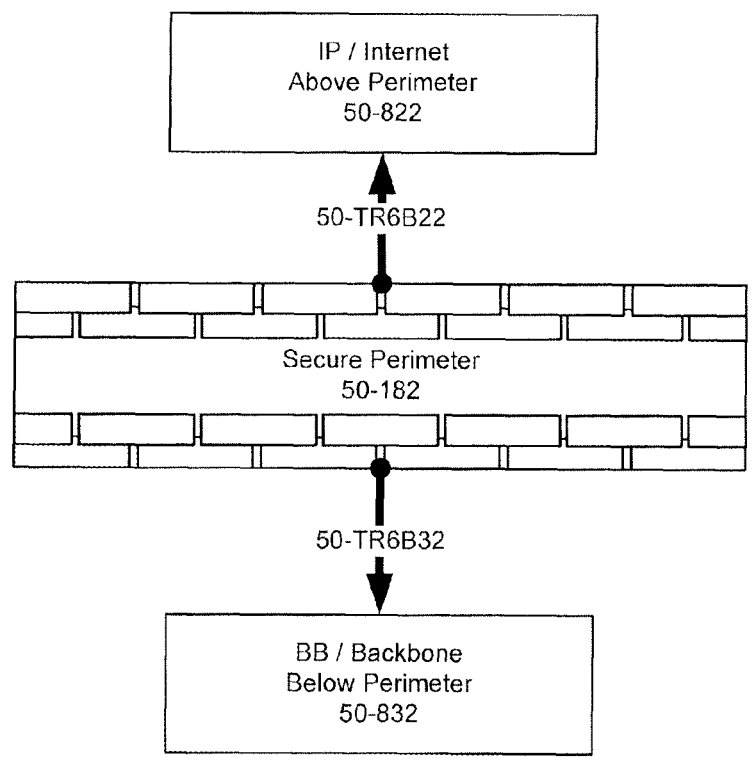
Figure # 50

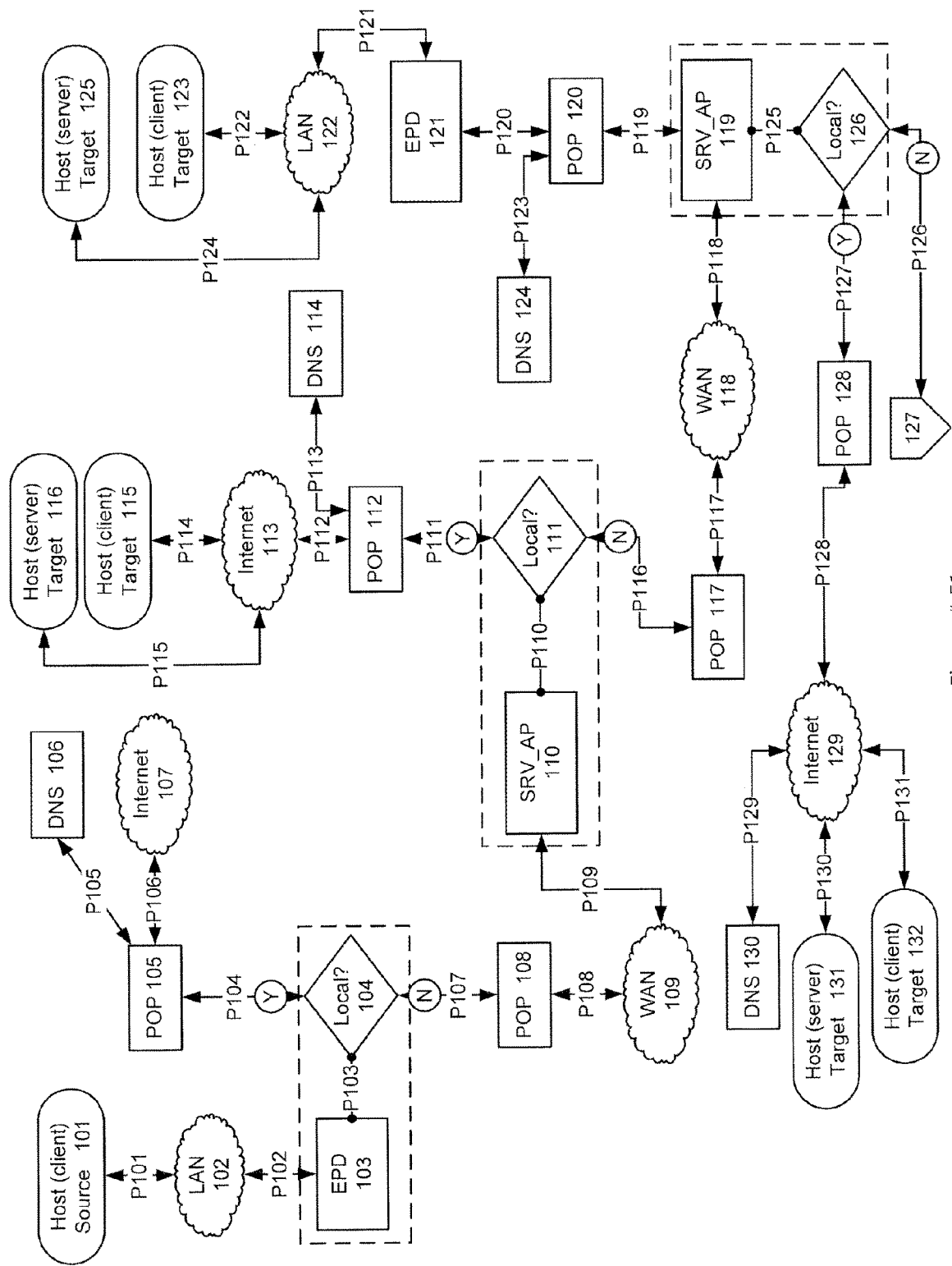
Figure # 51

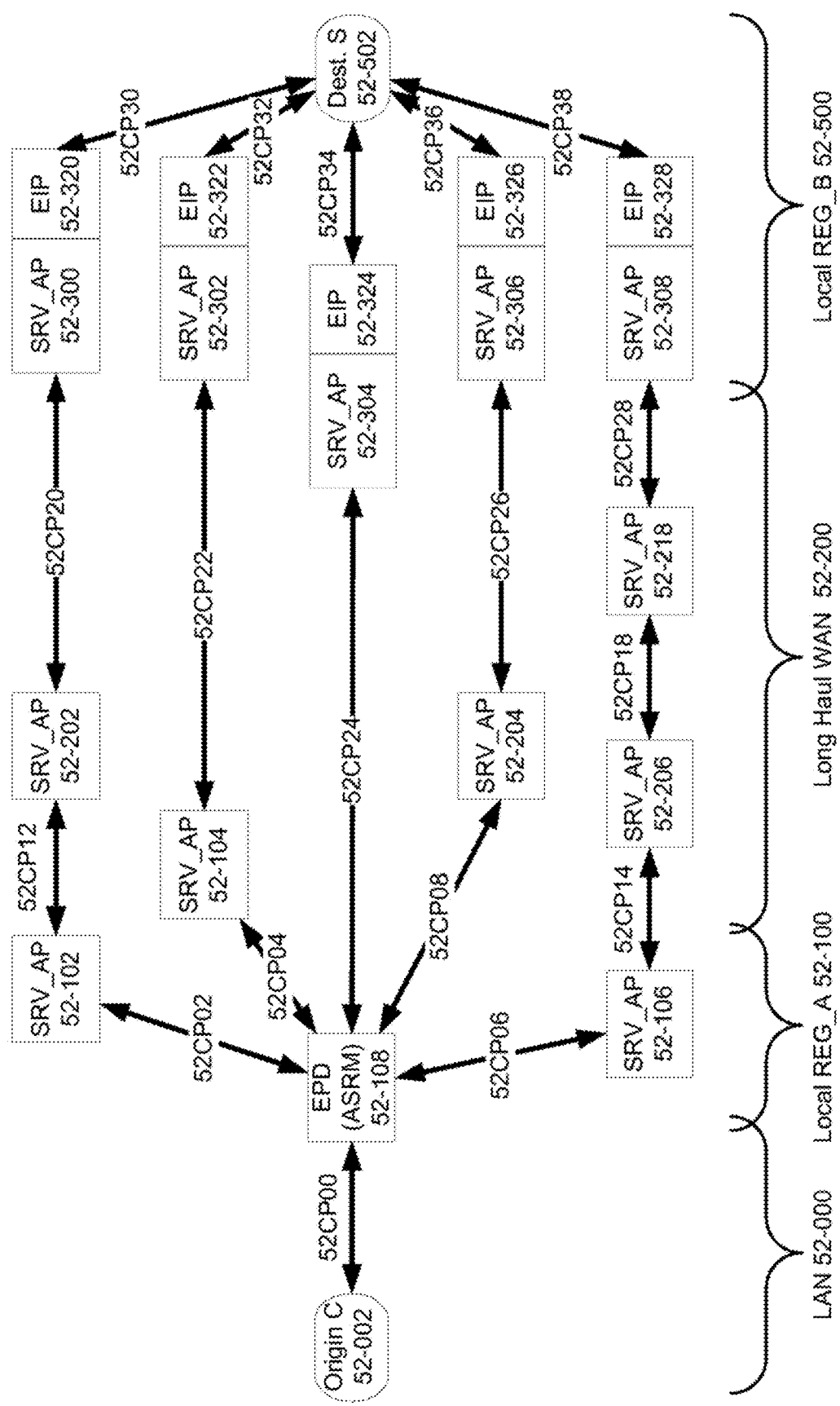
Figure # 52

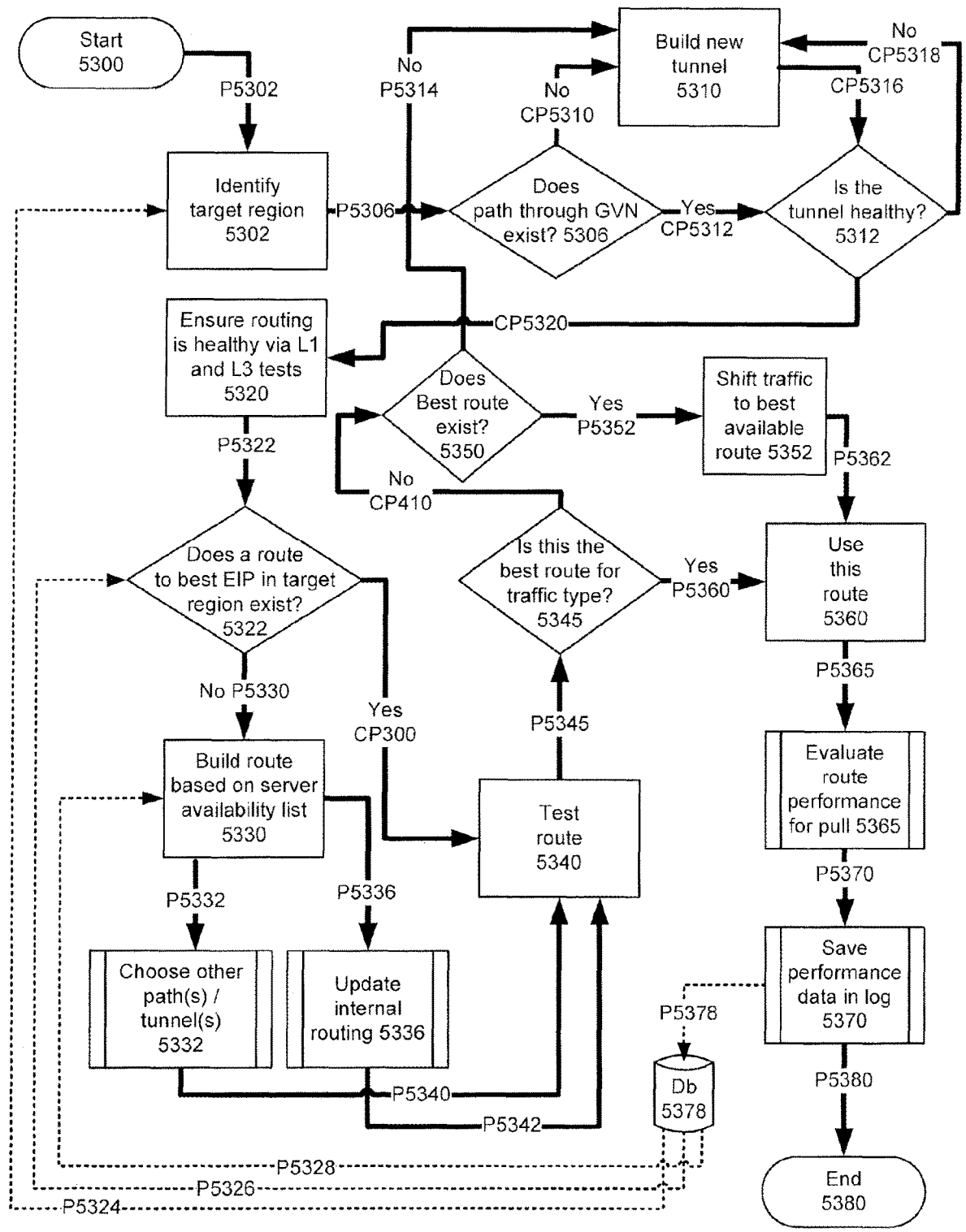
Figure # 53

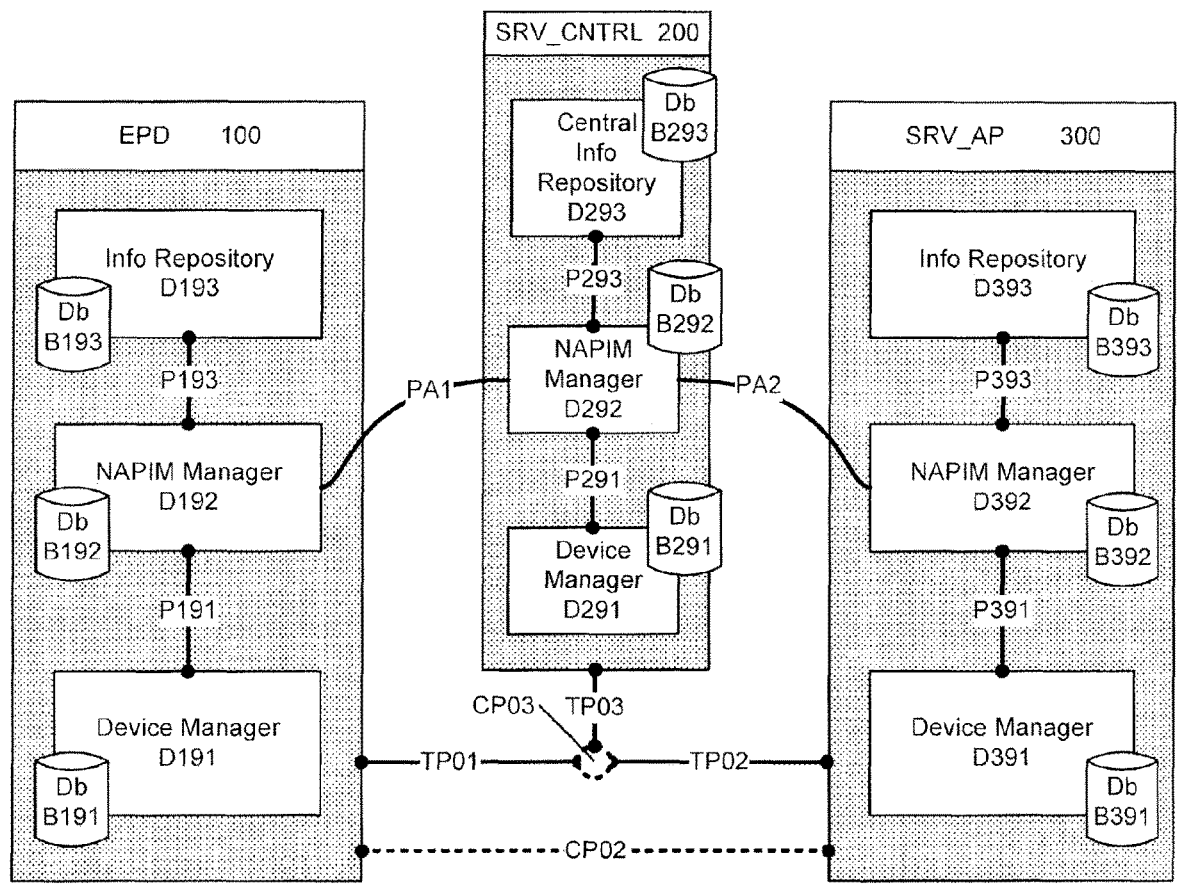
Figure # 54

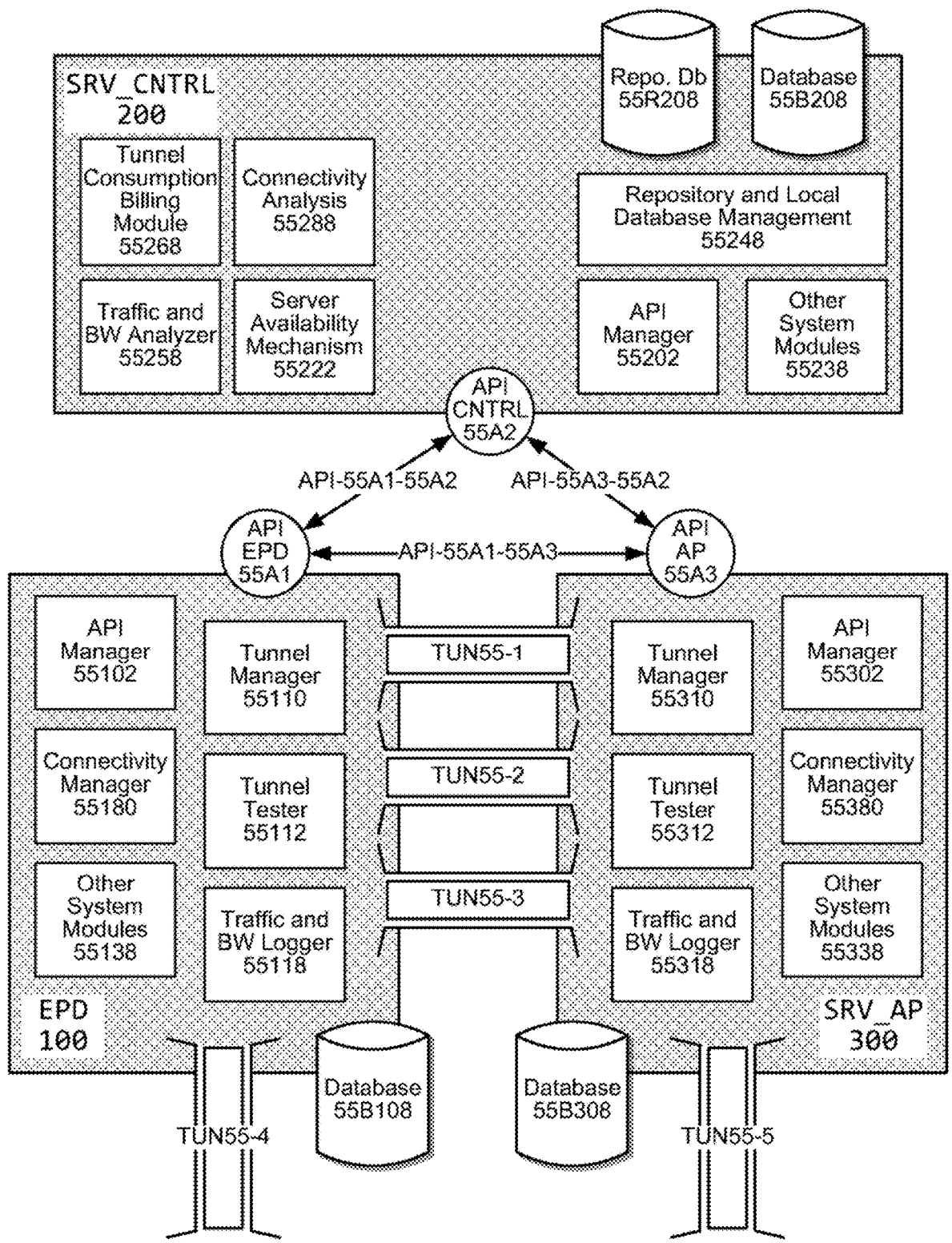
Figure # 55

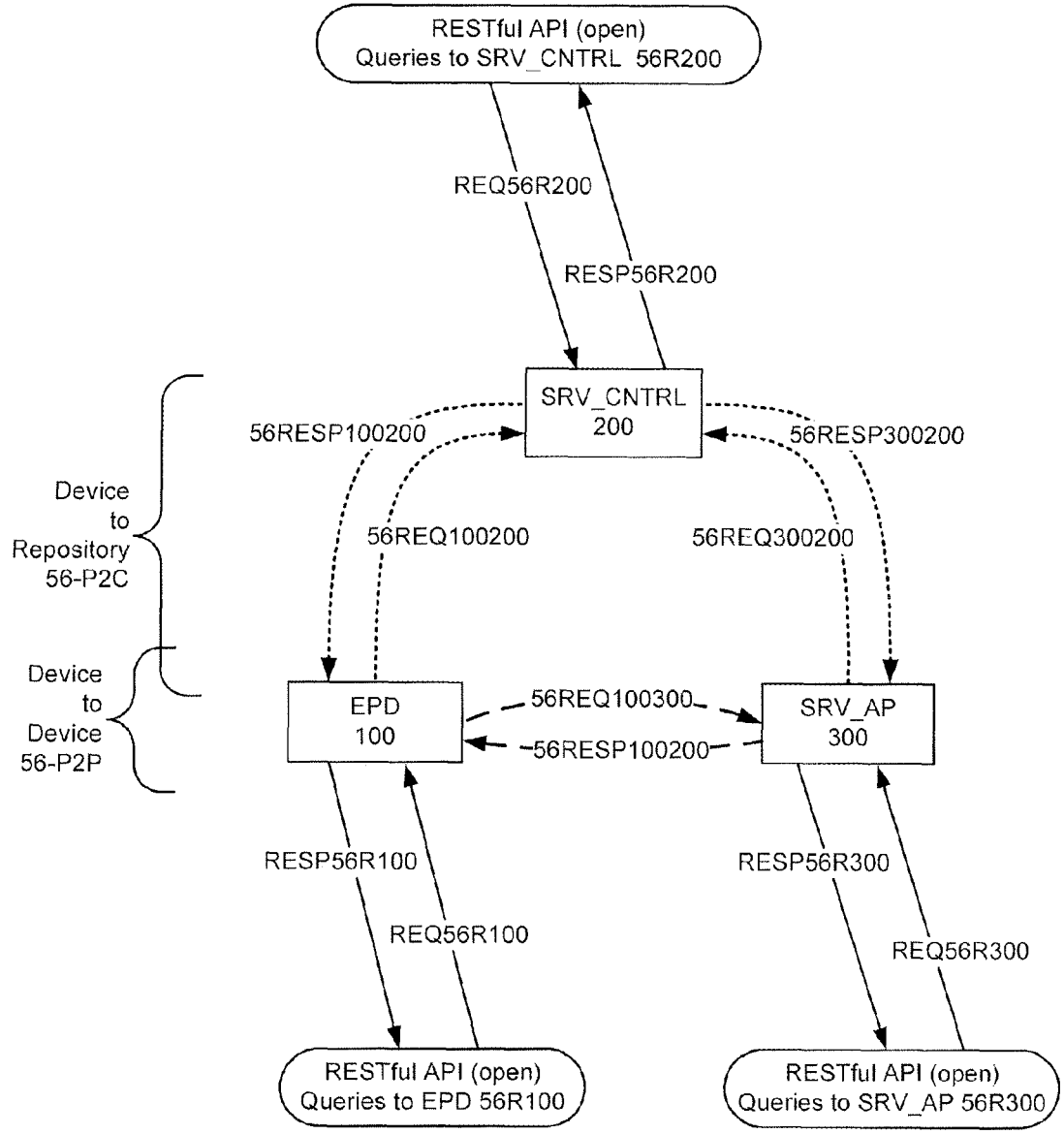
Figure # 56

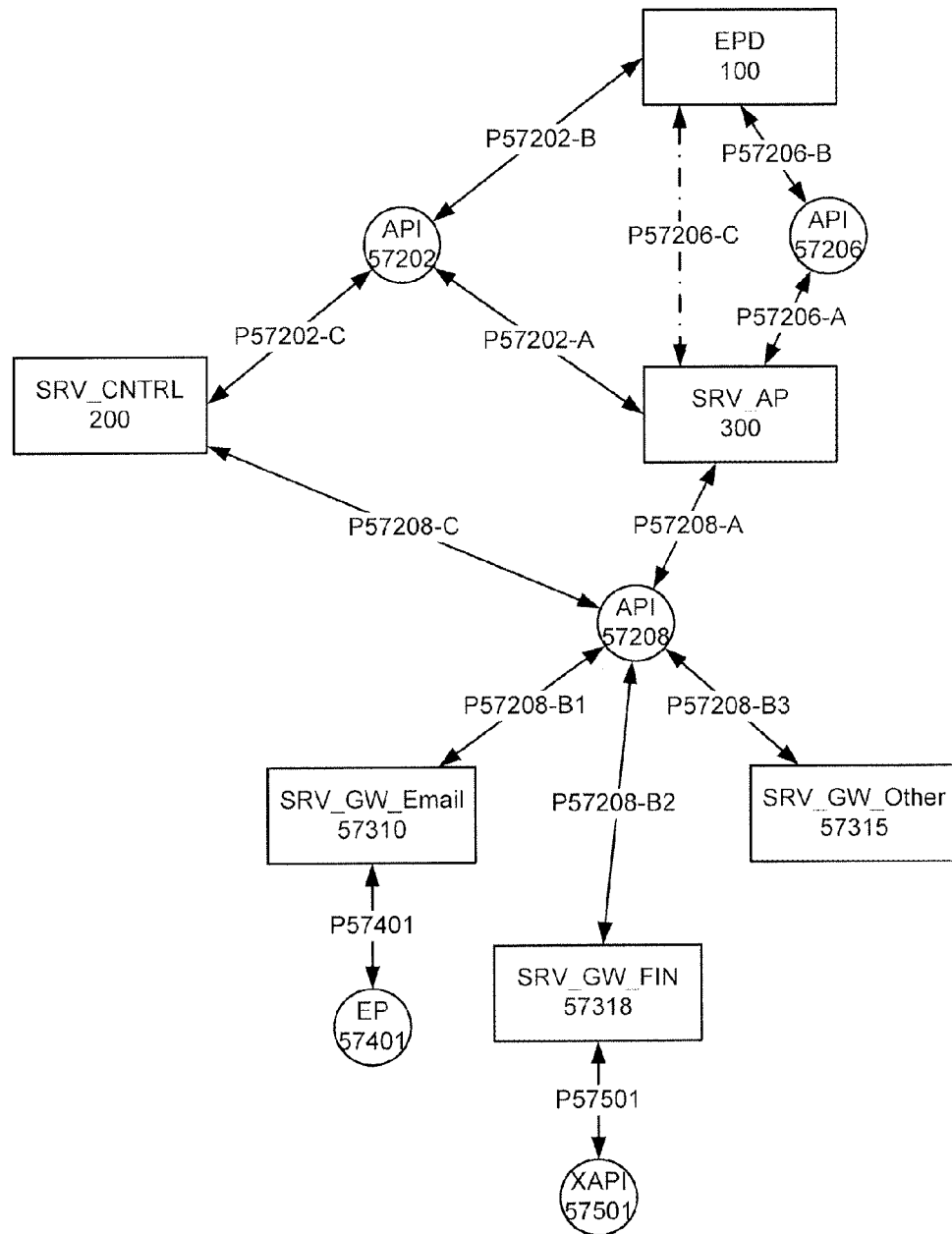
Figure # 57

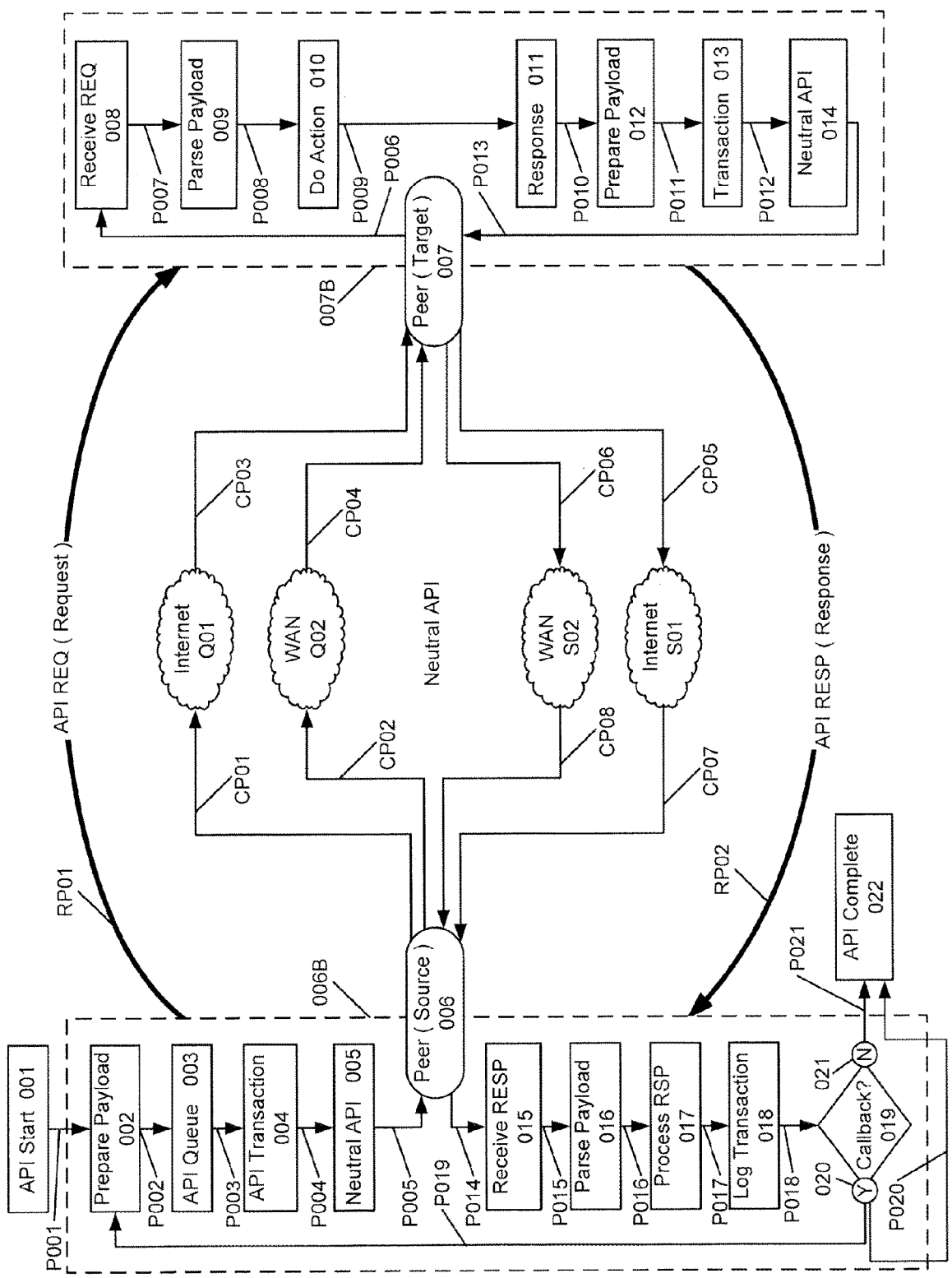
Figure # 58

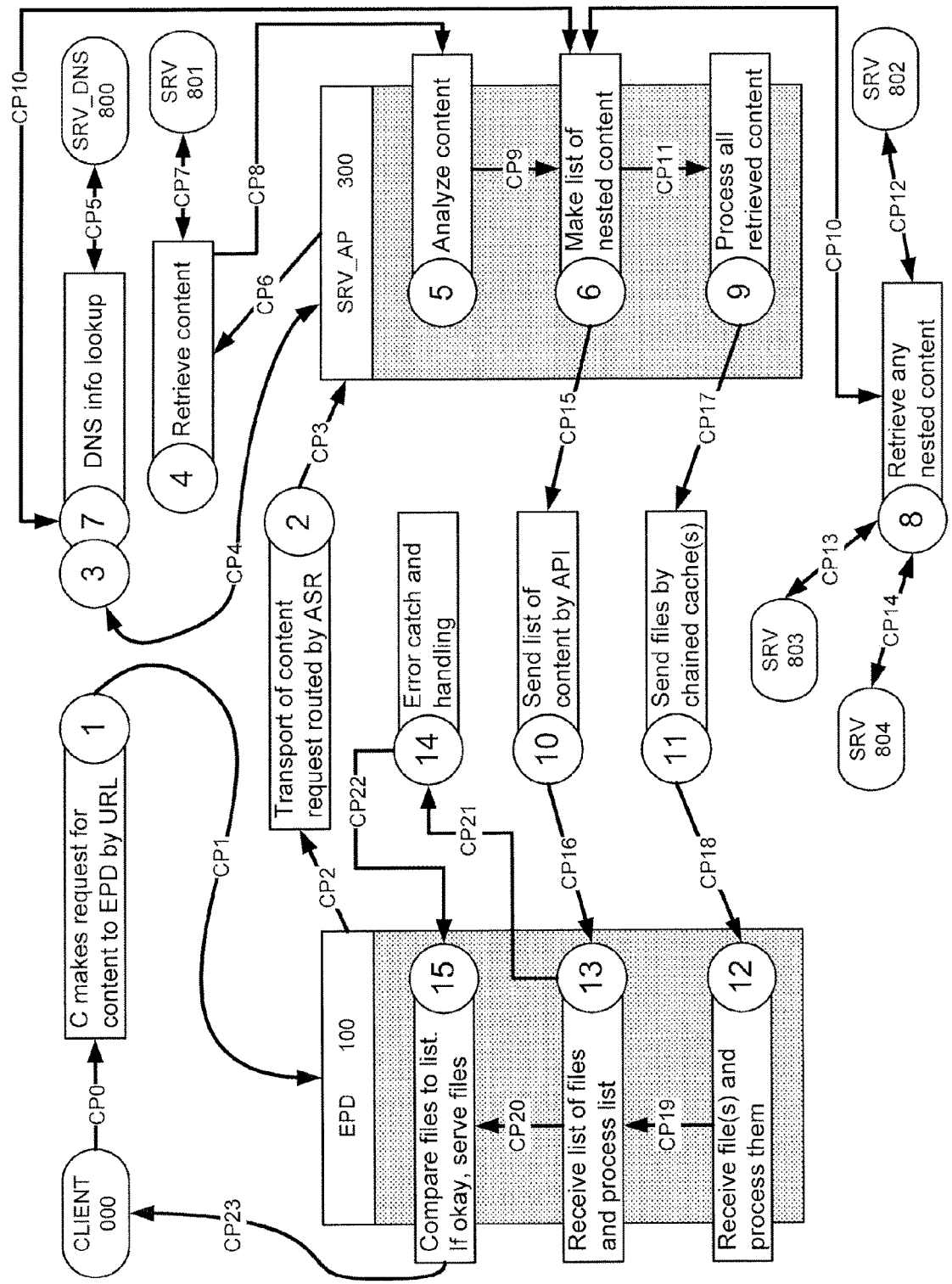
Figure # 59

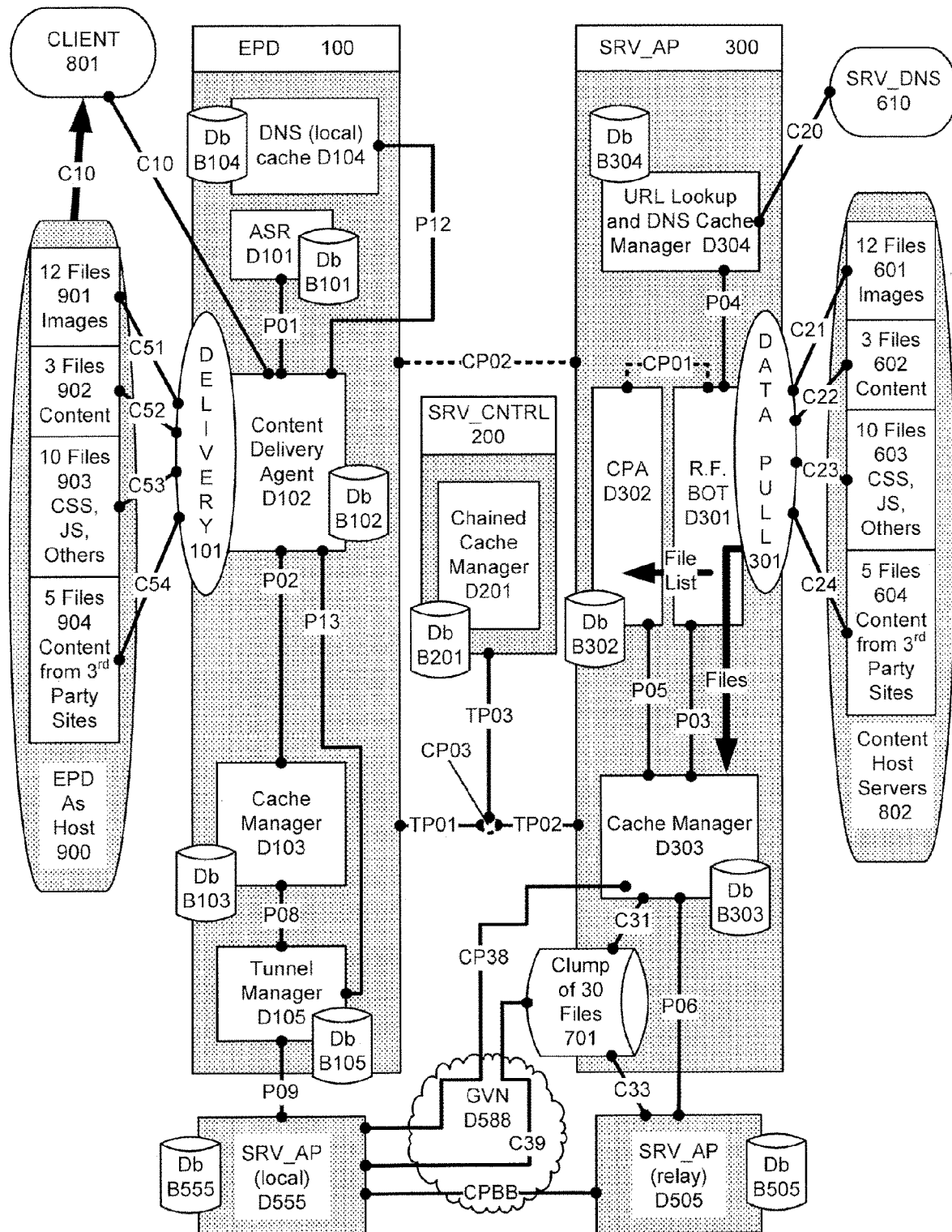
Figure # 60

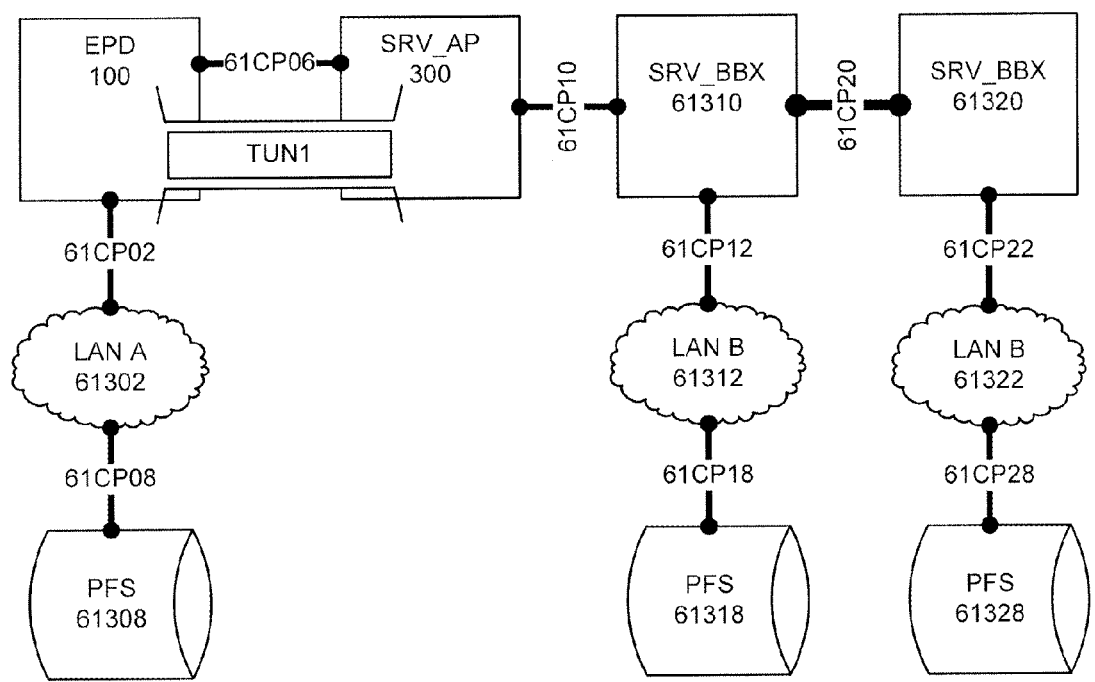
Figure # 61

SYSTEM AND METHOD FOR A GLOBAL VIRTUAL NETWORK

CROSS-REFERENCE TO RELATED APPLICATIONS

This application claims the benefit of and is a continuation of U.S. Non-Provisional application Ser. No. 17/589,753, filed Jan. 31, 2022, which is a continuation of U.S. Non-Provisional Application Ser. No. 16/815,864, now U.S. Pat. No. 11,240,064, filed on Mar. 11, 2020, which is a continuation of U.S. Non-Provisional application Ser. No. 15/546, 247, now U.S. Pat. No. 10,630,505, filed on Jul. 25, 2017, which is a U.S. National Stage application under 35 U.S.C. § 371 of International Patent Application No. PCT/US2016/ 015278, filed Jan. 28, 2016, which claims priority to: U.S. Provisional Application No. 62/108,987 filed on Jan. 28, 2015; U.S. Provisional Application No. 62/144,293 filed on Apr. 7, 2015; U.S. Provisional Application No. 62/151,174 filed on Apr. 22, 2015; U.S. Provisional Application No. 62/174,394 filed on Jun. 11, 2015; and U.S. Provisional Application No. 62/266,060 filed on Dec. 11, 2015, and is a continuation of International Application No. PCT/US2015/ 064242 filed on Dec. 7, 2015; International Application No. PCT/IB2016/000110 filed on Jan. 5, 2016; and International Application No. PCT/US2016/012178 filed on Jan. 5, 2016, all of which are incorporated herein by reference in their entireties. U.S. Provisional Application No. 62/089,113 filed on Dec. 8, 2014, and U.S. Provisional Application No. U.S. 62/100,406 filed on Jan. 6, 2015, are incorporated herein by reference.

FIELD OF THE DISCLOSURE

The present disclosure relates generally to networks, and more particularly, to the configuration and operation of a global virtual network (GVN).

BACKGROUND OF THE DISCLOSURE

While last mile connectivity has vastly improved in recent years there still exist problems with long distance connectivity and throughput due to issues related to distance, protocol limitations, peering, interference, and other problems and threats. A GVN offers secure network optimization services to clients over the top of their standard internet connection.

This is an overview of the constituent parts of a GVN as well as a description of related technologies which can serve as GVN elements. GVN elements may operate independently or within the ecosystem of a GVN such as utilizing the GVN framework for their own purposes, or can be deployed to enhance the performance and efficiency of a GVN.

This overview also describes how other technologies can benefit from a GVN either as a stand-alone deployment using some or all components of a GVN, or which could be rapidly deployed as an independent mechanism on top of an existing GVN, utilizing its benefits.

Human beings are able to perceive delays of 200 ms or more as this is typically the average human reaction time to an event. If latency is too high, online systems such as thin-clients to cloud-based servers, customer relationship management (CRM), enterprise resource planning (ERP) and other systems will perform poorly and may even cease functioning due to timeouts. High latency combined with high packet loss can make a connection unusable. Even if data gets through, at a certain point too much slowness results in a poor user experience (UX) and in those instances the result can be refusal by users to accept those conditions in effect rendering poorly delivered services as useless.

To address some of these issues, various technologies have been developed. One such technology is WAN optimization, typically involving a hardware (HW) device at the edge of a local area network (LAN) which builds a tunnel to another WAN optimization HW device at the edge of another LAN, forming a wide area network (WAN) between them. This technology assumes a stable connection through which the two devices connect to each other. A WAN optimizer strives to compress and secure the data flow often resulting in a speed gain. The commercial driver for the adoption of WAN optimization is to save on the volume of data sent in an effort to reduce the cost of data transmission. Disadvantages of this are that it is often point-to-point and can struggle when the connection between the two devices is not good as there is little to no control over the path of the flow of traffic through the Internet between them. To address this, users of WAN optimizers often opt to run their WAN over an MPLS or DDN line or other dedicated circuit resulting in an added expense and again usually entailing a rigid, fixed point-to-point connection.

In the marketplace at the time of writing of this patent, a group of venders focus on selling hardware but not connection services on the internet between their hardware devices. Another group of vendors are service providers who may provide a simple end point device or software which can be installed by their customers onto their own devices to connect to their service provider's cloud servers, as a link to the services that they provide as a bundle, but their main focus is on the provision of the services.

Direct links such as MPLS, DDN, Dedicated Circuits or other types of fixed point-to-point connection offer quality of connection and Quality of Service (QoS) guarantees. They are expensive and often take a significantly long time to install due to the need to physically draw lines from a POP at each side of the connection. The point-to-point topology works well when connecting from within one LAN to the resources of another LAN via this directly connected WAN. However, when the gateway (GW) to the general Internet is located at the LAN of one end, say at the corporate headquarters, then traffic from the remote LAN of a subsidiary country may be routed to the Internet through the GW. A slowdown occurs as traffic flows through the internet back to servers in the same country as the subsidiary. Traffic must then go from the LAN through the WAN to the LAN where the GW is located and then through the Internet back to a server in the origin country, then back through the internet to the GW, and then back down the dedicated line to the client device within the LAN. In essence doubling or tripling (or worse) the global transit time of what should take a small fraction of global latency to access this nearby site. To overcome this, alternative connectivity of another internet line with appropriate configuration changes and added devices can offer local traffic to the internet, at each end of such a system.

Another option for creating WAN links from one LAN to another LAN involve the building of tunnels such as IPSec or other protocol tunnels between two routers, firewalls, or equivalent edge devices. These are usually encrypted and can offer compression and other logic to try to improve connectivity. There is little to no control over the routes between the two points as they rely on the policy of various middle players on the internet who carry their traffic over their network(s) and peer to other carriers and or network operators. Firewalls and routers, switches and other devices from a number of equipment vendors usually have tunneling options built into their firmware.

A software (SW) based virtual private network (VPN) offers privacy via a tunnel between a client device and a VPN server. These have an advantage of encryption and in some cases also compression. But here again there is little to no control over how traffic flows between VPN client and VPN server as well as between the VPN server and host server, host client or other devices at destination. These are often point-to-point connections that require client software to be installed per device using the VPN and some technical proficiency to maintain the connection for each device. If a VPN server egress point is in close proximity via quality communication path to destination host server or host client then performance will be good. If not, then there will be noticeable drags on performance and dissatisfaction from a usability perspective. It is often a requirement for a VPN user to have to disconnect from one VPN server and reconnect to another VPN server to have quality or local access to content from one region versus the content from another region.

A Global Virtual Network (GVN) is a type of computer network on top of the internet providing global secure network optimization services utilizing a mesh of devices distributed around the world securely linked to each other by advanced tunnels, collaborating and communicating via Application Program Interface (API), Database (DB) replication, and other methods. Traffic routing in the GVN is always via best communication path governed by Advanced Smart Routing (ASR) powered by automated systems which combine builders, managers, testers, algorithmic analysis and other methodologies to adapt to changing conditions and learning over time to configure and reconfigure the system.

The GVN offers a service to provide secure, reliable, fast, stable, precise and focused concurrent connectivity over the top of one or more regular Internet connections. These benefits are achieved through compression of data flow transiting multiple connections of wrapped, disguised and encrypted tunnels between the EPD and access point servers (SRV_AP) in close proximity to the EPD. The quality of connection between EPD and SRV_AP's is constantly being monitored.

A GVN is a combination of a hardware (HW) End Point Device (EPD) with installed software (SW), databases (DB) and other automated modules of the GVN system such as Neutral Application Programming Interface Mechanism (NAPIM), back channel manager, tunnel manager, and more features which connect the EPD to distributed infrastructure devices such as access point server (SRV_AP) and central server (SRV_CNTRL) within the GVN.

Algorithms continually analyze current network state while taking into account trailing trends plus long term historical performance to determine best route for traffic to take and which is the best SRV_AP or series of SRV_AP servers to push traffic through to. Configuration, communication path and other changes are made automatically and on the fly with minimal or no user interaction or intervention required.

Advanced Smart Routing in an EPD and in an SRV_AP ensure that traffic flows via the most ideal path from origin to destination through an as simple as possible "Third Layer" of the GVN. This third layer is seen by client devices connected to the GVN as a normal internet path but with a lower number of hops, better security and in most cases lower latency than traffic flowing through the regular internet to the same destination. Logic and automation operate at the "second layer" of the GVN where the software of the GVN automatically monitors and controls the underlying routing and construct of virtual interfaces (VIF), multiple tunnels and binding of communication paths. The third and second layers of the GVN exist on top of the operational "first layer" of the GVN which interacts with the devices of the underlying Internet network.

SUMMARY OF THE DISCLOSURE

Systems and methods for connecting devices via a virtual global network are disclosed. The network system may comprise a first device in communication with a first endpoint device. The network system may comprise a second device in communication with a second endpoint device. The first and second devices may be connected with a communication path. The communication path may comprise one or more intermediate tunnels connecting each endpoint device to one or more intermediate access point servers and one or more control servers.

In accordance with other aspects of this embodiment, at least one of the first end point device and the intermediate access point servers is configured to perform a Domain Name System (DNS) lookup to locate the second device.

In accordance with other aspects of this embodiment, at least one of the first end point device and the intermediate access point servers is configured to perform a Domain Name System (DNS) lookup from a cache to locate the second device.

In accordance with other aspects of this embodiment, at least one of the intermediate access point servers is configured to cache content.

In accordance with other aspects of this embodiment, at least one of the end point devices and the intermediate access point servers is configured to perform smart routing based on a global virtual network.

In accordance with other aspects of this embodiment, the smart routing is based on at least one of best bandwidth, lowest latency, fewest hops, and no packet loss.

In accordance with other aspects of this embodiment, the smart routing is based on at least one of real-time statistics and historical statistics.

In accordance with other aspects of this embodiment, at least one of the end point devices and the intermediate access point servers is configured to perform firewall services.

In accordance with other aspects of this embodiment, the firewall services are between the first device and the intermediate access point servers.

In accordance with other aspects of this embodiment, the firewall services are between the first device and the intermediate access point servers and second endpoint device.

BRIEF DESCRIPTION OF THE DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

FIG. 1 shows a block diagram of technology used by and enabled by a global virtual network ("GVN")

FIG. 2 shows a high-level block diagram of the Internet.

FIG. 3 is a block diagram showing the resolution of Universal Resource Locator (URLs) to numeric Internet Protocol (IP) addresses via the Domain Name System (DNS).

FIG. 4 is a simplified illustration showing the upstream and downstream paths data takes from a host client device (C ##) to another host client or host server device (S ##).

FIG. 5 is a simplified illustration showing the boundary switches in the paths data takes from a host client device (C ##) to another host client or host server device (S ##).

FIG. 6 illustrates some example threats and problems which exist on the Internet.

FIG. 7 illustrates Content Delivery Network (CDN) resolution and delivery of regionally specific content.

FIG. 8 illustrates the operation of a proxy server.

FIG. 9 illustrates a point-to-point tunnel built between two gateway devices.

FIG. 10 shows the relationship of security features between device scope, system-wide scope, communications scope, and device collaboration.

FIG. 11 illustrates the information flow between devices of a Global Virtual Network.

FIG. 12 describes the stack for supporting the automation of some devices in a GVN.

FIG. 13 illustrates that GVN topology, including a backbone segment over internet or dark fiber.

FIG. 14 illustrates a distributed firewall (FW) in the cloud enabled by a GVN.

FIG. 15 illustrates a multi-perimeter firewall (MPFW) in the cloud empowered by a global virtual network.

FIG. 16 illustrates a logical view of the software architecture of three types of network devices working together as a part of a Global Virtual Network (GVN).

FIG. 17 illustrates a GVN using hub and spoke topology with a backbone and octagon routing.

FIG. 18 illustrates the backbone connections between some GVN Global Nodes and their corresponding service areas in North America, Europe and Asia.

FIG. 19 illustrates the connectivity between various devices within a GVN.

FIG. 20 illustrates how GVN modules and devices interact.

FIG. 21 illustrates additional details of how GVN modules and devices interact.

FIG. 22 illustrates how GVN modules and devices interact with other devices on the Internet.

FIG. 23 illustrates multiple tunnel connectivity between End Point Devices (EPD) and Access Point Servers (SRV_AP).

FIG. 24 is a simplified example diagram of how the internet works today taking into account hop count or time to live (TTL) as well as path taken due to peering relationships and related routing policies.

FIG. 25 illustrates the strategic positioning of infrastructure to enhance performance.

FIG. 26 illustrates how the GVN can incorporate technologies such as Network Slingshot.

FIG. 27 illustrates how tables on the databases of various GVN devices are related to each other.

FIG. 28 illustrates the collaborative effort between various modules, mechanisms, technologies and other components of the GVN.

FIG. 29 illustrates the Advanced Smart Routing (ASR) feature of a GVN.

FIG. 30 illustrates building a series of encrypted tunnels between a Client (C) and a Server (S).

FIG. 31 illustrates the flow of information required by two peers in a peer pair.

FIGS. 32-35 illustrate the third Layer of the GVN with respect to neutrality and security of the GVN tunnel.

FIG. 36 Illustrates the weaving together of various network fabrics into a network tapestry.

FIG. 37 Communication pathways in a GVN for automated device collaboration FIG. 38 illustrates the problems and challenges of dynamic tunnel building.

FIG. 39 illustrates the bridging of two LANs into a wide area network (WAN) via two or more EPDs.

FIG. 40 illustrates a Multi Perimeter Firewall Mechanism (MPFWM) running on a GVN.

FIG. 41 illustrates a GVN stack build over the top (OTT) of the Internet.

FIG. 42 compares the internet protocol IP stack, the OSI model, and the GVN network stack.

FIG. 43 illustrates global Internet flows between countries via many possible routes.

FIG. 44 compares the internet protocol IP stack, the OSI model, and the GVN network stack.

FIG. 45 illustrates a tunnel between two LANs via the GVN.

FIG. 46 illustrates GNV layer one, layer 2, and layer 3 operations.

FIG. 47 illustrates the Advanced Smart Routing (ASR) feature and elements of the Geo-Destination Mechanism of a GVN within an End Point Device (EPD).

FIG. 48 illustrates examples of various concurrent types of paths for traffic to take via the GVN.

FIG. 49 describes the automated advanced smart routing (ASR) from one device to a second device.

FIG. 50 illustrates the Secure Perimeter between the BB/Backbone layer Below Perimeter and the IP/Internet layer Above Perimeter.

FIG. 51 is a flowchart of Advanced Smart Routing (ASR) within a Global Virtual Network (GVN).

FIG. 52 is a flow chart of the various routes available through a GVN from an origin to a destination.

FIG. 53 is a flowchart of an algorithm governing the selection of traffic routing from a Start device to an End device.

FIG. 54 illustrates the modules required for automated device collaboration and information exchange in a GVN.

FIG. 55 illustrates the communications between EPD, SRV_CNTRL, and SRV_AP via the neutral API mechanism (NAPIM) of the GVN.

FIG. 56 illustrates various types of communications available between GVN devices via the NAPIM.

FIG. 57 describes API call groups between different types of devices within a Global Virtual Network (GVN).

FIG. 58 describes the steps taken for an API call from initiation on a client device through to sending to server device with a return back to client.

FIG. 59 is a flowchart outlining the interaction between the EPD and SRV_AP to achieve geographic destination functionality FIG. 60 describes device collaboration within a geographic destination FIG. 61 illustrates how a globally distributed parallel file system (PFS) can operate within a GVN.

DETAILED DESCRIPTION

Overview

FIG. 1 shows a block diagram of technology used by and enabled by a global virtual network ("GVN") including the GVN core elements G0, GVN modules G100, and technology enabled G200 by the global virtual network GVN. The GVN core includes an overview of the mechanism G1 and its constituent component parts of Topology G2, Construct G3, Logic G4, and Control G5 layers. The GVN core G0 also incorporates the relations to and with GVN Elements G6.

The GVN can include plug-in and/or stand-alone GVN modules G100 including but not limited to: Neutral API Mechanism ("NAPIM") G102, described in PCT/US16/12178; Geodestination ("Geo-D") G104, described in PCT/US15/64242, Advanced Smart Routing ("ASR") G106, Connect G108, and other modules G110 described in U.S. Provisional Application U.S. 62/151,174.

The GVN also provides a platform which can enable other technologies including but not limited to: Network Tapestry G202; MPFWM G204; Network Slingshot G206; Network Beacon G208, Granularity of a tick G210, and other technologies G212. These are described in in U.S. Provisional Application 62/174,394, U.S. Provisional Application 62/266,060.

GVN Modules (G100) and Technology (G200) enabled by GVN can operate on top of an existing GVN, as a component part of a GVN, or can be independent and utilize all or some isolated parts of a GVN to support their own stand-alone operations.

FIG. 2 shows a high-level block diagram of the Internet. The average user possesses a very cursory overview understanding of how the Internet functions. Host Source 2100 is the starting point and denotes a client device which could be a computer, a mobile phone, tablet, laptop computer or other such client. This client connects via the Internet 2200 to a host server 2300 to send or retrieve content, or to another host client 2303 to send or receive information.

A very non-technical user might assume that traffic to the host server follows path 2P002 without even understanding that their data will transit through the Internet. Or they might think that traffic would flow via path 2P006 directly to another client device.

A user with some more understanding of how it works would understand that traffic flows via path 2P004 to the Internet 2200 and then via path 2P102 to a Host server Target 2300 or via path 2P104 to a Host (client) Target 2302.

Users with some more technical knowledge will further understand that when sending an email, the this email will leave their client device 2100, transit via path 2P004 to the Internet 2200 and then via path 2P202 to a mail server 2202. Then the recipient of the email will make a request to retrieve the email via their host client 2302 along path 2P104 to the Internet and then down path 2P204 to the mail server 2202.

This is about as detailed as the average person's understanding of the Internet gets.

FIG. 3 is a block diagram showing the resolution of Universal Resource Locator (URLs) to numeric Internet Protocol (IP) addresses via the Domain Name System (DNS).

A content request 3000 or push from host client (C) 3100 to host server (S) 3300 as files or streams or blocks of data flows from host client (C) 3100 to the host server (S) 3300. The response or content delivery 3002 is returned from host S to host C as files or streams or blocks of data. The host client device 3100 in a Client-Server (CS) relationship with host server (S) makes requests to access content from the remote host server (S) or sends data to remote host server (S) via a universal resource locator (URL) or other network reachable address.

The initial connection from the host client (C) 3100 to the Internet 3206 is shown as 3P02—the connection from the host client (C) to a Point of Presence (POP) 3102 that can be directly facing. In other cases the host client (C) can be located in a local area network (LAN) which then connects to the internet via a point of presence (POP) and can be referred to as the last mile connection. The point of presence (POP) 3102 represents the connection provided from an end point by an internet service provider (ISP) to the internet via their network and its interconnects. This can be, but is not limited to, cable, fiber, DSL, Ethernet, satellite, dial-up, and other connections. If the URL is a domain name rather than a numeric address, then this URL is sent to domain name system (DNS) server 3104 where the domain name is translated to an IPv4 or IPv6 or other address for routing purposes.

Traffic from host client (C) 3100 to host server (S) 3300 is routed through the Internet 3206 representing transit between POPs (3102 and 3302) including peering, backhaul, or other transit of network boundaries.

The connection 3P04 between a POP 3102 and a domain name system 3104, used to look up a number address from a universal resource locator (URL) to get the IPv4 address or other numeric address of target server (S), can be directly accessed from the POP, or via the Internet 3206. The connection 3P06 from a POP 3102 of an ISP to the Internet 3206 can be single-homed or multi-homed. Similarly, the connection 3P08 from the Internet 3206 to the remote ISP can also be single-homed or multi-homed. This connection is generally, to the ISP's or Internet Data Center's (IDC) internet-facing POP 3302. The connection 3P10 from the remote ISP's POP 3302 to the host server (S) can be direct or via multiple hops.

The lookups from URL or hostname to numeric address via domain name systems is a standard on the Internet today and systems assume that the DNS server is integral and that the DNS server results are current and can be trusted.

FIG. 4 is a simplified illustration showing the upstream and downstream paths data takes from a host client device (C ##) to another host client or host server device (S ##). The numbers used in the device label such as C01 or S08 are used for labeling purposes to locate individual devices and the number itself does not mean or imply that one device is larger or more powerful than another.

FIG. 4 shows Host Client Devices (C ##), Host Server Devices (S ##), Switches (SW ##), Routers (R ##), Regional Routers (RR ##), Edge Routers (ER ##), Core Routers (CR ##). The communication path or pipe (P ##) denotes a connection between two devices and the line thickness is to represent the size or bandwidth capacity of the pipe. The thinner the line, the lower the megabits per second (Mbps). The thicker the line, the higher the amount of Mbps or gigabits per second (Gbps). The distances of the P ## are not to scale and the hop count or time to live (TTL) and latency or round-trip time (RTT) are not taken into account when noting the P ## between devices.

A simplified local area network (LAN) is downstream from the switch (SW) SW01. It consists of wire line connection P01 and P04 to client devices C01 and C04. Wireless connections are described with dotted lines P02 and P03 between a wireless hub WLAN01 and wireless client devices C02 and C03.

The connection P05 between the LAN and the point of present (POP) R01 of their internet service provider (ISP) can also be referred to as The Last Mile. This POP R01 is a hub which connects other spokes P06, P07, P08 and P09 to the corresponding switches of other clients such as SW02, SW03, SW04, and SW05. There is also an upstream path P16 to a regional router (RR) RR02.

This hub and spoke topology is shown for POPs R02, R03, and R04, their spoke connections (e.g. P10, P11, P12, P13, P14, P15, P51, P52, P53, P54, P55, P56, P57, P58, P86) to their respective switches (e.g. SW06, SW07, SW08, SW09, SW10, SW11, SW12, SW13, SW14, SW15, SW16, SW17, SW18, SW19, SW20), and their connections (e.g. P17, P18, P46, P28) to their regional routers (e.g. RR02, RR03, RR04, RR05).

A further upstream connection P19 from regional router RR02 to edge router ER02 describes the connection to the edge router of the ISP's network. Edge router ER02 has a link P20 to core router CR03. This can be thought of as the backbone of the internet. The link P32 between CR01 and CR02 can describe a very large type of backbone called a backhaul network or when connecting various countries networks can be called international backhaul network.

The POPs R01 and R02 are both connected to regional router RR02 and this can, but is not limited to, denote that these two POPs are located within the network of the same ISP.

For connectivity between devices within router R01's networks and devices within router R04's networks, the traffic will follow one of many possible paths such as P16→P19→P20→P30→P31→P24→P27→P28. This likely describes the connectivity peering between the networks of two or more distinct ISPs and in the middle potentially other carrier peers depending on the owner of infrastructure that the traffic transits through. The traffic going through the backbone will be carried by the potentially highest capacity pipes. Traffic between router R01 and router R04 could also travel via path P16→P41→P44→P23→P27→P28. While the path might seem shorter, this second path might be the least efficient because of the size of the pipes, the intermediary devices, peering relationships and the policies of a middle ISP, in control of edge router ER03 for carrying the traffic between two other ISPs. There may also be choke points between them.

Another feature shown is in the connectivity of host servers S08 to S12 which are connected to switch SW13. This could be in an internet data center (IDC) or in a LAN. Switch SW13 connects both to router R03 via P53 and to regional router RR04 via P46. The connection P46 may describe a leased line or direct digital connection for enhanced connectivity.

Another feature shown in this figure is that P32 is as upstream as a path can get and individual host devices are as downstream as a path can go. Downstream from core routers CR04, CR06 and CR07 are edge routers ER ## connected to regional routers RR ##, which are connected down to the routers R ## located in POPs.

There may be other possibilities not described herein and in reality each router R ## has many more spokes to switches SW ## and there are extensively many more pipes P ## between devices. There may also be more layers of equivalent regional routers RR ## or edge routers ER ## devices or others in sequence.

FIG. 5 is a simplified illustration showing the boundary switches in the paths data takes from a host client device (C ##) to another host client or host server device (S ##). This is very similar to FIG. 4 with one exception. On the backbone between core router CR01 and core router CR02, at some point on the peering path between them, there are a series of boundary switches 400 which each have a limited capacity in relation to the backbone as a whole, and there can be congestion events through these switches.

FIG. 6 illustrates some example threats and problems which exist on the Internet. The network data paths have been simplified to describe an overview of connectivity with focus on threats from End Point Devices (EPD) and other threats from intermediary devices.

A request from a host client device C002 to retrieve content from host server device 207 should follow the path P109→P105→P103→P102→P101 and transit the Internet 101 to CP01→CP02→P205→P207. There may be a load balancer at the legitimate Internet Data Center (IDC) which may send traffic to a healthy host server 207 (via P207) or an infected host server 206 (via P206). The infected host server may send malware or viruses or other bad content back to the client device C002.

Another threat is the redirect of legitimate traffic to a spoofed host server 114. Traffic should follow the path between C02 and 207 as described above, however a spoofed server may syphon off legitimate traffic. The traffic will still follow a path such as P109→P105→P103→P102→P101 and transit the internet 101 but instead of transiting to CP01 on the way to the legitimate server, the traffic transits via P113 to P114 and is delivered to the Spoofed Server 114.

A spoofed server may be designed to phish for confidential information or credentials or other data by looking like the real server to internet users. The average user may not be able to differentiate between a legitimate server and a spoofed server. Spoofed servers may also be utilized by a third party to block the delivery of legitimate traffic to clients by either sending null traffic back or changed content.

Public Domain Name Systems (DNS) servers are available on the internet to be queried by client devices to translate uniform resource locator (URL) such as a domain name www.thisdomain.com into a numeric IP address such as an IPv4 or IPv6 address so that the traffic from the host client device can find its way to the host server device.

If a DNS server such as 212 or 116 is poisoned 112 or spoofed 114, the translated numeric IP address may be incorrect leading traffic to go to an illegitimate or compromised destination device. Another way DNS can be corrupted on the internet is if a device is improperly operating either not delivering results or by delivering incorrect results. Propagation of changes from master DNS registry servers to DNS servers also requires clear and valid connectivity or indexed results can become stale and inaccurate. An example of how to protect and secure DNS lookups is illustrated by a Secure DNS (DNSSEC) Server 110 and its connectivity via P19. This relies on the ability for client devices to connect to the DNS server 110 and for their handshakes to not be interrupted.

Even when both host client and host server devices are operating correctly, as the internet is not encrypted, there is a very real risk that a sniffer or interception device 204 interjected into a middle point within a communication path to a host server such as a mail server 203 could intercept and capture data. While traffic to the mail server 203 should flow from the internet 201 via P202 to POP 202 to P203 to the mail server 203, a sniffer or interception device 204 will pull traffic via P204 through it 204 and to P222. It is very hard to detect this kind of interference unless one specifically can identify the IP address of a hop in a communication path as belonging to a nefarious device rather than just another router as part of the infrastructure of the internet.

A growing threat is from BOT nets comprised of groups of infected devices 213, 215, 216 controlled by command and control (C&C) servers such as 214. These devices can acting in unison to carry out bulk attacks such as distributed denial of service (DDoS) where host server devices can get overwhelmed by too many requests that flood their capacity resulting in the severing of requests from legitimate host client devices to either be slow or not resolve at all.

BOT nets can also be utilized to carry out stealthy hacking attacks under the coordination of C&C servers whereby the multitude of different source IP addresses trying dictionary password attacks are harder to completely block than the same attack would be if from a single IP address.

BOT nets are also a distribution mechanism for SPAM emails, phishing emails, malware distribution and other nefarious purposes.

National firewalls such as 304 are a hindrance to the free flow of information. These can either serve as censorship tools to block the flow of traffic which a country deems undesirable. It can also serve as an interception device to stealthily pilfer industrial, commercial or other secrets. Depending on the time of day, total internet traffic and health of these national firewalls, traffic transiting through them could experience a latency delay, or packet loss, or be shaped to a maximum bandwidth forming a bottleneck, or a combination of all of the above or even other problems.

The above noted example embodiments describe only some problems and threats. Many more exist and new threats crop up from time to time.

FIG. 7 illustrates Content Delivery Network (CDN) resolution and delivery of regionally specific content. Content Delivery Networks (CDN) can offer significant advantages in speed and flexibility and load balancing when serving content to clients. Content requests 7REQ000 flow from host client (C) 7100 to a host server (S) and the reply 7RESP002 flow of content delivery returns from the host server (S) to the host client (C) 7100 as files or streams or blocks of data.

The host client (C) 7100, can be a device such as a laptop, desktop computer, phone, tablet, or other device that acts as a client in a Client-Server (CS) relationship with the host server (S). The host client (C) makes request(s) to access content served by a remote host server (S) via a universal resource locator (URL).

The POP 7102, DNS server 7104, Internet 7300 operate in the usual manner as described above.

In the case of CDN infrastructure, CDN Map Markers 7200 operates in coordination with CDN control server(s) 7202. The CDN Map Markers 7200 and CDN control servers 7202 determine which region the host client device is located in and which CDN server the host client should connect to for content to be served. For example, If the host client 7100 is in Region A, it will be routed to the CDN server in Region A 7504 via the server's POP in Region A 7404. Host clients 7100 in Region B will connect to a CDN server in Region B 7502 via the server's POP in Region B 7402. Host clients 7100 in Region C will connect to a CDN server in Region C 7500 via the server's POP in Region C 7400.

The initial CDN Map Marker 7200 lookup via 7P00, via POP 7102, via 7P004 may be very quick or could take a relatively high lookup time if the CDN Map Marker server is located in a region far from the client device. Once the lookup is done, traffic will flow to the nearest and or best available CDN Server via 7P008.

For the sake of illustration of this figure, a region is defined as a geographic area which is different from another geographic area. It does not necessarily represent a large area but could be so and it also could represent a great distance from one region to another or they could be very close to each other. The key point is that clients in one region are to receive content via a CDN server from that region and not from another region.

In this example embodiment, the content for each region is different from the content of other regions. Between CDN servers 7500, 7502, and 7504 and the Origin Server 7600 are Content Regional Servers 7700, 7702, and 7704 which publish the regionally specific content to CDN servers in each region to be served to clients in their respective regions.

When a client 7100 in one region, for example region C, wants content served by a server 7502 or 7504 from another region, no matter what they do, they will only be served content from the server 7500 in their region. They cannot access other content even if they try to force it to connect to the content server in the region from which they desire to receive content. They keep being served content from their region without choice. Local DNS lookup 7104 resolves with IP pointing only to their region's CDN server 7500. This may be due to a Global IP address which maps to only a CDN in their region (if global IP) or another reason. The result is that the client could be geo-blocked at 7P404 or 7P402.

Normal connection via 7P008 based on current Geo-Location is not subject to blocking and traffic flows so that host client 7100 receives content for that Geo-Location via host server 7500.

For targets different from Current Geo-Location 7502 and 7504, traffic is stopped at 7P402 and/or 7P408 and the host client is denied content from the remote geo-destination(s). They may be forced to connect to the server in their current location 7500 or receive nothing or an error message or just undesired content depending on the configuration and policy of the CDN control system 7202.

FIG. 8 illustrates the operation of a proxy server. Content requests or pushes 8REQ000 flow from host client (C) to host server (S) as files or streams or blocks of data. Content delivery 8RESP002 is returned from host server (S) to host client (C) as files or streams or blocks of data. Host client 8100, a client device in Client-Server (CS) relationship with host server 8500 makes request to access content from the remote server (S) via a universal resource locator (URL). This request goes through a gateway (GW) device 8102 running proxy client software. In other cases, the proxy client software can be running directly on the host client 8100. The proxy client software connects to a Proxy Server 8306 via a tunnel, encrypted or unencrypted, via path 8P02 from the gateway GW 8102 to point of presence (POP) 8200, via path 8P04 to WAN 8308 (part of the Internet), via path 8P6 to the Proxy Server 8306 in a remote region. The traffic egresses from the proxy server 8306 via path 8P16 into the open internet 8300 and connects to host server 8500 in target region via path 8P12 to POP 8302, and then via path 8P10.

The host server views the traffic as coming from the IP address and geo-location of the proxy server. If this IP is in the same region as defined by the server in the target region, the desired content will be served. To aid in this localization, proxy servers will usually connect to DNS servers 8404 in the same region as the proxy server is located.

FIG. 9 illustrates a point-to-point tunnel TUN built between two gateway devices 9A1 and 9B1. Each device 9A1 and 9B1 is at the edge 9EDGE-1 and 9EDGE-2 between the internet EH3 through EH15 and their corresponding local area network (LAN) 9A2 and 9B2.

The baseline from EH1 through EH17 describes the number of hops from point to point. The number of hops from EH3 to EH15 is hypothetical and provided for illustrative purposes and may be more or less in real world connection paths. The number of hops that clients utilizing the tunnel 9TUN from 9A2 to 9A1 to 9TUN to 9B1 to 9B2 will be approximately four or five visible hops.

This example embodiment describes a scenario where the LAN 9A2 connects through their gateway 9A1 to the network of one internet service provider 9ISP-1 and where LAN 9B2 connects through their gateway 9B1 to another internet service provider 9ISP-3. This example embodiment further illustrates that 9ISP-1 does not peer directly with 9ISP-3. Both 9ISP-1 and 9ISP-3 have a requirement that their network traffic in both directions must transit through the network of another internet service provider 9ISP-2. Interconnection between 9ISP-1 and 9ISP-2 is defined as peering point 9PP-01 and from 9ISP-3 to 9ISP-2 as 9PP-02.

The point of this example embodiment is to illustrate that over the internet, it is common for a third-party internet service provider or equivalent such as a backbone or backhaul provider to carry the traffic of other internet service providers. There is little to no control by 9ISP-1 or 9ISP-3 over how 9ISP-2 will carry their traffic. While customers 9A2 of 9ISP-1 are able to directly complain about service issues to their provider 9ISP-1 and 9B2 can complain directly to 9ISP-3, if the issue is with 9ISP-2 then there is very little that 9A2 or 9B2 can do to directly influence 9ISP-2.

Potential congestion points can occur on any device but 9PP-01 and 9PP-02 are areas of concern as they are peering points. There is limited control over routing and quality of service of the total connection. As a consequence it may be difficult for point-to-point tunnels to maintain a high-quality, stable connection over distance, especially when there are portions of traffic transiting third party networks.

FIG. 10 shows the relationship of security features between device scope 1080 and system-wide scope 1090. It also notes communications scope 1098 and device collaboration 1089.

With respect to device scope 1080, the GVN protects client privacy of their data, network data flow, credentials, peer pair information, as well as protecting the physical device from hacking, the proprietary code contained therein from tampering or theft, and other threats.

System-wide scope 1090 entails protection from hacking or other offending traffic such as DDoS attacks, guards against malfunction, does routing around sub-optimal devices or paths, balances and spreads load, and protects against the running out of resources, IP addresses, or other global issues.

Communications scope 1098 focuses on the pathways for traffic push through the GVN predominantly through traffic tunnels TUN. It also covers the egress ingress points (EIP) between external networks and the internal network of a GVN. Protects from stream hijacking, man-in-the-middle attacks, poisoned information sources (such as bad DNS, etc.), and other threats. Furthermore, testing of quality of various network segments and their properties allows for the GVN to be able to understand complete path QoS and to route around problems.

The device collaboration 1089 security features are in place to protect the operational integrity of the various devices within a GVN. Secure back channel, anti-hacking mechanism, DNS safety net, various protections of Db such as rotating keys, neutral API mechanism (NAPIM), automated testing, updating, peer pairs relationships, validation and other modules ensure that system integrity is maintained.

FIG. 11 illustrates the information flow between devices of a Global Virtual Network. A central repository comprised of database B200 and file storage HFS200 resides on a Central Server (SRV_CNTRL) 200.

Communication paths between devices labeled P ### can represent an API call, database replication, direct file transfer, combination such as database replication through API call, or other form of info exchange. The thicker lines of 11P200100, 11P200300, 11P200500, 11P100200, 11P100300, 11P10011500, 11P300200, 11P300500, and 11P500200 represent communications between GVN devices which have a peer-pair and therefore privileged relationship with each other.

There is circular pattern of peer-pair communication illustrated from SRV_CNTRL 200 to EPD 100 via 11P200100, to SRV_AP 300 via 11P200300, or to other devices 11500 via 11P200500. The EPD 100 communicates with SRV_CNTRL 200 via 11P100200, SRV_AP 300 via 11P100300, and other devices 11500 via 11P1001500.

In some instances, there will be a loop of information shared between devices such as in the case when an EPD 100 may request information via 11P100200 from SRV_CNTRL 200 which is sent back to EPD 100 via 11P200100.

In other instances, one device may report information relevant to other devices such as an SRV_AP 300 reporting via 11P300200 to SRV_CNTRL 200 which is then sends information via 11P200100 to EPDs 100 and SRV_APs 300 other than the reporting SRV_AP 300 via 11P200300 and to other devices 11500 via 11P200500.

In yet other instances a full loop is not required such as the sending of log information from a device such as an EPD 100 to SRV_CNTRL 200 via 11P100200, there is no need to further forward this information onward. However, logging information may at a later time be moved from repository on SRV_CNTRL 200 to a long-term log storage server 11500 via 11P200500.

Direct link 11P100300 is between devices EPD 100 and SRV_AP 300. Direct link 11P300500 is from SRV_AP 300 to other devices 11500. Direct links involve communications between devices which do not need involvement of SRV_CNTRL 200.

The PUSH info from SRV_CNTRL 200 could be an RSS feed or other type of information publishing via 11P306. The API from SRV_CNTRL 200 could be either a traditional API transaction or RESTful API call with request made via 11P302REQ and response received via 11P302RESP. The PUSH info and API elements are presented to illustrate devices which do not share peer-pair relationships, privileged status, and or similar systems architecture with GVN devices.

FIG. 12 describes the stack for supporting the automation of some devices in a GVN. In particular this figure shows the modules required for automated device collaboration and networking plus O/S management EPD 100 is the endpoint device. SRV_AP 300 is an access point server which is located in the target destination region. SRV_CNTRL 200 is a central control server accessible by both the EPD and the SRV_AP as well as by other devices which may support a graphic destination mechanism, or other GVN module, component or server.

Each device EPD 100, SRV_AP 300 and SRV_CNTRL 200 stores information about itself in a local information repository in the form of lists, files, database tables and records, and other means. This repository also contains information about peer device relationships, stores logs, plus other relevant operational information. The SRV_CNTRL 200 also has additional storage functionality and its role is to provide information to other devices relevant to them and or to the peer devices which they may connect with, to evaluate current conditions and provide centralized control-like guidance such as the publishing of a server availability list and other functionality. A neutral API mechanism (NAPIM) can send info between devices and the peers which they connect with, and can also be used to update the API itself.

The database S293 on the SRV_CNTRL 200 acts as a repository for information about itself as well as a centralized repository for other devices. There can be many different SRV_CNTRL 200 servers acting as multiple-masters in many locations. Each database can store certain information including tunnel information, peer information, traffic information, cache information, and other information. Security and other aspects are independently managed by each device including heartbeat functionality, triggered scripts and other mechanisms.

GVN software D196, D296, D396 includes tunnel builder/manager, virtual interface manager, automated smart routing, test modules, security, logging, and other functionality. FIG. 11 also shows operating system (O/S) level packages D195, D295, D395 and includes, hardware and software drivers, drivers, installed packages including their dependent software packages, and other items built on top of the hardware components of the system.

FIG. 13 illustrates GVN topology, including a backbone segment over internet or dark fiber. International Patent Application No. PCT/US15/64242 SYSTEM AND METHOD FOR CONTENT RETRIEVAL FROM REMOTE NETWORK REGIONS, discloses a feature where multiple files are clumped together into a larger file to be sent by a file transfer via "chained cache" from one geographic region to another geographic region. For this feature to be advantageous, the file transfer needs to be as fast as possible. As a transport for a clump of various data payload "files", the information slingshot method of this invention moves a larger block of data faster from one end of the world to the other than methods of prior art.

Referring to FIG. 13, there are multiple zone shown: LAN zone 0 (ZL00), LAN zone 1 (ZL10), Internet zone 0 (ZI00), Internet zone 1 (ZI10), Internet zone 2 (ZI20), Internet zone 3 (ZI30), Internet data center zone 2 (ZD20), and Internet data center zone 3 (ZD30).

SRV_BBX 1372 in region or zone ZD20 can be connected to SRV_BBX 1380 in another region or zone ZD30 via a dark fiber connection 13P220 over dark fiber 13220. SRV_BBX 1372 directly writes a file to parallel file storage PFS 1382 via remote direct memory access (RDMA) over 13P220 bypassing the stack of SRV_BBX 1380 via path 13P82. SRV_BBX 1380 uses this invention to directly write a file to parallel file storage PFS 1374 via remote direct memory access (RDMA) over 13P220 bypassing the stack of SRV_BBX 1372 via path 13P74.

Path 13P210 can be IPv4 or some kind of standardized internet protocol over which traffic flows from SRV_AP 13300 to and or from SRV_AP 13310 via path 13P210 over-the-top of the GVN via a tunnel or other type of communication path.

This illustrates that various types of network fabrics can be combined into a greater network tapestry. These fabrics can be seamlessly woven together as described in U.S. Provisional Patent Application No. 62/174,394. This can be either a stand-alone method or can be integrated as a network segment within a greater network path comprised of various network segments. This example embodiment illustrates the topology of a global virtual network (GVN), its various devices, communications paths, and other embodiments. It shows how various geographic regions or zones or territory are linked together over various types of paths.

FIG. 14 illustrates a distributed firewall (FW) in the cloud enabled by a GVN. Because of the nature of a GVN's topology, device-to-device communications, and secure traffic path, a firewall mechanism can be cloud based and also can be virtualized. With a firewall facing hop 144 within the flow to and from the GVN via an egress ingress point (EIP) to the open internet 14000, there can be a cloud firewall (CFW) load balancer 144LB which will be able to allocate cloud firewall resources such as 144-2, 144,3, and so on.

This on demand scalability offers many advantages to clients of a GVN. By absorbing the hits of the attacks for incoming threats in the cloud, the client's last mile connectivity is not affected. This cloud firewall combined with a control node and analyzer allows for the FW in the region under attack to be aware of the nature, source, signature and other features of the attack so that it can be aware and be prepared to thwart the attack if the target shifts. Furthermore, information about past and current attacks can be shared via the neutral API mechanism (NAPIM) of the GVN to other CFW instances, so that global threat awareness is possible. This also offers advantages of running simultaneous types of FW mechanisms as discussed with respect to FIG. 15.

FIG. 15 illustrates a multi-perimeter firewall (MPFW) in the cloud empowered by a global virtual network. The GVN tunnel 15TUN0 is over the top (OTT) of the internet between an end point device (EPD) 15100 and an access point server (SRV_AP) 15300 in close proximity to the EPD 15100.

The three perimeters indicated in this example embodiment are 15M1 which denotes the boundary between a client location and their link to the internet, 15M2 which is a boundary in the cloud at a datacenter in close proximity to SRV_AP 15300, and 15M3 which is another boundary at either the same data center as SRV_AP 15300 or at another location in close proximity to SRV_AP 15302.

The tunnel 15TUN2 is similar to 15TUN0 and different in one respect in that it connects a personal end point device (PEPD) 15130 which can be mobile and therefore connects to SRV_AP 15300 through public access wireless or wired or other networks to integrate into the GVN.

Each SRV_AP 15300 and SRV_AP 15302 may represent one or more SRV_AP devices through which the EPD 15100 and/or EPD 15130 may concurrently connect with via one or more multiple tunnels.

There are three types of firewall described in this example embodiment. FW local 15442 is an example of a firewall which a client may use to protect their local area network (LAN) from internet based threats. This is typically located between the EPD 15100 and the LAN 15000. This FW 15442 may offer features such as IP address and port blocking, forwarding, and other functionality. The other two types of firewall illustrated are FW SPI 15446 located at 15M3 which is offers Stateful Packet Inspection (SPI) and FW DPI 15444 located at 15M2 which provides Deep Packet Inspection (DPI).

The difference between SPI and DPI has to do with a tradeoff in performance versus visibility. SPI examines at the headers of packets to look for malformed information, or for patterns, or to match IP address or port or other information from its list of known threats against the current flow of packets. DPI as its name implies takes a deeper look at the whole packet and in the case of a multi-part, multi-packet transmission, will look at the compilation of a series of a packets to gain insight into the data being transferred.

All firewalls can be configured to investigate and apply rules to both incoming and outgoing traffic, and provide other related functionality. In many cases, clients will have to choose between the efficiency of SPI vs. the thoroughness but resource and time intensive requirements of DPI.

A GVN offers the opportunity to distribute these FWs at various points in the cloud. And for the various types of firewall to be operating in lockstep with each other, without impeding the flow of traffic.

By locating FW SPI 15446 at 15M3, the closest edge to the Internet 15302 via EIP remote 15310, the bulk amount of attack traffic from known source IP addresses or with recognized malicious headers can be thwarted. Traffic flow from SRV_AP 15302 to FW SPI 15446 via 15T10 and back via 15T12. FW SPI 15446 can be a CFW load balancer (see FIG. 14) which has plenty of resources on demand. SRV_AP's at 15M3 can be on a multi-honed backbone with huge capacity. Therefore, at this first perimeter, attacks can be caught, protecting bandwidth within the GVN.

At the next perimeter 15M2, the FW DPI 15444 can have all traffic flow through or just receive a copy of traffic via 15T20 from SRV_AP 15300 and it may or may not return traffic via 15T22. The key point is that the DPI feature can be a trailing indicator allowing certain traffic through but analyzing and recording the results. This FW DPI 15444 can also be a CFW which is load balanced with resources available on demand as needed to cope with large scale events when needed without individual clients having to administer or bear the cost burden for maintaining the infrastructure during normal times.

The information from FW SPI 15446 and FW DPI 15444 is shared with each other via internal communications path 15P6 which may be carried by the NAPIM of the GVN, or through GVN tunnel, or GVN back channel, or via other communications pathway(s). Each FW mechanism also shares information with the central, control servers (SRV_CNTRL) 15200 of the GVN. This information can be relayed to other FW SPI and FW DPI around the world so that attack vectors, sources, payloads, and other related information can be made available in a database so that SPI and DPI checks can have a point of reference to check against. This permits more efficiencies of scale as the global distribution of information provides an added safety net.

The catching of offending traffic outside of a client LAN and in the cloud protects the client's last mile internet connectivity from being saturated by unwanted traffic. Off-loading of traffic to CFW which are scalable also offers many advantages to clients.

The FW local 15442 may be a standalone device, a software application (APP) running inside of the EPD 15100, or other kind of FW device.

The FW SPI 15446 and FW DPI 15444 devices and related devices such as load balancers, cloud firewalls, or other devices may be custom made or can be off the shelf provided by other vendors offering best of breed options to clients. These devices must be able to receive and forward traffic, identify threats and most importantly to be able to communicate their threat findings and to receive threat profiles and other information from other devices.

As the threat data accumulates, analysis can be made of the content, the patterns, the attack vectors, and other information gathered by the FWs. This analysis can provide a basis through which heuristic analysis can be applied to new potential threats.

This can only be achieved by the secure network optimization (SNO) services of a GVN or similar network which consists of related devices connected both by secure tunnels and communication paths.

FIG. 16 illustrates a logical view of the software architecture of three types of network devices working together as a part of a Global Virtual Network (GVN). As shown, the software and hardware can be distributed within the network devices and across different circuit boards, processors, network interface cards, storage, and memory.

One described network device is an End Point Device (EPD) 100. Another described network device is Central Server (SRV_CNTRL) 200 and the third device is an Access Point Server (SRV_AP) device 300.

The EPD 100 is connected to the SRV_AP 300 via encrypted tunnel described by communication path could be encrypted tunnel SYSC04 to a Point Of Presence (POP) SYS406 through communication path SYS06 to a WAN SYS400 to communication path SYSCP10 to POP SYS402 to communication path SYSCP12. The path transiting WAN SYS400 could also be through the regular non-encrypted internet.

Each device EPD 100 and SRV_AP 300 can also connect to the SRV_CNTRL device 200 via communication path SYSCP08.

The software architecture of EPD 100 and SRV_AP 300 are very similar to each other with the differentiation by role of each device in their operations, and some differing modules.

The lowest level of each device are the memory (RAM) 106, 206, 306 and processors (CPU) 102, 202, 302, and the network interfaces (NIC) 108, 208, 308. All of these are on the hardware level. The operating system (O/S) 110, 210, 310 can be a LINUX system or equivalent system such as Debian or other. This description of an operating system includes packages and configuration for routing, hosting, communications and other system level operations software.

On top of the operating system 110, 210, 310 exists a system software layer 112, 212, 312 of the Global Virtual Network's (GVN's) operating systems. Operating here are custom commands, system modules, managers and other constituent parts, as well as other components of the GVN. Each type of device of the GVN may have some or all of these portions of the system software layer or different portions depending on their role.

Database modules Db 120, 220, 320 and Hosting Modules 122, 222 and 322 are configured in this example embodiment for the listening, sending, processing, storage, retrieval and other related foundation level operations of the GVN's neutral API mechanism (NAPIM), graphic user interfaces (GUI) and other server side script hosted sites. Database 120, 220. 320 (Db) modules could be MySQL or equivalent such as MariaDb and hosting modules 122, 222 and 322 could be Apache and PHP scripting or other type of hosting languages. Command Line scripts are also used and can be written in Bash, C, PHP, Pearl, Python or other language.

Billing modules can collaborate and share information such as the amount of data consumed by tunnel traffic to be billed by a consumption model. The accounting module ACC 132 232 332 operates on the EPD 100 and the SRV_AP 300 has a corresponding Billing module. Both can provide financial information to report screens, payment forms, emailed statements and other financial data produced by the GVN.

SRV_CNTRL 200 has a Repository Manager 238 which handles billing info, tunnel manager information and other data which can be utilized by various devices within the GVN. The Repository Manager 238 also handles the coordination of the sharing of peer pair info, credentials and other information to individual devices connecting to other API peers via the neutral API mechanism (NAPIM) of the GVN.

The EPD 100 has an API Module 130, SRV_CNTRL has API Module 230 and the SRV_AP 300 has an API Module 330. For the simplicity of explaining this example embodiment only one API module has been expressed per device. In fact, devices may have a combined client and server role depending on its function within the GVN.

A Cache Manager on SRV_CNTRL 200 manages the master index of various chained caches distributed across many devices of the GVN. The Compression Engine 136 on the EPD 100 and 336 on SRV_AP 300 manages the compression and decompression of data both stored on files, in DB tables or for streaming transport data.

Advanced Smart Routing (ASR) 150 module on EPD 100 handles the routing of traffic from an EPD 100 to the best egress point for destination via routes of the GVN.

Remote Fetcher BOT 311 on the SRV_AP 300 is a core component of the Geo-Destination Mechanism (Geo-D).

DNS Manager 254 on SRV_CNTRL 200 manages the master DNS index which can seed DNS Servers on various GVN devices, such as DNS 154 on EPD 100.

A Logger Manager on SRV_CNTRL 200 manages both local logs and logs shared by devices to the Repository via API calls. The Logging Manager in this example embodiment imbues the functionality of recording operational events, API actions and transactions and the Logger also has other roles and processes for various aspects of the GVN operations.

Local Cache 152 on EPD 100 and local Cache 352 on SRV_AP 300 cache data locally.

GVN Managers 272 operate on SRV_CNTRL 200 to control the operations of various components of the system both on the SRV_CNTRL 200 and other devices of the GVN.

Local DNS server and cache 154 on EPD 100 and 354 on SRV_AP 300 allow for caching of DNS lookups for fast, local retrieval. The DNS 154 and 354 can be completely flushed, individual items purged, or timeouts set for retrieved lookups to be deleted after a certain period of time has transpired.

On the EPD 100 is a Content Delivery Agent (CDA) 158 which is a component of Geo-D. On the SRV_AP 300 is a Content Pulling Agent (CPA) 358, also a component of Geo-D. The CPA 358 works with the BOT 311 on SRV_300 to pull content from a distant region using local DNS 354 seeding from that Region. The CPA 358 sends fetched content to the CDA 158 utilizing tunnels, caches and other improvements of the GVN.

A firewall (FW) (not shown) on EPD 100, on SRV_CNTRL 200 and on SRV_AP 300 operates to protect access to both the device and the communications paths between the device and others.

Connectivity Manager (not shown) on EPD 100 and on SRV_AP 300 manages the tunnels between devices and other device to device communications paths. Compression Manager on 215 of SRV_CNTRL 200 manages compression both locally and also coordinates with Compression Engines 136 on EPD 100, 336 on SRV_AP 300 and on other devices of the GVN. Routing on EPD coordinates with ASR 150, Geo-D, and other elements to manage traffic routing.

The structure of the database tables in SDB100, SDB200, and SDB300 are equivalent for device operations while the data for each is specific for device types, and each device has identity specific devices. On SRV_CNTRL 200, the Repository Database SDB202 is where unique information is stored for all devices and this information can be used by the Repository Manager 238 to communicate API credentials, tunnel info, or other information to a device.

Stored within each device database are identity and API peer info about the device itself and its peer pair partners, transaction lists and queue data, and other information. There are other uses for the described methods and databases beyond what is described but for simplicity of illustration, this example only covers a few example core functionality elements.

Topology

FIG. 17 illustrates a GVN using hub and spoke topology with a backbone and octagon routing. FIG. 17 shows the network topology of a GVN in two different regions 17-RGN-A and 17-RGN-B and how the regions are connected via paths 17-P0A and 17-POB through global connectivity 17-RGN-ALL. In addition, FIG. 17 shows the hub & spoke connections in each of the two regions. FIG. 17 is similar to FIG. 15 and adds multiple egress-ingress points (EIP) in each region as added spokes to the hub and spoke model.

SRV_BBX 17-280 and SRV_BBX 17-282 are backbone exchange servers and provide the global connectivity. SRV_BBX may be one or more load-balanced servers in a region serving as global links. Access point servers (SRV_AP) 17-302, 17-304 and 17-306 in 17-17-RGN-A connect to SRV_BBX 17-280. The central, control server (SRV_CNTRL) 17-200 serves all of the devices within that region and it may be one or more multiple master SRV_CNTRL servers. End point devices (EPD) 17-100 through 17-110 will connect with one or more multiple SRV_AP servers through one or more multiple concurrent tunnels.

This figure also shows multiple egress ingress points (EIP) 17-EIP420, 17-EIP400, 17-EIP430, and 17-EIP410 in each region as added spokes to the hub and spoke model with paths to and from the open internet. This topology can offer EPD connections to an EIP in remote regions routed through the GVN. In the alternative this topology also supports EPD connections to an EIP in the same region, to and an EPD in the same region, or to an EPD in a remote region. These connections are securely optimized through the GVN.

FIG. 18 illustrates the backbone connections between some GVN Global Nodes and their corresponding service areas in North America, Europe and Asia. As described in the Legend box at the bottom right of FIG. 18, each zone noted herein from a networking perspective is described as a Global Node. Global Nodes are connected to each other via High Performance Network links. The lower the latency between the points, the faster information can be transferred.

Around the Global Node two rings denote the type of connectivity quality zone in for example a radius from the center where the source info is located. This is for simplification only as many factors determine the size and shape of these zones. However, the two zones can be differentiated from each other as the closest one being a High Performance Zone and the other being an Optimal Service Area.

The farther a querying client or server or other type of device is from the global node, the longer it takes for information to flow and at some point the distance is so great that the QoS reduction is such that the device is no longer in the High Performance Zone, but is now located in the Optimal Service Zone.

If the QoS drops below a certain threshold, the device is located outside of the Optimal Service Area and therefore the distance between it and the global node is so great that the advantages offered by a GVN, with the exception of security, may be a moot point.

FIG. 18 shows zones SJC 18-01 for San Jose, CA, USA, JFK 18-02 for New York, NY, USA, AMS 18-11 for Amsterdam, NL, NRT 18-21 for Tokyo, Japan, and HKG 18-22 for Hong Kong, SAR, China. There are many other reasonable locations around the world within which to place a global node that are significant, but for simplicity of illustration only a few are shown for illustrative purposes.

FIG. 18 also show representative paths between each global node, for example such as between JFK 18-02 and AMS 18-11. In reality, there are a multitude of paths representing undersea cables between the two points.

FIG. 19 illustrates the connectivity between various devices within a GVN noting multiple connection paths to hub devices from devices in the spoke(s). The placement of SRV_BBX (backbone exchange server) 19-800 and 19-810 points are based on the client's location relative to the to best Internet Data Center (IDC) with respect to pipes, interconnects to serve a target region while connecting global locations via paths 19-BB2 and 19-BB6.

The SRV_BBX acts as a hub for the region it serves. Hubs are connected to each other by Tunnels over the top (OTT) of Ethernet links in the Internet, Tunnels over direct Ethernet links, Infiniband over Fiber, Infiniband over Ethernet, or other form of connectivity between regions. Each hub serves various SRV_AP servers such as 19-302, 19-306, 19-308 serving one area within a global region. SRV_AP 19-312, 19-316, and 19-318 can serve another area of a global region.

End point devices (EPD) such as 19-100 through 19-128 will connect with the most appropriate SRV_AP server relative to their location, their network connectivity, its peering and other relevant factors. These factors are constantly changing and therefore multiple tunnels to multiple SRV_AP servers are maintained by an EPD at all times. Each EPD connects with various (one or more) SRV_AP servers simultaneously.

There are egress ingress points (EIP) at EPDs, at SRV_APs and at other locations where traffic can leave or enter the GVN to or from the internet with the GVN securing and optimizing the traffic as far as possible.

SRV_AP devices such as SRV_AP 19-308 and SRV_AP 19-318 may also have connectivity to each other through a tunnel path such as 19P60 so that two EPDs such as EPD 19-110 could connect with EPD 19-128 via path 19P22 to 19P60 to 19P58.

The central, control server (SRV_CNTRL) 19-200 is linked to various devices via paths such as 19P62 to SRV_AP 19-302 for neutral API mechanism (NAPIM) information exchanges. The EPDs also connect with the SRV_CNTRL 19-200 via NAPIM paths. To keep this example embodiment relatively simple, the NAPIM EPD to SRV_CNTRL paths were not shown.

The NAPIM information exchanged between the SRV_CNTRL and various devices can be used to share usage statistics, tunnel building information such as IP addresses, ports, protocols, security credentials, certificates, keys, and the sharing of other information to allow for the automated and secure operations of the GVN.

FIG. 20 illustrates how GVN modules and devices interact. A global virtual network (GVN) consists of various devices which operate independently as well as in collaboration with other devices. While the role of each may be different based on their type and its primary function, they follow similar code base, database schema and other architecture elements.

Infrastructure is installed in a region to support the operations of EPDs and PEPDs. Devices such as End Point Devices (EPD) 100, Portable End Point Devices (PEPD), and End Point Hubs (EPH) connect various LAN, PAN and other networks to the GVN via tunnels to Access Point Servers (SRV_AP) 300. Each device has its own locally hosted databases.

Redundancy is provided by multiple servers of each type per region with multiple master SRV_CNTRLs and other server types. The central data repository is located on the Central, Control Server (SRV_CNTRL) 200. The SRV_CNTRL's job is to connect to various devices via the neutral API mechanism of the GVN. The API calls via the NAPIM of the GVN are via paths 20P02 for communications between devices such as EPD 100 to SRV_BC 20-502. Device_ID and registration/regional mapping in the Db repository on SRV_CNTRL allows for API peer pair relationship management, generates appropriate Server Availability List (SAL), and accepts logging. This allows for the efficient management of the relationships and connections with SRV_AP and GW servers.

The backend servers and infrastructure devices of the GVN include Back Channel Servers (SRV_BC) 20-502, Secure Boot Servers (SRV_SB) 20-504, Authentication, Authorization, Accounting Servers (SRV_AAA) 20-508 and Logging Servers (SRV_LOG) 20-516, and others.

The gateway servers and other devices are connected to the SRV_CNTRL 200 via connector 20AD0 and to gateway devices via All Devs hub 20AD2. This can include a gateway email server (SRV_GW_Mail) 20-510, a gateway server for financial transactions (SRV_GW_FIN) 20-518, and/or a gateway server for Third Party Connections (SRV_GW_TPC) as one type of other the SRV_GW_*20-512.

Gateway servers operating with a specific role can be tweaked for that functional role and secured in such a way to protect them. By delegating an email gateway server, it can be set up as a secure email sender and receiver. This will require configuration and maintenance and observation of its operations. But at the same time, no other servers would need to handle email freeing up an administrative burden for those devices. All devices can forward emails via data payload sent to API by action call to request email to be sent. Flags in the payload can indicate whether email should be sent right away or at a specific time or at which priority. Other settings can govern how it is sent. SRV_GW_EMAIL will receive these data payloads, add them to its Email sending queue and email manager will handling when and how to deliver the email and will accordingly log the event. Bounce backs, replies, and other incoming emails can also be handled by the one point server type SRV_GW_EMAIL.

Logging servers and other devices can also be reached by GVN devices via 20AD4.

FIG. 21 illustrates additional details of how GVN modules and devices interact. The additional details include communications paths such as 21Q00 from SRV_BC 4-502 to SRV_CNTRL 200 for reporting of information from back channel server to central, control server. The key point is that while a GVN device will need information about itself, its peers, its connectivity options and other information in order to operate, the sharing of performance and other data to SRV_CNTRL 200 and or other devices allow for an overall perspective of the greater system. The constant feedback loops allow for automated adjustments and learning-on-the-fly for better decisions to be made.

FIG. 22 illustrates the topology and connectivity of GVN modules and devices and how they interact with other devices on the Internet. Communication paths shown in FIG. 22 include Path External (PE), Path of Tunnel (for traffic) (PT), Control Path (CP), Encrypted System Path (ES) and Path for API communication between devices of a GVN (PA), and more.

The Central Server (SRV_CNTRL) 200 contains a repository of files and databases holding important system information. The SRV_CNTRL is able to connect with all GVN devices via PA paths for API communication. An End Point Device (EPD) 100 is the network access point between a local area network (LAN) and the Internet via various concurrent potential communication paths.

Advanced Smart Routing (ASR) within an EPD can send local traffic to the Internet 22-010 closest to it via 22-PE00 to a Point of Presence (POP) 22-020 to 22-PE02. The Back Channel Server (SRV_BC) 22-502 connects to the EPD 100 via a back channel connection from 22ES04 through 22-010 via 22ES02 to 201 to 22ES020 into the EPD 100. The ES ## paths are encrypted Control Paths and are independent of traffic carrying Paths of Tunnels.

The EPD 100 maintains multiple tunnels to each of multiple Access Point Servers (SRV_AP) via 22PT00 and 22PT02 to SRV_AP 300, via 22PT04 and 22PT08 to SRV_AP 22-302, via 22PT10 and 22PT12 to SRV_AP 22-306, and via 22PT14 and 22PT16 to SRV_AP 22-308.

This figure is not to scale but for example, SRV_AP 22-302 and SRV_AP 300 are in the same region and egress from the GVN to the Internet 22-012 via 22PE04 to POP 22-022 to 22PE08 to the Internet 22-012 and via 22PE16 via POP 22-026 to 22PE12 to the Internet 22-012. Both EPD's can do local DNS lookups to the Domain Name Services (DNS) server 22-402.

Both SRV_AP 22-302 and SRV_AP 300 maintain API communication paths to SRV_CNTRL 200 via 22PA02 and 22PA08 respectively.

A Gateway Device (SRV_GW) 22-514 is located in the same region as SRV_AP 22-302 and SRV_AP 300. This can send emails, process financial transactions and other functionality of SRV_GW devices of the GVN.

SRV_AP 22-306 connects to the SRV_CNTRL 200 via 22PA10 and its egress point to the Internet 22-014 in its region is via 22PE20 to POP 22-024 to 22PE22 to Internet 22-014.

The SRV_GW server 22-516 connects to the SRV_CNTRL 200 via 22PA24 and to the Internet 22-014 via 22PE26 to POP 22-024 to 22PE22 to Internet 22-014.

SRV_AP 22-304 connects to the SRV_CNTRL 200 via 22PA18 and its egress point to the Internet 22-016 in its region is via 22PE26 to POP 22-028 to 22PA30 to Internet 22-016.

SRV_GW 22-512 connects to SRV_CNTRL via 22PA14 and to SRV_AP via 22PA16. Local traffic from SRV_GW 22-516 egresses via 22PE28 to POP 22-208 to 22PA30 to Internet 22-016.

There exist other devices within the GVN and they engage in specific roles such as a backup server SRV_Backup 22-522 and logging server SRV_Logging 22-516. These are connected to SRV_CNTRL via 22PA20 and 22PA22 respectively. They can accept data from SRV_CNTRL 200 or from other devices via PA ## paths to be relayed to SRV_Backup 22-522 or SRV_Logging 22-516.

This described typology of the GVN allows for traffic from the EPD 100 to have multiple options for its traffic per region through multiple tunnels to multiple SRV_AP servers. The other devices ensure that information is distributed to devices for efficient utilization.

FIG. 23 illustrates multiple tunnel connectivity between End Point Devices (EPD) 100, 23-102, 23-158 and Access Point Servers (SRV_AP) 300, 23-302. These tunnels can be used for client data traffic, internal system data or other transfers. This figure further demonstrates the connecting of Global Virtual Network (GVN) infrastructure devices such as Central Server (SRV_CNTRL) 200 and Back Channel Admin Server (SRV_BC) 23-502 with other devices within the GVN.

The SRV_BC 23-502 establishes and maintains back channel tunnels 23PA02 to EPD 100, 23P018 to EPD 23-102, 23PA06 to EPD 23-158, 23TP50 to SRV_AP 23-302 (and on and on). There may be more SRV_BC servers within the GVN to offer redundancy in the case that one SRV_BC is not operational and also to ensure best performance by placing SRV_BC servers at strategic locations close to devices which they are to connect to.

EPD 100 connects one LAN 23-002 to various paths which data could take through the GVN such as via one of three multiple tunnels 23TP00, 23TP02, or 23TP04 to SRV_AP 300 to an egress point via path 23PE00 to Internet 23-410.

Another path is from SRV_AP 300 to SRV_AP 23-302 via one of three multiple tunnels 23TP10, 23TP12 or 23TP14.

A path option from SRV_AP 23-302 is to Internet 23-412 egress point via 23-382.

An External Entry Point X-IP 305 from Internet 23-412 into the GVN allows for connectivity by non-GVN devices to address and reach devices through the GVN realizing enhancements of the GVN for the duration of the journey of traffic carried by the GVN.

Another benefit realized by the GVN is secure tunnel connectivity to an EPD 23-158 at the location of a service providing partner organization in the cloud for secure tunnel via GVN to their servers and related services at location at LAN 23-152.

A LAN-WAN-LAN bridge from LAN 23-002 to LAN 23-012 is possible via communication path from 23-002 to 23CP02 to GWD 23-004 to 23CP04 to EPD 100 to 23TP00 23TP02 23TP04 to SRV_AP 300 to 23TP10 23TP12 23TP14 to SRV_AP 23-302 to 23TP20 23TP22 23TP24 to EPD 23-102 to 23CP14 to GWD 23-014 to 23CP12 to LAN 23-012. All traffic carried by this bridge is protected and improved by the GVN mechanism.

Multiple tunnels between two devices such as 23TP00 23TP02 23TP04 or 23TP10 23TP12 23TP14 or 23TP20 23TP22 23TP24 can either offer a single communication path by sending traffic down one tunnel, or two or more tunnels can be aggregated together where two or more bound tunnels can carry traffic as if they are one tunnel.

SRV_CNTRL 200 with API communication path between peer pairs and tunnels to other devices can be utilized for file transfer and data exchange via paths such as 23PA00 to EPD 100, or 23TP30 to 23-302 to 23TP22 to EPD 23-102, or 23PA04 to 23-302 to 23TP60 to EPD 23-158, and other potential options.

There are other possible communication paths in this example embodiments and also more options for communication paths through the GVN. In this example embodiment, all tunnels are representing links via the Third Layer of a GVN with each of them built on the GVN First Layer over top of the Internet.

FIG. 24 is a simplified example diagram of how the internet works today taking into account hop count or time to live (TTL) as well as path taken due to peering relationships and related routing policies.

A0 represents a network of an internet service provider (ISP). A1 through A06 represent point of presence (POP) and these POPs further connect to switch devices or client devices to link them to the internet. This hop and spoke structure illustrates clusters of networks within the broader network of an ISP. Lines with circles as line caps denote this connectivity. For simplicity sake, A1, A2, A3 and other POP's in this example embodiment do not illustrate links to last mile networks but this should be implied. Each POP has its own hub and spoke connectivity to networks such as local area networks (LANs) or internet data centers (IDCs) which attribute their internet connectivity via the POP.

H0 is an example of a single-honed ISP meaning that it relies on one path between it and the internet. If this path is cut or goes down, the connectivity from this ISP to the broader internet is cut.

B0 is an example of a multi-honed ISP with five illustrated connections between it and other ISP networks, if one path is unavailable traffic can still flow through the internet although through a less direct route.

IX1 and IX2 are examples of internet exchanges (IX) which may independently link to each other through backbone or backbone dedicated connections. IXs are where ISPs and others can connect to each other at a "meet-me room" or equivalent arrangement for direct network to network peering.

There are also communication paths between the networks of an ISP and other ISPs or with IXs or with intermediary routers in-between. These backbone communication paths are illustrated by lines with arrow caps on both ends. The intermediary devices are illustrated by circles between the arrow-capped lines. Backhaul connectivity between IX are illustrated by dotted lines with arrow-caps at both ends. An off page connector IBH1 is used to illustrate International Backhaul (IBH) that the IX2 also has connectivity to another IX which is not illustrated in this example embodiment.

To illustrate a direct, efficient connection between ISPs from A0 to G0 via the path AX1-1→AX1-2→IX1→GX1-1 has only four intermediary hops and should be the most efficient route.

To illustrate a roundabout path caused by the failure of a path, if path GX1-1 goes down, then traffic from H0 or A0 which is destined to transit to G0 will not be able to go through GX1-1 via IX1. The alternative is for traffic to go via B0 and E0 to G0. What used to take only four middle hops from A0 of AX1-1→AX1-2→IX1→GX1-1, now need many more hops AX1-1 to AX1-2 to IX1 to BX1-4 to BX1-3 to BX1-2 to BX1-1 to B0 to EB-5 to EB-4 to EB-3 to EB-2 to EB-1 to E0 to GE-3 to GE-2 to GE-1 for it to reach G0. Seventeen middle hops and corresponding higher latency for traffic to now reach G0 from A0 if GX101 is down.

At the same time, traffic from G0 to IX1 which should go through the single middle hop of GX1-1 will have to go from G0 to E0 to B0 and then to IX1.

This extra traffic could strain connections and be the cause of higher latency and congestion related packet loss. Peering through an IX will usually have much more capacity and ability to handle large volumes of traffic. When the single middle hop GX1-1 from G0 to IX1 is unavailable the added hops (TTL) and latency (RTT) through the alternate route(s) may have too many hops or take too much time resulting in either packets being marked as undeliverable or for internet based services to timeout.

The best connectivity between two ISP networks via an IX and by utilization of backhaul is represented by the path H2 to H0 to HX1-1 to HX1-2 to IX1 to X1X2-1 to X1X2-2 to IX-2 to DX2-2 to DX2-1 to D0 to D2. This is 12 hops in total from POP to POP.

The next direct path would be via B0 for a total of 16 hops. Path is H2 to H0 to HX1-1 to HX1-2 to IX1 to BX1-4 to BX1-3 to BX1-2 to BX1-1 to B0 to DB-4 to DB-3 to DB-2 to DB-1 to D0 to D2.

The next direct path would be via A0 via C0 for a total of 19 hops. Path is H2 to H0 to HX1-1 to HX1-2 to IX1 to AX1-2 to AX1-1 to A0 to AC-1 to AC-2 to AC-3 to AC-4 to AC-5 to C0 to CD-1 to CD-2 to CD-3 to D0 to D2.

An indirect but possible path could be 30 hops due to routing policies and peering relationships such as via G9 via E0 via B0 via F0. Path is H2 to H0 to HX1-1 to HX1-2 to IX1 to GX1-1 to G0 to GE-1 to GE-2 to GE-3 to E0 to EB-1 to EB-2 to EB-3 to EB-4 to EB-5 to B0 to FB-5 to FB-4 to FB-3 to FB-2 to FB-1 to F0 to DF-5 to DF-4 to DF-3 to DF-2 to DF-1 to D0 to D2.

Looping occurs when traffic cannot reach a destination because of badly formed or incorrect routing policies governing middle devices between origin and destination. For example, if traffic from C0 wants to route to G0 it may choose to go to B0 thinking that B0 will send traffic to E0 because C0 may think that B0 and E0 are close to each other and that this is the best path. However, B0 may not peer with E0 directly but have a strong peering relationship with F0. F0 too does not have a peering relationship or a path to reach E0 and so it may send traffic to D0. D0 has only two choices, to send traffic either to C0 or to B0, in both cases the end result is looping, undeliverable traffic. There are other causes of looping such as faulty routing tables, broken devices, hacking or other bad acts or other reasons.

The net result of too many hops and too high of latency are either time outs or dropped packets.

FIG. 25 illustrates the strategic positioning of infrastructure to enhance performance. Within this example there exists three or four key points where the strategic positioning of SRV_AP servers and other GVN infrastructure will ensure optimal peering and performance between all points on the example network topology illustrated.

SRV_AP servers installed and operating at IX1-IDC, B5, and IX2-IDC and possibly D5 for to include optional routing options and failover will provide peering with all other networks and a stable path between SRV_AP with options to route around any broken paths. This strategic positioning offers resiliency and possibilities for other performance enhancements.

FIG. 26 illustrates how the GVN can incorporate technologies such as Network Slingshot to realize great advantages over distance seamlessly. Network Slingshot is further described in U.S. Provisional Patent U.S. 62/266,060.

The first boundary is GVN EIP 26-322 between the internet and the GVN. The next boundary is the secure perimeter 26-182. This layered security approach protects the core infrastructure which the GVN is predicated upon.

The secure perimeter 26-182 boundary between GVN and GVN backbone protect the high speed global network. The section of the GVN above the perimeter 26-822 has traffic flowing over the top (OTT) the open internet via secure GVN tunnels. Under the secure perimeter 26-182, GVN connections utilize various protocols over dark fiber or other connectivity which are not directly reachable from the internet.

A super computer node 26-538 can operate inside of (below) the secure perimeter 26-832 which can operate a true internal network with advanced features such as remote direct memory access (RDMA) to a parallel file system (PFS) 26-602 device.

FIG. 27 illustrates how tables on the databases of various GVN devices are related to each other and in which way they interact. For example, the repository database DB_2300 on the SRV_CNTRL has various tables on it related to devices and the interaction between devices via the neutral API mechanism (NAPIM) of the GVN. Tables such as Device Registry DBT_2310 in database DB_2300 is designated as REPO_ACTIVE which means that it receives information from many sources, is read/write and is able to be queried as the source of information for selective or full replication to tables such as Device Identity DBT_2102 as a part of the database EPD Local Db DB_2100. This table DBT_2101 has the designation SEL_REP+W which allows for selective replication from DBT_2310 as well as for it to report relevant identity back to the device registry.

The control and release of information is governed by data managers. Database table type designators include REGULAR for normal, read/write tables, as REP_INFO for read only, replicated tables, as SEL_REP read only, partially replicated tables with only related rows, as REPOS_ACTIVE a table combined from all sources on repository for device registry DBT_2310 such as identities. Other possibilities include LOGGING from source tables to be combined on the database DB2800 on SRV_LOGS. These designations for tables are for example only and may be different in real world use and there are many more tables and other types based on use.

FIG. 28 illustrates the collaborative effort between various modules, mechanisms, technologies and other components of the GVN.

There are three layers of the GVN—layer one is the physical network layer such as the internet on which the GVN is built over the top (OTT) of Layer three is the GVN network layer that client devices see as a partial or complete path to destination. Layer two is the logic layer between the two.

There are components which interact with the physical conditions 28-00. Dynamic construct modules at 28-20 strive to maintain connectivity of the GVN. The joint effort section described herein links the relevant modules of the GVN to physical 28-00 and dynamic 28-20 elements. For example, in order for the advanced smart routing (ASR) module G106 to properly function, there must be multiple access point servers (SRV_AP) GP106 placed at various locations, with adequate routing and peering GR106. In order for an EPD to be able to select the most appropriate SRV_AP to establish a connection with, it needs information about which SRV_AP's are best. The ASR server availability module SA106 ranks servers for that specific EPD based on information provided by ASR test manager TM106 and when an EPD requires a new tunnel to be established, it utilizes the server availability list SA106 in order to build a new tunnel. Tests are then run on that tunnel via TM106.

As another example, for NAPIM G102 to operate it needs API listeners and handlers HL102 on a host server. On both host client and host server in the NAPIM, an operations manager OM102 is running to handle the preparation, then sending, handling, processing of API requests and responses. The dynamic construct of the NAPIM entails peer management PM102, management of related NAPIM actions AM102, and the transactions at physical TP102 and dynamic TM102.

Construct

FIG. 29 illustrates the Advanced Smart Routing (ASR) feature of a GVN. Specifically, this figure shows the Advanced Smart Routing (ASR) feature of a GVN within an End Point Device (EPD) 103 to multiple paths to egress points in various regions of the world.

Traffic in this example embodiment begins in LAN A 102 from connected devices such as a Host Client 101. Target regions for traffic illustrated in this example embodiment are: 1) local traffic staying local via POP 401 where performance will not necessarily be improved by a GVN tunnel; 2) local traffic carried in encrypted tunnel TUN1 to Internet 203; 3) traffic to another region via TUN2 to a SRV_AP 301 in that region to access Internet 303; and 4) Traffic to other remote regions via TUN3 with some ASR on SRV_AP 501.

DNS Cache 103-4 within EPD 103 does DNS Lookups from DNS servers at each target region including DNS 404 for Internet 402, DNS 204 for Internet 203, and DNS 304 for Internet 303, and DNS 504 for Internet 503. The internal DNS cache 103-4 is accessible via path DP4.

The physical Network Interface Controller (NIC) hardware devices of the EPD 103 includes four ports. ETH0 103-9 is the WAN port connecting the EPD 103 to the Network Access Point (NAP) to the Internet via P401 to POP 401 of the ISP on the way to the Internet 402. All traffic from the EPD goes over this connection as the First Layer of the GVN Network. TUN tunnels on top of this connection are the Third Layer of the GVN. ETH1 103-1 is the Local Area Network (LAN) port connected to LAN A 102 via path P102. ETH2 103-2 is another physical LAN port connected to LAN B 104 via path P104. Finally there is a virtual interface (VIF) acting as a bridge BR0 103-3 to bind the LAN interfaces 103-1 and 103-2 via internal paths DP1 and DP2 respectively.

Traffic from LAN bridge BR0 103-3 is sent to a chain of virtual interfaces (VIF) via device path DP3. Advanced Smart Routing (ASR) is applied at each VIF with routing tables of IP Addresses directing flow of traffic to one of two or more exit points from each VIF. The last VIF may have only one possible exit point for "all other" remaining traffic.

For example, at VIF0 103-5, local traffic exits via P401. All other traffic through VIF0 103-5 is sent to the next VIF in the chain, VIF1 103-6 via DP5. Traffic from VIF1 103-6 destined for Internet 203 leaves the EPD 103 via path P201 through encrypted tunnel TUN1 to SRV_AP 201 and then to path P202 to POP 202 to P203 to Internet 203. From there, regional DNS lookups can be queried via SRV_DNS 204 via path P204. A connection to a Host client 205 or Host server 206 can be made via P205 and P206 respectively.

Any remaining traffic from VIF1 103-6 is sent to VIF2 103-7 via path DP6. Based on routing tables applied to VIF2 103-7, all traffic destined for Internet 303 and connected devices there such as Host server 306 leaves VIF2 via path P301 to TUN2 to SRV_AP 301 and onward through to Internet 303 and beyond.

Any further remaining traffic from VIF2 103-7 is sent to VIF3 103-8. All traffic from VIF3 103-8 is sent to SRV_AP 501 via encrypted tunnel TUN3. ASR routing is applied at the SRV_AP 501 with traffic destined to IP Addresses within Internet 503 sent via path P502, to POP 502 to Internet 503.

Traffic from SRV_AP 501 destined for Internet 603 is sent via a connected, encrypted tunnel TUN4 to SRV_AP 601 to path P602 to POP 602 to P603 to Internet 603, and beyond . . . .

DNS lookups in the region of Internet 603 can be made to SRV_DNS 604 and connections to devices there can be made for example via P605 to Host server 605 or other devices.

This ASR mechanism can be utilized at various traffic junction points for optimizing the sending of traffic to best egress point on the Internet in various target regions, for Geo-Destinating traffic, and other advantages realized by the GVN.

FIG. 30 illustrates building a series of encrypted tunnels between a Client (C) and a Server (S). The steps 30-0 through 30-18 illustrate a simplified series of communications between C and S.

The first step is the opening of the connection 30-0 by the C to S. The next step is the acceptance of the connection handshake 30-2 by S. If the handshake data is malformed or otherwise not in an expected form, the process can stop here.

Upon receipt back and acceptance of the handshake 30-4, the C presents a certificate to S for it to use along with required security info to build a Secure Sockets Layer (SSL) connection between them 30-8. This certificate received from C will be compared against the corresponding certificate key on S. If the certificate is expired or incorrect, the SSL connection will not be able to be established and the process will stop.

This connection will be utilized to send information about the tunnel from the C 30-10 to the S, including pass phrase, metrics and other information concerning tunnel metrics including which IP Address and Port each device will use for tunnel traffic, and other information.

The S will validate this information 30-12 against its own version of tunnel metrics and pass phrase and other information. If the information is not accurate, the process will halt at this step.

Upon successful validation, S will send a response back to the C so that it can begin the process of initiating or building the tunnel with the provided configuration settings 30-14.

Once the tunnel is up, routes can be applied 30-16 at C or S or both. Although the tunnel is up, during the process of adding routes to it, traffic may not flow through the tunnel or if traffic is able to flow through the tunnel, there exists a risk of data leakage. This risk occurs because until all of the routes have been applied, the traffic to a target IP address may egress the default exit path to the internet without being encrypted or traveling through the tunnel. Once the route has been added to the tunnel, subsequent traffic will be protected as it will be transported through the tunnel. Depending on size of the routing table to be applied to the tunnel, this delay can be a significant amount of time.

When the routes are all applied to the tunnel, the tunnel is available for traffic to be pushed through it 30-18.

FIG. 31 illustrates the flow of information required by two peers in a peer pair. The peers can either be a Client (C) and a Server (S), or a Peer to another Peer in a P-2-P topology. For simplicity of labeling and descriptions within this example embodiment, the C to S and P-2-P represent the same type of two peer relationship, with C to S described herein. The GVN mainly uses C to S relationships between devices but its methods and technology can also be applied to P-2-P peer pairs for tunnel building.

An encrypted tunnel by its nature is a secure communication path through which data can flow. When the Client and the Server are separated by distance and the connection between them is over the open, unencrypted Internet, an encrypted tunnel is an ideal channel through which to safely exchange data. If there is a human network administrator at either end, they can program devices. But there exists a challenge on how to relay security information like pass phrases, keys and other information. Some may use a voice phone call to coordination, others a series of postings through secure web sites to share information or other methods. Manually setting up a single tunnel can be a task. Administering multiple tunnels can become onerous.

To automatically build a series of encrypted tunnels between two devices in a peer pair there exists a need to securely share information. The tunnel information also needs to be current and securely stored on a device. Furthermore, during the establishment process, there exist threats which must be addressed. While a tunnel is up, other threats exist which need to be addressed.

SRV_CNTRL 31D00 is a central server which contains Repository managing information in Database tables, files stored in a Secure File Storage system, lists in memory and other related information. The SRV_CNTRL also has algorithms and mechanisms to evaluate certain data to generate information reports.

Client Device 31D02 represents a device which will initiate the building of a tunnel by "dialing" the connection to the Server device via a specific IP Address and Port. There can be many Client 32D02 devices concurrently connected to the GVN with similar software and configuration with a differentiating factor between Clients of unique device Identity, UUID's, and also unique information per tunnel per Client.

Server Device 31D06 represents a device which will be listening for client connection attempts on specific IP Addresses and Ports. If the Client follows correct protocol and establishment sequence, and presents correct credentials and other security information, the Server will allow the Client to build a tunnel to it. There can be many Server 31D06 devices concurrently connected to the GVN with similar software and configuration with a differentiating factor of unique device Identity, UUID's, and unique information.

Tunnel Info 31S2 shows the information stored on a Client Device 31D02 and a Server Device 31D06. Each device can establish multiple tunnels and each tunnel will have its own set of Tunnel Information and Security Information. Some tunnel information sets may be used for building of current active tunnels and other tunnel info sets may be held in reserve for future tunnels.

Certain information between the C and S is equivalent such as a pass-phrase which one will present to the other, and other information will be different depending on applicability. Information requirements for building of a tunnel between two points can include: client/server topology and settings; IP and port of each end point to be used by the tunnel; tunnel metrics including MTU size, protocol, and other information used for its operations; keys, pass phrases and other information about security protections used for the tunnel; SSL certificates and other information for protecting the information exchange pre-tunnel UP; and other information. The information is shared between devices using specific API Action calls of the Neutral API of the GVN.

Before Tunnel 31S0 describes the process of receiving and sharing information between devices 31D02 31D06 and the repository 31D00 on SRV_CNTRL and back to devices 31D02 31D06. API Communication Paths API-31CP0, API-31CP2, API-31CP4, and API-31CP6 represent Request-Response information exchange with the arrows representing the direction of the flow of information from one device to another device.

Server 31D06 reports information to Receive Info 31C-0 module of the SRV_CNTRL 31D00 device via path API-31CP0. SRV_CNTRL 31D00 receives information from servers and stores relevant Identity, Tunnel, Current Load and other information in its repository. For example, algorithms and AI logic on SRV_CNTRL 31D00 analyze server load and based on current and anticipated demand from Client 31D02 devices, Server Availability C-1 matrix is updated. The Server Availability C-1 information may be conveyed by database replication through the API of the GVN to Clients 31D02 via Share Info 31C-6 module via API call path API-31CP6, by direct file sharing via GVN, or other method.

Client 31D02 reports information to Receive Info 31C-0 module of the SRV_CNTRL 31D00 device via path API-31CP2. This information will be stored in the repository of SRV_CNTRL 31D00. Specific tunnel information from a Client 31D02 can be shared with Server 31D04 by Share Info 31C-6 module via path API-31CP4.

SRV_CNTRL 31D00 compiles a current List of Clients 31C-4 per server which it publishes to Server 31D06 via Share Info 31C-6 via path API-31CP4.

If either Client 31D02 or Server 31D06 detects problems in establishment of tunnel utilizing current tunnel information, one or the other device can request a new set of tunnel information to be generated by SRV_CNTRL via API-31CP2 or API-31CP0 respectively. New tunnel info sets can be shared via Share Info 31C-6 with both peers in a peer pairing with Client 31D02 info sent via API-31CP4 and Server D02 info sent via API-31CP6.

The List of Clients 31C-4 and the current state of a Server 31D06 will have a direct impact on the Server Availability 31C-2.

Each Server 31D06 needs to organize, secure and coordinate its List of Clients 31C-4 which will attempt to build new tunnels to shared resources of Server 31D06. This information will be fluid and need to be updated regularly via secure API calls to SRV_CNTRL 31D00.

The need to securely harmonize info between devices is essential to protect the integrity of tunnels between them.

Tunnel Build 31S4 phase describes the process of tunnel establishment via Share Info 31C-6. Refer to FIG. 30 for the steps taken between Client and Server to build the tunnel.

The path 31TP0 represents path between Client 31D02 and Info Exchange 31C-10 and from Info Exchange 31C-10 to Server 31D06 via path 31TP2.

Establishment Threats 31C-8 refers to threats to Info Exchange 31C-10 during tunnel establishment. If the signature of the tunnel type is visible, then there may be threats during the tunnel establishment 31CC-8 such as fake Transport Layer Security (TLS) handshakes from illegitimate actors in the middle, TLS errors on handshake, Port and IP identification resulting in blocking or obstructing, time outs due to filtering devices, reset packets sent by ISP or firewall or device in the middle, or other threats.

If the Info Exchange 31C-10 is successful, the Build Tunnel 31C-12 step will be taken with routes applied and other related actions to enable the tunnel TUN to be securely built between Client 31D02 and Server 31D06.

Tunnel UP 31S6 describes the period during normal flow of traffic through a tunnel. It is essential to convey information between devices and there exists a need on SRV_CNTRL D00 to manage unique info for various Client 31D02 and Server 31D06 devices, as well as for multiple tunnels to be built between them.

The exchange of information between devices has to be a regular occurrence as there exists a recurring need to make fresh, new dynamic tunnels. Some ports on an IP address may be blocked or become blocked and simply changing the port for that IP address will allow the tunnel to be built and for data to flow. Furthermore, each tunnel needs one or more unique ports per IP Address to avoid collisions between tunnels. When a Client 31D02 device requests new tunnel information to be created, a random port number is generated and the port availability for that specific IP address on the target Server 31D06 is checked against two or more factors including; if that port is already in use by an existing tunnel (either an operational one or one on standby which could be made operational), and if that port has been used by that specific Client 31D02/Server 31D06 peer pair in the past and if it has been blocked. In both cases, a new random number will be generated. There are 65,536 ports available per IP address with a certain number reserved for specific services. A floor for example of 5,500 would leave available 60,036 ports which could be used by the random number generator with a min of 5001 and max of 65536. When a tunnel is dismantled and the port is marked as blocked for a peer pair, it is made available to other peer pairs to utilize. This freeing up of ports is necessary to avoid exhaustion of ports. Therefore the tracking IP and Port combinations by SRV_CNTRL 31D00 is essential.

A tunnel can help with its own establishment through steps but it also has limitations. While secure, most tunnels are visible during establishment. The handshake and signature of what kind of tunnel it is may be visible during operation. Manually set keys are cumbersome and not often changed and if used for too long, the risk that they can be broken increases; therefore keys should be re-keyed with new ones on a frequent basis.

Automated systems need to ensure that information such as new keys, ports to IP Addresses and other info can be created and that this information is available to both sides of the peer pair so that tunnels can be built and rebuilt. Both sides have to be configured & ready to be able to build tunnels. Therefore, the exchange of info between peer pairs needs to be secure or integrity of the security of the tunnel itself is compromised.

While tunnel is up and pushing traffic, operational threats 31C-14 exist. The tunnel signature may be visible (e.g. if the tunnel is sniff-able and not obfuscated). The structure of the tunnel may be known if type of tunnel is able to be discovered. This risks the stream of packets being grabbed and brute force key breaking being used to decrypt the contents of the tunnel. Or a reset signal can break tunnel if the reset code or other tunnel control codes are known. Therefore to maintain tunnel security and integrity between Client 31D02 and Server 31D06 devices in a peer pair, the updating and sharing of information needs to be automated and secure.

The GVN structure allows devices to be enabled for automated secure tunnel establishment between peer pairs based on most current information. A combination of security features and methodologies offer self-reinforcing protections.

FIGS. 32-35 illustrate the third Layer of the GVN with respect to neutrality and security of the GVN tunnel while comparing number of hops to the hops of the base Internet connection. The use of the term LAN in these figures is intentionally general and can represent the network of a home or office or Internet Data Center (IDC). Devices could be clients or servers connected to the LAN. FIG. 32 illustrates a GVN Tunnel from LAN to EPD to SRV_AP to Internet. FIG. 33 illustrates GVN Tunnel from LAN to EPD to SRV_AP to EPD to LAN. FIG. 34 illustrates a GVN Tunnel from LAN to EPD to SRV_AP to SRV_AP to EPD to LAN. FIG. 35 illustrates additional elements, including peering points, of a the GVN Tunnel from LAN to EPD to SRV_AP to SRV_AP to EPD to LAN of FIG. 34.

All four figures include the common element of baseline from EH1 through to EH17 representing the external hops of the base internet connection. The distance between each hop is not to scale and does not represent anything other than the number of hops. Other common elements include a local area network LAN1 with a gateway device GWD1 at one end and another LAN2 with GWD2 at the other end. Each variation of this example embodiment also has a GVN end-point device EPD-1 connected to an access point server AP-1. There exists a tunnel between these devices and one neutral hop per device NH1 and NH2 inside of the Third Layer of the GVN.

FIG. 32 illustrates a GVN Tunnel from LAN to EPD to SRV_AP to Internet. The tunnel can also act in the other direction offering entry access from Internet to GVN tunnel back to LAN. There is a point of presence POP-1 between AP-1 and the Internet. Another POP-2 is between the Internet and GWD2 representing a Network Access Point (NAP) for connectivity of that LAN.

FIG. 33 illustrates GVN Tunnel from LAN to EPD to SRV_AP to EPD to LAN. This variation illustrates an end-to-end GVN tunnel(s) between edges of two LANs via one SRV_AP. The difference between this variation and FIG. 32 is that the tunnel extends over the entirety of the transit through the Internet from EH3 through EH15. A second EPD-2 is illustrated.

There is one tunnel between EPD-1 and AP-1. This is joined to a second tunnel between AP-1 and EPD-2. There are three neutral hops within the Third Layer of the GVN represented by NH1, NH2, and NH3 as compared to the 13 hops on the base Internet between EH3 and EH15.

Total hop count from LAN1 to LAN2 is therefore at minimum seven hops from LAN1 to GWD1 to NH1 to NH2 to NH3 to GWD2 to LAN2. The end to end count includes two internal hops at both ends from EH1 through EH17 and totals a minimum of 17 hops.

FIG. 34 illustrates a GVN Tunnel from LAN to EPD to SRV_AP to SRV_AP to EPD to LAN. This variation illustrates an end-to-end GVN tunnel(s) between edges of two LANs via two (or possibly more) SRV_APs. The difference between this variation and FIG. 33 is that there is a second AP-2 inserted into the path to represent another joining of tunnels AP-1 to AP-2 and AP-2 to EPD-2. There is another internal neutral hop added brings the hop count inside the Third Layer of the GVN to eight.

FIG. 35 illustrates additional elements, including peering points peering points between ISPs and network edges, of a the GVN Tunnel from LAN to EPD to SRV_AP to SRV_AP to EPD to LAN of FIG. 34. This variation illustrates an end-to-end GVN tunnel(s) between edges of two LANs via two SRV_APs and it also further illustrates more information about different Internet Service Providers (ISP) carrying traffic over certain portions of the Internet between EH-3 and EH-15.

The difference between this variation and FIG. 34 is that additional elements have been indicated. The following elements as illustrated in FIG. 9 have been overlaid in this variation of the example embodiment: a) EDGE-1 is the demarcation point for network access connection between the devices of LAN-1 and the POP of ISP-1; b) PP-01 is the point where peering occurs between the ISP-1 and ISP-2 networks; c) PP-02 is the point where peering occurs between the networks of ISP-2 and ISP-3; and d) EDGE-2 is the demarcation point for network access connection between devices of LAN-2 and the POP of ISP-3

Some advantages can be realized by placing SRV_AP-1 at PP-1 so that this SRV_AP directly can peer with both ISP-1 and ISP-2. More advantages can be realized by placing SRV_AP-2 at PP-2 so that this SRV_AP can directly peer with both ISP-2 and ISP-3. If the network of ISP-2 is not ideal, it is possible for traffic to be alternatively routed around ISP-2 by the GVN through another route or line or ISP or carrier.

The hop count through the neutral Third Layer of the GVN remains at eight as it was in FIG. 34. The distance between ISPs is not to scale. Furthermore, it is likely that there could be more hops within the network of an ISP but for simplicity sake, the quantity illustrated has been simplified.

While FIGS. 33, 34 and 35 all illustrate the joining of tunnels at AP hops, this is viewed as a single tunnel by client devices within LAN1 and LAN2. This singular tunnel represents the neutral Third Layer of the GVN within which it is possible to run all traffic that would normally transit over the internet, including TCP, UDP, and other protocols, plus other tunnels such as IPSec, OpenVPN, PPTP, or other. There are other advantages realized by the Third Layer of the GVN. Some include lower TTL and ability to have more control over routing plus other advantages.

FIG. 35 illustrates the weaving together of various network fabrics into a network tapestry. This example embodiment illustrates the weaving together of various network fabrics at the physical layer over the top (OTT) of which the global virtual network (GVN) operates. These fabrics at the physical layer 36102 constitute a chain of network segments which may for example be IPv4 and IPv6 aware, or only one or the other protocol. The end point device (EPD) 36100 to LAN (36000) could be IPv4 and/or IPv6. The tunnel TUN 36P2 can be one or the other or both protocols between the EPD 36100 and the access point server (SRV_AP) 36300.

The Egress/Ingress point (EIP) 36302 denotes the exit and entry point from the GVN to network fabrics at the internet level. The path 36P04 denotes the connectivity to IPv4 internet networks 36400 and the path 36P06 denotes connectivity to IPv6 internet networks 36600. The key point is that the Tapestry of the GVN allows for end to end links of fabrics such as IPv4 internet 36408 to IPv4 in the LAN 3600 or end to end IPv6 3608 from Internet 36600 to LAN 36000 even though there may be some dissimilar segments at the physical level 36102.

FIG. 37 illustrates communication pathways in a GVN for automated device collaboration. This example embodiment shows the communication pathways such as P37202-C used by a neutral API mechanism (NAPIM) API 37202 37206 37208 for automated interaction between various devices working together to constitute a global virtual network (GVN).

Key operational aspects can be automated to facilitate rapid systemic response. These include infrastructure operations, heartbeat routines, connectivity, testing & diagnostics, and other functionality.

Infrastructure operations such as keeping device operating system software and packages up to date from reliable sources with predictability, maintaining GVN modules and databases and other operations. For example, an end point device (EPD) 100 can query the central control server (SRV_CNTRL) 200 via API 37202 along paths P37202-B to 37202-C. In another example, the email gateway server (SRV_GW_Email) 37310 can update a system package from SRV_CNTRL 200 which is a reliable source for trusted system software.

Other items such as heartbeat functionality running via daemons or other repeat cyclical operations include keeping services up, running and healthy with reporting from a device such as an access point server (SRV_AP) 300 reporting to SRV_CNTRL 200 via API 37202 through paths P37202-A to P37202-C. There are also exist redundancy paths such as via API 37208 through paths P37208-A to P37208-C. Other heartbeat functionality can keep queues operating and clear, can replicate logging data and other such operations.

For connectivity such as tunnels P37206-C between EPD 100 and SRV_AP 300 relevant information is required by both ends of the tunnel, the listener at SRV_AP 300 and the initiator EPD 100. This information can include peer pair info related to each device or related to the tunnels. Both communicate with SRV_CNTRL 200 via independent paths via API 37202.

With multiple tunnels hooked on to virtual interfaces and the option for more than one tunnel between devices such as EPD 100 to SRV_AP 200 or SRV_AP 200 to SRV_AP 20*x*, various different API calls are required for the management of multiple tunnels, routes and other information.

The algorithms which power server availability rely on systemic analysis of various kinds of information to offer EPDs with a list of SRV_AP servers with which they can connect via tunnels. Since each tunnel requires an IP address and port at either end mapped to the GVN construct so that routing is clear, is changing information needs to be up to date. Automated device collaboration facilitates this.

A key component for information sharing is for that of testing & diagnostics data from the Layer 1 physical network, from the GVN construct Layer 3 as well as from logic at the GVN Layer 2. This connectivity information provides more information for analysis on the SRV_CNTRL 200. Replication of this data can also be to a logging server via API 37208 or other communications path. The results of the analysis can also be stored on the logging server.

The API can also be utilized to update information about itself to each peer in a pairing such as peer pair credentials, ID, and other info, the queue on each, the transaction logs for reconciliation, by internal security audits and for updating or adding or deprecating action functions of the API mechanism itself.

Systems and resources monitoring and reporting is also key with information conveyed automatically about services up and running, that hosting is working, that the database engine is up and running, that security systems are running and more.

FIG. 38 illustrates the problems and challenges of dynamic tunnel building. This example uses the transfer of files, database structures and other data from a Repository 38R-00 to a Device 38D-00 of the GVN to illustrate the problems and challenges of dynamic tunnel building. The Repository 38R-00 will in most cases be on the Central Server (SRV_CNTRL) of the GVN. Device 38D-00 can be an End Point Device (EPD), Access Point Server (SRV_AP), Gateway Server (SRV_GW_XX), or other device of the GVN.

Depending on the type of device, a newly created device may be loaded with a clone of a master disk to be configured during first boot or as in the case with remote servers, a first boot script will be securely transferred to the server to be run to pull base system files. Other potential scenarios may combine a combination of pre-loaded files plus files to be loaded remotely.

Upon running of a first boot script, most current database structure is replicated from Repository 38R-00 from DB Structure Repository 38R-06-A to Db 38D-04 on Device 38D-00. Data to populate the database will be send from DB Data Repository 38R-06-B via 38P06 to an Identity Info module 38S-00. Some data passing through 38S-00 may be filtered and modified to incorporate identity information such as Device_ID and other UUID elements and other data passed through as direct copy without modification.

Depending on the type of device and the device's universally unique identifier (UUID), data appropriate for device 38D-00 is sent via path 38P16 to Database 38D-04. Some information may also be populated into template configuration files which can be cloned to the Software and Configuration Files storage 38D-02 on device 38D-00. Identity information unique to a device may include: device attributes, naming and UUID info, credentials/keys, key adjustors, other information.

Settings files for system packages and other modules will be cloned from Settings Files Repository 38R-02-B on Repository 38R-00 and sent via path 38P02 to Software and Configuration Files storage 38D-02 on device 38D-00. Some "factory default settings" and other files may also be copied via path 38P10 to Secure File Storage 38D06 on the device 38D-0. The Secure File Storage 38D-06 is administered by the Files and Folder Manager of the GVN. Files from 38D-06 may also be cloned to 38D-02 via 38P12 when needed, such as in the case of having to revert back to factory settings.

Code Base Files 39R-02-A from Repository 39R-00 can be copied to Software and Configuration Files storage 38D-02 via path 38P00 and also can be copied to Secure File Storage 38D-06 via path 38P8.

The above illustrates the loading of files and data from repository to device during first boot, updates, regular data exchange, and other operations.

FIG. 39 illustrates the bridging of two LANs into a wide area network (WAN) via two or more EPDs. More particularly, this figure shows the bridging of two LANs 39-000 and 39-010 into a wide area network (WAN) via the EPDs. Each EPD first connects to an access point server SRV_AP 39-200 via base tunnels built over the top (OTT) of their internet connections.

From EPD 39-100, the base connectivity path OTT is via paths 39-PO02 to a point of presence (POP) 39-002 to the internet 39-004 to the POP 39-006 of the SRV_AP 39-200. From EPD 39-110, the base connectivity path OTT is via paths 39-PO12 to a point of presence (POP) 39-012 to the internet 39-014 to the POP 39-016 of the SRV_AP 39-200.

The transit path 39-P06 from POP 39-006 to POP 39-016 could be the path through the internet, by passing the SRV_AP and relying on the routing on the public network. If the EPD 39-100 wants to connect to EPD 39-102 via the internet, it may follow a different route based on policies out of the control of the GVN or either EPD.

EPD 39-100 builds a tunnel TUN 39-P10 between itself and SRV_AP 39-200. EPD 39-102 also builds a tunnel TUN 39-P12 between itself and SRV_AP 39-200. One or both of these tunnels may or may not be encrypted or secured. There can also be another tunnel, internal tunnel INT TUN 39-P20 run through both of the other tunnels, joined at the SRV_AP 39-200 through which traffic can flow. This tunnel can be the communications path through which the WAN is built.

The tunnel and base connection connectivity can use different network protocols. Network tapestry offered by the GVN can be a blend of different network protocols mapped to a chain of various network segments while concurrently the GVN can be one network type end-to-end within the internal tunnel.

FIG. 40 illustrates a Multi Perimeter Mechanism (MPFWM) running on a GVN. This example demonstrates how there can be a second degree 40TOP88 over the top (OTT) element within a global virtual network (GVN). At the first degree of OTT 40TOP86, the GVN 40-86 operates OTT the base internet connectivity 40-82. In the case of a multi-perimeter firewall mechanism 40-88 construct, it is operated OTT the GVN and so therefore can be construed as a second degree over the top element 40TOP88.

FIG. 41 illustrates a GVN stack build over the top (OTT) of the Internet. This example describes the GVN 41-800 stack built over the top of the internet 41-000. The figure shows the connectivity between EPD 100 and two SRV_AP servers 300 and 302 via tunnels TUN 41-100-300 and TUN 41-100-302. These two tunnels are an example of multiple tunnel options between EPD and the best current access point server (SRV_AP) based on server availability and other factors such as destination, type of traffic, QoS of various network segments between origin and destination, and more.

Tapestry 41-500 is the weaving together of various network protocols of individual network segments as well as the end to end protocols which can be "run through" GVN paths.

Cluster GVN Devices 41-600 represents the physical layer of routes between devices of the GVN.

GVN Global Network OTT Internet+via other Links 41-700 is the GVN Layer 2 logic where modules operate such as geodestination, DNS management, advanced smart routing (ASR)/global ASR (GASR), server availability, tunnel management and builder module, etc.

GVN 41-800 represents the network that the client user sees.

FIG. 42 compares the internet protocol IP stack B2, the OSI model C2, and the GVN stack C3.

The IP stack consists of Network Interface T1, Internet T2, Transport T3, and Application T4.

For non-GVN traffic and for the physical tunnel invisible to the client egressing through ETH NIC N1, the IP stack seen by the client follows elements R1 at the Network Interface T1 layer, R2A at the Internet T2 layer, R3A or R3B at the Transport T3 layer, and R4A, R4B or R4C at the Application T4 layer.

For traffic through the GVN tunnel and network a client will view its GVN traffic at R4C at the Network Interface T1 layer, R5 at the Internet T2 layer, R6A or R6B at the Transport T3 layer, and R7A, R7B or R7C at the Application T4 layer.

While the OSI model may be used by clients for IP traffic through the tunnel, the GVN has its own stack of Network Interface G1, Internet G2, Transport G3, GVN routing & logic G4, GVN Internet G5, GVN Transport G6, and Application G7.

Logic

FIG. 43 illustrates global Internet flows between countries via many possible routes. Traffic on the global Internet flows between countries via many possible routes transiting different interconnects between peers.

Internets of countries within regions, such as Asia, are mainly connected to each other both by ground and submerged oceanic links. Typically they are chained where traffic from one country to another transits a third or more countries in the middle.

43-X01 represents the most direct route from Asia to Europe. For example from Hong Kong to Paris via 43-X01 latency will be between 180 ms and 250 ms depending on route taken.

43-X02 is an indirect, longer path where traffic is naturally pushed through the Internet. Traffic here goes from Asia to West Coast USA 43-400 via link 43-P400 then to East Coast USA 43-402 via link 43P402 and then to landing point in Europe 43-600 via link 43P600. The latency via 43-X02 will be approximately 396 ms to 550 ms or more depending on destination within Europe.

Prior to leaving a region, traffic may have to relay from one country to one or more other country(ies) before it can access the International Backbone. For example, traffic from China 43-000 may travel through link 43P002 to Hong Kong 43-002 and then to Japan 43-006 via link 43P006. These extra in-region hops can add 50 ms to 150 ms or more to an RTT even before traffic leaves a region.

Once in the destination region, traffic will land in one country for example in the UK 43-600 from trans-Atlantic link 43P600. From the UK 43-600, traffic will travel via link 43-600 to France 43-602 and then on to Germany 43-606 via link 43P606. These extra in-region hops can add 30 ms to many more ms to the RTT depending on destination.

Quality of International Backhaul also can vary between peers with each having various RTT QoS times. The routes and corresponding speeds on the normal Internet are decided middle-men actors and these are in the majority of cases based on least expense often delivering slow RTT speeds. High latency is not the only issue to contend with on the lower quality networks. These usually have higher levels of congestion and correspondingly high packet loss. Lossy and slow links significantly degrade performance.

FIG. 44 again compares the internet protocol IP stack, the OSI model, and the GVN network stack. This example again compares various conceptual network models such as the TCP/IP stack B2, the Open Systems Interconnection model (OSI) A2 C2, and also variations such as the TCP/IP model within the GVN stack A3, as well as the model of the GVN C3.

There are two perspectives presented. The Client Perspective A1 compares A2 and A3 side by side. The Global Virtual Model framework C1 compares C2 with C3. There also exists a tree connecting layers of B2.

Within the TCP/IP model B2, there is the Network Interface T1 corresponding with Ethernet Protocol R1. Internet T2 corresponds with the Internet Protocol (IP) R2. The Transport T3 layer corresponds with the TCP protocol R3A and the UDP protocol R3B. Other protocols may exist and operate at this layer. On top of this is the Application Layer T4 where the Hypertext Transfer Protocol HTTP R4A, mail service POP3 R4B, and GVN applications reside. Other applications such as file transfer protocol (FTP) or other services can reside within this layer.

To compare the TCP/IP model with the OSI model in the scope of B2, the OSI Data Link S9 and Physical Link S8 are parallel with T1. The OSI Network S10 is parallel with T2. The OSI Transport S11 is parallel with T3.

The OSI Session S12, Presentation S13, and Application S14 layers are within the scope of R4C, the GVN application.

The TCP/IP model through the GVN B3 builds an extension to the network tree atop of R4C.

From the Client's perspective, the layers T1, T2, T3, T4 combine into a single TCP/IP model layer T5, becoming a Network Interface Layer for the neutral Third Layer of the GVN. This compares with the OSI Model A2 Physical S1 and Data Link S2 layers.

On top of R4C, there exists representations of the internal layers within the Third Layer. The internal IP Layer is at R5 and this corresponds with the A3 level of Internet T6 and the A2 Network level S3.

TCP protocol R6A and UDP protocol R6B and this level corresponds with A3 level Transport T7 and A2 level Transport S4. Other protocols may exist and operate at this layer.

The Application layer from the Client's Perspective T8 corresponds with internet protocols such as FTP R7A, HTTP R7B, and POP3. The OSI model breaks the Application layer T8 into three layers, Session S5, Presentation S6, and Application S7.

Within the GVN's three layers model, A1 describes operations within the Third Layer while B1, B2 describes operations within the First Layer. The GVN application R4C at T4 and the operations under C1 describe how the Second Layer functions to allow the Third Layer to operate on top of the First Layer.

There are similarities between the operations of the network in the Third Layer and First Layer of the GVN.

The Network Connectivity N0 can be other over the regular Internet N1, via a WAN N2, Dedicated Circuit N3, MPLS Line N4 or other link to the Internet.

FIG. 45 illustrates an tunnel between two LANs via the GVN. Specifically, this figure describes the internal path from LAN 45-000 to LAN 45-002 through the GVN path 45P00 to 45P10 the segments through the internal tunnel 45L300. There are five hops 45H0 through 45H8 visible to the client in either direction between the two LANs. The path through 45L300 is the GVN Layer visible to clients.

The GVN Level 1 Network Layer 45L100 represents the physical network layer for various different types of network segments end-to-end. While not demonstrated within this figure the number of hops and network segments is at least equal to and most likely greater than those visible to the clients within the internal tunnel 45L300.

The logic layer Level 2 Logic 45L200 is the logic where various network segment integration, routing and other GVN operations occurs.

If the client path is IPv6 through the tunnel, for IPv4 segments only like 45-104, the internal IPv6 traffic can be encapsulated in such a manner so that it can remain native IPv6 end-to-end regardless of the network type at the network layer 45L100.

FIG. 46 compares the network at the base level via paths P01 through P13 to the network through the GVN T01 through T03.

Significant measurements at the base internet level CTN140 are LAN to GVN via EPD 46-100 to SRV_AP 46-300 for which connectivity metrics for bandwidth BW, latency Δt=A ms, Packet Loss, and other factors are evaluated. At the other end of the connection, similar measurements BW, Δt=C ms, Packet Loss and other factors at CTN142 measure the on-ramping of traffic into the GVN from EPD 46-102. Through the GVN between SRV_AP 46-300 and SRV_AP 46-302 for the GVN trans-regional OTT various internet segments CTN340 measure BW, Δt=B ms, Packet Loss, and other factors are evaluated. Overall path latency through the GVN Layer Three GVN4-3 can be calculated as the sum of the latencies of A+B+C for total in milliseconds.

At GVN Layer Three GVN4-3, ASR and other features govern how and where traffic flows through the GVN. This entails determining the best tunnel to send traffic through based on target region and traffic type, QoS of the segments through the GVN and other factors.

At GVN Layer One GVN4-1, the physical conditions of the base network connectivity are monitored and tested to determine best route options on top of which to build GVN tunnels and pathways through them. GVN pathways can transit through joined tunnels passing through SRV_AP, SRV_BBX and other GVN hardware devices. This can also determine which tunnels to make, to continue using and which to deprecate.

Mechanisms, modules and component parts at GVN Layer Two GVN4-2 help to set up, test, manage and otherwise operate the plumbing between Layer Three GVN4-3 and GVN Layer One GVN4-1. Tunnel testing 46-310 can be done in Layer Three at the EPD 4100 and at the SRV_AP 46-300 via its tunnel tester 46-312.

FIG. 47 illustrates the Advanced Smart Routing (ASR) feature and elements of the Geo-Destination Mechanism of a GVN within an End Point Device (EPD). This includes using multiple DNS Sources to send traffic via multiple paths to egress points in various regions of the world. Target regions for traffic illustrated in this example embodiment are: 1) local traffic stays local from VIF3 47-118 to Internet 47-004; 2) traffic destined to other region Internet 47-002 will go from VIF1 47-112 through TUN1 102-6 to path 47P48 to SRV_AP 47-300 and then on to Internet 47-002 via path 47P50; 3) traffic for other region Internet 47-006 will go from VIF2 47-116 through TUN2 102-8 to path 47P52 to SRV_AP 47-302 and then on to Internet 47-006 via path 47P54; and 4) traffic for other region Internet 47-008 will go from VIF3 47-118 through TUN3 102-10 to path 47P56 to SRV_AP 47-304 and then on to Internet 47-008 via path 47P62.

SRV_AP 47-304 includes more detail to illustrate functionality some of its components AP Logic 47-314 and Content Pulling Agent 47-318. In addition, the EPD 100 includes a flow chart of more detail to illustrate its internal functional components.

The tunnels TUN1 102-6, TUN2 102-8, TUN3 102-10, and, Traffic Flow through VIFs with routes table applied at each of virtual interfaces VIF1 47-112, VIF2 47-116, VIF3 47-118 operate in a similar manner to virtual interfaces and tunnels.

The DNS Cache 47-114 is seeded from multiple DNS Sources both via Local DNS Query mechanism 47-110 through path 47P38 to Internet 47-004 to SRV_DNS 47-104 via 47P34. The Remote DNS Query mechanism 47-108 can make DNS queries via Content Pulling Agent (CPA) 47-318 via 47P44 to SRV_DNS 47-114.

The Geo-Destination Mechanism (Geo-D) pushes routing information to Routing Manager 47-104 via 47P04 connecting Content Delivery Agent (CDA) 47-106 with CPA 47-318. The path 47P30 to 47P40 via J01 is an abstraction to represent the coordination of CPA 47-318 working with CDA 47-106. Communication between CPA & CDA is still via tunnel and or API call, or transfer via chained caches, through tunnels, or can be via other mechanism.

In this example embodiment, through Geo-D, the CPA 47-318 pulls all regional content into SRV_AP 47-304 via 47P62 from Internet 47-008 to pull content via 47P66 from Host Server 47-110 that is hosting destination content, and within which content the CPA 47-318 may discover links for other content and the CPA 47-318 will then pull a content stream from Host Server 47-108 via 47P64. Other content may be pulled from Host Server 47-112 via 47P68. It is typical for many web sites to host pages on one server, video files to stream from another server and for graphics to be served from another server.

FIG. 48 illustrates examples of various concurrent types of paths for traffic to take via the GVN. The left side of EDGE-1 represents the LAN side. The right side represents the Internet facing side. The right side of EDGE-2 represents the LAN side and the left side represents the Internet facing side.

Traffic from devices within LAN 001 leave the EPD 101 via P002 through an encrypted tunnel P003 to SRV_AP 102 and can egress to the general Internet 106 to reach Host Client or Server devices D005 via path H005. Traffic from devices within LAN 201 leave EPD 301 via P103 to SRV_AP 302 and can egress via P106 to the Internet 106 to reach Host Client or Server devices D005 via path H005.

EPD 101 can link to EPD 301 via the Internet 106 through P003 to SRV_AP 102 to P006 to Internet 106 to P106 to SRV_AP 302 to P103 to EPD 301. There are secure tunnels between the EPDs and SRV_APs via paths P003 and P103. To ensure complete security, for end to end secure tunnels, the path between EPDS is EPD 101 to P005 to SRV_AP 103 to P007 to WAN 107 to P107 to SRV_AP 302 to P105 to EPD 301.

EPD 101 can build a secure tunnel to SRV_AP 102 via P003 and from there link to another secure tunnel via P201 to WAN 103 to P202 to SRV_AP 104 and then egress to the Internet 105 in a remote region via path P203 and on to Host Client or Server devices D002 via path H002.

EPD 301 can build a secure tunnel to SRV_AP 302 via P103 and from there link to another secure tunnel via P301 to WAN 303 to P302 to SRV_AP 304 and then egress to the Internet 305 in a remote region via path P303 and on to Host Client or Server devices D004 via path H004.

EPD 101 is also able to reach devices in Internet 305 via secure tunnels between EPD 101 to SRV_102 to SRV_AP 302 to SRV_AP 304 and egressing to the Internet 305 from there.

EPD 301 is also able to reach devices in Internet 105 via secure tunnels between EPD 301 to SRV_302 to SRV_AP 102 to SRV_AP 104 and egressing to the Internet 105 from there.

There are many other options for routing via end-to-end tunnels, tunnels to egress points on the open Internet, tunnels via multiple SRV_AP devices and other options.

An important point illustrated by this example is that client traffic which is carried by the GVN is through a GVN Third Layer which from the client perspective is the same as a path through the Internet and is consequently able to carry any type of traffic through it while still realizing the benefits of the improvements and greater degree of security offered by the GVN.

For example, path P008 illustrates WAN Optimization connectivity between a firewall GW 002 device and a firewall GW 202 device to create a LAN-WAN-LAN bridge. The device to device communication is carried inside Third Layer of GVN and is transparent to GW 002 and GW 202.

For simplification purposes, point of presence (POP) network access points have not been illustrated in this figure. A path to or from the Internet such as Internet 105 to device D002 does have a POP in the middle of H002.

The WAN in this example embodiment represents a secure tunnel between GVN devices on top of the Internet, and so any mention of WAN is at the Third Layer of the GVN with all GVN traffic still transiting the First Layer.

FIG. 49 describes the automated advanced smart routing (ASR) from one device at the start 49-000 to the end device 49-800. If a route is not available, automated advanced smart routing can built a route, including but not limited building new tunnels, and updating of internal routing for most optimal path.

Tables 1 through 5 are utilized by this algorithm as data points to use for routing purposes, such as determining best egress point for traffic from GVN through access point server to the open internet. This data can also be used by the algorithm to help prioritize which route is better with respect to another route.

Table 1 lists various available paths from origin to destination and include a rating for path ranking.

TABLE #1

| | Rate the QoS of various routes through a GVN | |
|---|---|---|
| RT_ID | Path from Origin to Destination | Rating |
| 1 | EPD EIP ↔ POP ↔ Internet ↔ Destination | 0.15 |
| 2 | EPD ↔ TUN1 ↔ SRV_AP1 EIP ↔ POP ↔ Internet ↔ Destination | 0.36 |
| 3 | EPD ↔ TUN2 ↔ SRV_AP2 EIP ↔ POP ↔ Internet ↔ Destination | 0.58 |
| 4 | EPD ↔ TUN2 ↔ SRV_AP2 ↔ SRV_AP3 EIP ↔ POP ↔ Internet ↔ Destination | 0.96 |
| 5 | EPD ↔ TUN3 ↔ SRV_AP2 ↔ WAN ↔ SRV_AP4 EIP ↔ POP ↔ Internet ↔ Destination | 0.85 |

EPD EIP and SRV_AP2 EIP denote Egress/Ingress Points (EIP) from a device to/from the internet. The two sided arrow ↔ symbol indicates the routed path between two devices. This can either be directly through the internet, as a network segment OTT the internet as a tunnel or other mechanism (possibly as part of a GVN) or via other network path between devices. The point of origin is on the left and the destination implies the final location where the traffic is to be routed to/from.

The rating is a calculated value for a route based on a number of factors. A rating of 0.00 implies an impossible route. A rate of 1.00 implies the most perfect route with highest bandwidth at wire-line speed latency. RT_ID is the route ID number to differential one route from another both for utility, testing and logging purposes. This is utilized to determine the quality of various routes through the GVN. RT_ID is an identification for a specific route from a list of routes.

Table 2 describes a server availability matrix.

TABLE #2

Server Availability Matrix

| SA_ID | Server_ID | IP_Addr_ID | Port | PRI | EPD_ID | Param | Flag_State | Timestamp |
|---|---|---|---|---|---|---|---|---|
| 1 | 8 | 236 | 3581 | 99 | 1 | [array] | 1 | 1448674236 |
| 2 | 8 | 235 | 19501 | 98 | 1 | [array] | 0 | 1448674237 |
| 3 | 7 | 218 | 36152 | 55 | 2 | [array] | 0 | 1448674237 |
| 4 | 5 | 158 | 25739 | 80 | 1 | [array] | -1 | 1448674238 |
| 5 | 19 | 1672 | 59081 | 75 | 2 | [array] | 1 | 1448674238 |

The information held in the Server Availability Matrix include the Server_ID, the server IP_Address_ID, the port number, the EPD_ID field, a parameter field (including security and configuration settings, a flag state, and a timestamp.

The PRI is the weighted priority order of servers for the EPD to use to connect with. A priority of 1 is the absolutely lowest priority. 0 indicates that a server is currently not reachable. This is differentiated in the Flag_State which indicates if the record is current or not. PRI may be kept in same table or in another related table as this is a continuously changing value and another table will allow for historical logging and analysis.

A Flag_State of 0 indicates that it is a standby entry. Flag_State of 1 indicates that it is active and that it can be used. Flag_State of -1 indicates that it is retired, not to be used.

Table 3 illustrates latency for a complete path as well as latency for component network segments.

TABLE #3

Route -> Path latency evaluations

| RT_ID | LAN ↔ EPD | EPD ↔ SRV_AP | GVN Transport To Egress | Egress ↔ Destination | Total Latency for Path | Flag_State | Timestamp |
|---|---|---|---|---|---|---|---|
| 1 | 1 ms | — | — | 236 ms | 237 ms | 1 | 1448674236 |
| 2 | 1 ms | 18 ms | 169 ms | 12 ms | 200 ms | 1 | 1448674237 |
| 3 | 2 ms | 23 ms | 135 ms | 22 ms | 182 ms | 1 | 1448674237 |
| 4 | 1 ms | 21 ms | 139 ms | 8 ms | 169 ms | 1 | 1448674238 |
| 5 | 1 ms | 21 ms | 135 ms | 19 ms | 176 ms | 1 | 1448674238 |

Paths from a LAN via EPD through GVN and or internet or combination of various network segments have a Total Latency for the Path, otherwise known as the RTT, the round trip time. This is the time in milliseconds (ms) for an ICMP ping from origin to destination and its return back to origin.

In order to evaluate best route, it can be broken down into groups of network segments which make up constituent parts of the total network path. Evaluation of various segments can provide information about routing and offers a data point which can be used. Path rating will always give extra priority weighting to traffic to transit GVN OTT of the internet versus traffic transiting the open internet.

The latency for the total path is the sum of the latencies: LAN to EPD plus EPD to SRV_AP plus GVN Transport plus GVN Egress to Destination.

Table 4 lists the measured quality of service attributes of a route.

TABLE #4

Route -> QoS factors measured (current and historical)

| L_ID | RT_ID | Reg_ID | Load | SEC | RTT | R | BW | EFF | Other factors | Flag_State | Timestamp |
|---|---|---|---|---|---|---|---|---|---|---|---|
| 0 | 1 | 1 | 1.5 | 1.0 | 1.1 | 1.00 | 2.00 | 1.22 | [array] | 1 | 1448674236 |
| 1 | 6 | 1 | 0.8 | 1.0 | 0.9 | 0.97 | 0.90 | 0.80 | [array] | 1 | 1448674237 |
| 2 | 4 | 86 | 1.0 | 1.0 | 1.0 | 1.00 | 1.00 | 1.00 | [array] | 1 | 1448674237 |
| 3 | 5 | 44 | 0.7 | 1.0 | 0.3 | 0.50 | 0.45 | 0.75 | [array] | 0 | 1448674238 |
| 4 | 7 | 49 | 0.25 | 0.8 | 0.8 | 0.90 | 0.30 | 0.95 | [array] | 0 | 1448674238 |
| 5 | 5 | 44 | 0.9 | 1.0 | 0.9 | 0.8 | 0.78 | 0.90 | [array] | 1 | 1448848558 |
| 6 | 9 | 44 | 1.0 | 1.0 | 1.0 | 1.0 | 1.1 | 1.0 | [array] | 1 | 1448848559 |

This table is kept as a log of current and historical QoS (quality of service) results for a route between a source peer and another peer in another location and or region. It can be used in real-time to make QoS expectative decisions based on real-world conditions. This table is located on each origin device and indicates the performance of routes.

Various factors are used to evaluate for line quality comparisons. These include System load (Load), Security (SEC), Latency (RTT), Packet Loss (R—reliability), Bandwidth (BW), Hop Count (EFF—efficiency), and Other factors (an array of values which can be used to evaluate line parameters).

A baseline for each point and the network segments between them is utilized so that comparisons can be made between resources which have different hardware configurations and network speed, bandwidth, and other ratings.

L_ID indicates the ID of the row for the logged route information.

RT_ID is the path id. The path could indicate a path through the base internet, through a tunnel, joined tunnels, or other GVN related routes.

Reg_ID is the target region ID.

RTT is Round-trip-time or latency based on the historical norm. A value of 1.0 is normal while greater than 1.0 indicates a lower than usual latency and lower than 1.0 indicates higher than usual latency.

SEC is security rating. A value of 1.0 is secure, and a value of 0.0 indicates completely insecure and a totally compromised resource. This is based on security tests, performance logging and other data points. Any value lower than 1.0 is cause for concern.

R is reliability and is related to Packet Loss on a route. For example R=0.97 indicates 3% of packet loss on a route. A value of R=1.0 indicates 0% package loss and 100% reliability. A rating greater than one indicates parallel duplication of packets sent down a route. R=2.0 indicates 100% reliability for duplicate packets sent.

EFF indicates the efficiency of the line with respect to the length of the route in terms of hop count and is based on its historical mean. An EFF value of 1.0 implies normal hop count and less than 1 implies greater than usual hop count. A value greater than one implies a lower than usual hop count.

BW (bandwidth) is based on line ratings for a base connection combined with the complete network segment between two points. A value for BW of 1.0 implies that 100% of the BW is available. A value of 0.5 implies that only 50% of BW is available based on route BW rating. And if a value is greater than one, such as 2.0 then this implies that 200% of that route's BW capacity rating is available and can be utilized. For example, for a 1 GigE base connection between two points, a rating of 0.55 indicates that 550 Mbps is available. A rating of 2.0 indicates that 2 GigE can be utilized, etc.

In the case of RT_ID=1, the SEC (security) value of 1.0 indicates that it is 100% secure, and the greater than one values of RTT=1.1 and BW=2.0 indicate that connectivity of that route RT_ID from one point to another point has a 10% lower latency and double the bandwidth of a comparable, baseline performance of an average route between those points.

For example where RT_ID=5, the security rating of 0.80 indicates that there is an ongoing security risk, and correlated with the available BW rating of 0.30 shows that the server is under an attack such as DDoS or Brute Force where multiple security threats such as an onslaught of multiple concurrent requests which saturate the available BW (bandwidth) while degrading SEC (security).

Flag_State=1 indicates current, active route. And Flag_State=0 indicates historical route performance no longer in use. Timestamp indicates when in time as a UNIX timestamp (seconds since the epoch).

L_ID=3 and L_ID=5 demonstrate the comparison between route from origin to region Reg_ID=44 at two different UNIX Timestamps of 1448674238 and 1448848558. It shows that the performance at the later time has improved since the rating at the prior time. Load is better at Load=0.9 versus Load=0.7 and network connectivity fundamentals have also improved.

This table can also be utilized to determine the better of two routes from origin device to the target region by comparing the QoS factors of each route. For example L_ID=5 and L_ID=6 both indicate current (Flag_State=1) routes from origin to Reg_ID=44, although the routes are different with RT_ID=5 and RT_ID=9. The better of the two across the board is RT_ID=9 and would be weighted with a higher priority in a server availability list.

Table 5 evaluates and ranks list of egress ingress points (EIP) in target regions.

TABLE #5

EIP in regions

| EIP_ID | Reg_ID | QoS  | BW   | Load | S_ID | IP_ID | ATR     | Flag_State | Timestamp  |
|--------|--------|------|------|------|------|-------|---------|------------|------------|
| 1      | 1      | 0.5  | 1.0  | 0.38 | 25   | 60    | [array] | 1          | 1448674258 |
| 2      | 1      | 6.1  | 10.0 | 0.21 | 39   | 128   | [array] | 2          | 1448674258 |
| 3      | 2      | 0.68 | 1.0  | 0.33 | 50   | 1851  | [array] | 1          | 1448674259 |
| 4      | 2      | 0.14 | 0.2  | 0.91 | 54   | 1938  | [array] | −1         | 1448674270 |
| 5      | 2      | 0.72 | 1.0  | 0.12 | 68   | 2188  | [array] | 1          | 1448674272 |

The ATR field is the attribute field. This is an array of attributes used to describe the specification for the EIP (RAM, Cores, Storage space, other factors, etc.). The S_ID field holds the Server ID. The IP_ID field holds the IP address ID. Bandwidth (BW) is measured in GigE. For example 20 Mbps is 0.02, 100 Mbps is 0.1 and 1 GigE is 1, and 40 GigE is 40.

QoS (quality of service) represents the current EIP (egress ingress point) suitability for a server to handle connections and traffic. A QoS of 1.0 represents the ideal state of a server for an EPD to connect to with acceptable available BW (bandwidth), and little to no Load (resources load of the server, a combination of RAM, CPU, NIC and other factors).

A QoS of less than 1.0 means that that server is being utilized. If a QoS approaches zero, then that means that it is close to total uselessness due to saturation of capacity. As a benchmark and for the health of the system, QoS of less than 0.40 will indicate that a server will be prioritized with a much lower rating so that servers with healthier QoS are weighted to appear higher on the list and therefore will attract connections and to not overload any current server.

This evaluation and ranking mechanism can also be used as a determining factor on how to scale out the build of the physical infrastructure.

FIG. 50 illustrates the Secure Perimeter 50-182 between the BB/Backbone layer Below Perimeter 50-832 and the IP/Internet layer Above Perimeter 50-822.

There are two natural protections in place. The first is the only way to join the two layers together is via paths 50-TR6B22 and 50-TR6B32 and that must pass through the secure perimeter. Only valid GVN traffic can transit in either direction via both logical checks. The other safeguard in place is that the network types above and below the secure perimeter 50-182 are different.

FIG. 51 is a flowchart of Advanced Smart Routing (ASR) within a Global Virtual Network (GVN).

From the starting point of a host client 101 device in a local area network (LAN) 102 connected to an end point device (EPD) 103, the GVN offers the EPD a multitude of connection paths to multiple potential termination points. This is flowchart is a high level view of the routing logic a packet could take as it transits a GVN utilizing ASR for optimal performance. From the perspective of the host client 101, their traffic will flow through an internet protocol (IP) network with as few number of hops and best possible latency at the third layer of the GVN. The first layer of the GVN is the base internet with automatic configuration of a construct of virtual interfaces, tunnels, routing and other networking policies. The second layer of the GVN is where the algorithms, software and logic to govern operation between layer three and layer one.

The first main routing decision is at a logic gate 104 within the EPOD where traffic either egresses to the local Internet 107 where the EPD is located via path P104 or if it is to go through a secure wrapped and obfuscated tunnel via P107 to the access point server (SRV_AP) 110 offering the best connectivity to the region where SRV_AP 110 is located. Prior to traffic egressing SRV_AP 110, it passes through a routing logic gate 111. Traffic to egress locally to the internet 113 will go via path P111 to either a host client 115 or a host server 116 there. If traffic is not local but rather to be relayed to another region, it will go via path P116 through a tunnel 118 to the next SRV_AP 119.

At SRV_AP 119, three of many possible routing options are illustrated by the paths that traffic can take. There is a logic gate 126 to determine if traffic should remain and egress to the local internet 129 or if it should go through a tunnel via P126 to a SRV_AP in another region 127. Another possibility is illustrated via path P119 which demonstrates a tunnel from SRV_AP 119 to another EPD 121 in a distant region. This is an EPD 103 to EPD 121 bridged via multiple bridged tunnels.

A further possibility is for traffic to reach client devices 125 126 in the LAN 122 where EPD 121 is located through the EPD's connection P121.

FIG. 52 is a flow chart of the various routes available through a GVN from an origin C 52-002 to destination S 52-502. There can be many more possible combinations that are not shown or discussed.

Path 52CP00 from the Client C 52-002 to the EPD 52-108 can be used to measure the performance from the client through the LAN to the EPD. Matching of best routes is achieved after tests and evaluating real-time data of available paths. GVN ingress from EPD via first hop 52CP00 to an access point server (SRV_AP) 52-102, 52-104, 52-106, 52-202, 52-204.

Paths from EPD to first SRV_AP can be defined as the ingress point from the EPD into the GVN and measured accordingly. Internal hops from SRV_AP to SRV_AP follow internal routes which always try to maintain the best path connectivity. These could be OTT internet, over backbone, over dark fiber, or other related routing.

Best egress points out of the GVN are also kept track of locally, in that remote region and also holistically for the entire network segment from origin to destination.

Tests can be run on each segment, combinations of segments, and the total network path from end to end taking into account various factors to evaluate. Traffic type and path determination can be depending on data attributes and profile QoS requirements. The main path choice is always based on best factors for traffic over path. A function of this mechanism is to match paths between destination and origin to flow for best possible bidirectional route.

Table 6 is a list of IP addresses to keep local based on IP Address, protocol(s), and port(s).

TABLE #6

| IP Addresses to keep local | | | | | | |
|---|---|---|---|---|---|---|
| LRI_ID | IP4_Address | Protocol | Ports | ATR | Flag_State | Timestamp |
| 1 | 36.12.22.88 | * | * | [array] | 1 | 1448674102 |
| 2 | 204.68.207.18 | TCP | 80, 443 | [array] | 1 | 1448674103 |
| 3 | 38.12.251.82 | TCP, SCTP, UDP | 22 | [array] | 1 | 1448674258 |
| 4 | 66.220.12.150 | UDP | 554 | [array] | 0 | 1448674360 |
| 5 | 8.8.8.8 | TCP, UDP | 953 | [array] | | 1448674361 |

This table keeps track of which IP Addresses to keep local so that transit an EIP (egress/ingress point) either directly on the EPD or via an SRV_AP in the same region as the EPD. The LRI_ID field holds the Local Route IP Address ID. A Region value of 0 indicates IP Address(es) to keep local that should go directly to the Internet from the EPD from its local EIP. Region values of 1 to 300 indicate countries and territories. Higher Region ID's represent more finely grained granularity. The IP4_Address field holds an IPv4 address.

Under a column such as Protocol or Ports, an asterisk ("*") means a wild card covering all potential values in an allowed range or in a list set of allowed values. If one or more values is in a column and separated by a comma, then it indicates that more than one port, or protocol, or other column value can be used. Then only those values explicitly noted will be effected by the table prescription, with other values which are not specified as following the default behavior.

Table 7 is a list of IP address ranges, their target geographic destination ID, and which EPD ID that these rules apply to.

TABLE #7

Tables of IP Addresses to route via Geographic Destination

| GDR_ID | IP4_Start | IP4_End | GDReg_ID | EIP_ID | ATR | Flag_State | Timestamp |
|---|---|---|---|---|---|---|---|
| 1 | 8.4.4.2 | 8.4.4.8 | 1 | 1025 | [array] | 1 | 1448674102 |
| 2 | 201.1.2.5 | 201.1.2.25 | 1 | 1026 | [array] | 1 | 1448674103 |
| 3 | 38.12.251.82 | null | 3 | 3025 | [array] | 1 | 1448674258 |
| 4 | 66.220.12.76 | 66.220.12.80 | 1 | 1025 | [array] | 1 | 1448674360 |
| 5 | 151.8.11.1 | 151.8.15.255 | 5 | 5093 | [array] | 1 | 1448674361 |

The GDReg_ID field holds a geographic destination ID. A Region value of 0 indicates IP Address(es) to keep local that should go directly to the Internet from the EPD from its local EIP. Region values of 1 to 300 indicate countries and territories. Higher Region ID's represent more finely grained granularity. The IP4_Start and IP4_End fields hold starting and ending IPv4 addresses.

Table 8 is a base reference of IP addresses for countries and other geographic regions to be utilized by a geographic destination mechanism. Due to the large number of IP addresses utilized, the CIDR notation is utilized.

TABLE #8

Base reference of IP Addresses per region

| CIPB_ID | GDReg_ID | Region | CIDR4 | Total_IP4 | Flag_State | Timestamp |
|---|---|---|---|---|---|---|
| 1 | 1 | US | 3.0.0.0/8 | 16,777,216 | 1 | 1448674102 |
| 2 | 1 | US | 5.1.94.0/24 | 256 | 1 | 1448674103 |
| 3 | 1 | US | 5.10.70.0/29 | 8 | 1 | 1448674258 |
| 4 | 44 | UK | 2.22.128.0/20 | 4096 | 1 | 1448674360 |
| 5 | 49 | DE | 2.16.6.0/23 | 512 | 1 | 1448674361 |

This table defines the IP Address ranges for country wide blocks or regional blocks, depending on granularity utilized for regional routing. Geographic destination routed addresses are routed in order before regional IP address tables and therefore route first.

The CIPB_ID field holds a Country IP Address Block ID. The CIDR4 column indicates the CIDR for a range of IPv4 addresses. CIDR stands for Classless Inter Domain Routing which is a notation to describe a range of IP addresses. For example a slash eight (/8) notation represents a block of 16.78 million IP addresses. A slash twenty (/20) represents 4,096 IP Addresses. The Total_IP4 column indicates the total number of IPv4 addresses which are covered by a CIDR4 defined range.

FIG. 53 is a flowchart of an algorithm governing the selection of traffic routing from a Start device to an End device.

In the GVN, there are routing tables for pathways at the base level of the internet between GVN devices and each other such as an EPD and an SRV_AP over top of which a tunnel can be built. Routing tables govern both the Level 1 (internet level) traffic as well as routes through the GVN at Level 3. At times, tunnels may not exist or if they do, they may not be optimal. GVN routing can be mapped both to existing and possible GVN routes based on the topological database. Full information about base network segments, and links between devices is stored in the GVN databases.

The algorithm starts by identifying the target region for the particular GVN traffic. Next, a check is made to see whether or not a path exists through the GVN 5306. If this does not exist, a new tunnel 5310 is built. The next step is to check the health of the tunnel 5312. If it is not okay, a new alternative tunnel will be built 5310. Once a healthy tunnel is available, routing health is checked 5320.

If a path to EIP in the target region 5322 exists route and the route is checked to see if it is the best route for the traffic type. If it is, the route is used 5360.

If the route is not ideal for the data type, a check to see if an alternative does exist 5350. If it does, then the best route for traffic type is utilized 5352 and that best route is used 5360. When a route is used, processes evaluate the route performance 5365. Before the algorithm completes, another process will save performance data in logs related to server availability via P5328, to list of EIPs 5322 and also to mapping paths to target regions used by 5302.

If the test at 5350 determines that the route is not ideal for data type and no alternatives exist, then new tunnel will be built 5310 via path P5314.

Control

FIG. 54 illustrates the modules required for automated device collaboration and information exchange in a GVN.

EPD 100 is the endpoint device. SRV_AP 300 is an access point server which is located in the target destination region. SRV_CNTRL 200 is a central server accessible by both the EPD and the SRV_AP as well as by other devices which may support a graphic destination mechanism.

Each device EPD 100, SRV_AP 200 and SRV_CNTRL 300 stores information about itself in a local information repository in the form of lists, files, database tables and records, and other means. This repository also contains information about peer device relationships, stores logs, plus other relevant operational information. The SRV_CNTRL 200 also has additional storage functionality and its role is to provide information to other devices relevant to them and or to the peer devices which they may connect with, to evaluate current conditions and provide centralized control-like guidance such as the publishing of a server availability list and other functionality. A neutral API mechanism (NAPIM) can send info between devices and the peers which they connect with, and can also be used to update the API itself.

The database on the SRV_CNTRL 200 acts as a repository for information about itself as well as a centralized repository for other devices. There can be many different SRV_CNTRL 200 servers acting as multiple-masters in many locations. Each database can store certain information including tunnel information, peer information, traffic information, cache information, and other information. Security and other aspects are independently managed by each device including heartbeat functionality, triggered scripts and other mechanisms.

FIG. 55

FIG. 55 illustrates the communications between EPD 100, SRV_CNTRL 200, and SRV_AP 300 via the neutral API mechanism (NAPIM) of the GVN via paths API-55A1-55A2, API-55A3-55A2, and API-55A1-55A3.

For tunnels TUN55-1, TUN55-2, and TUN55-3 to be built between EPD 100 and SRV_AP 300 as well as for tunnels from EPD 100 to other SRV_AP servers such as TUN55-4 and from other EPDs to SRV_AP 300 via TUN55-5, each device in the peer pair requires certain information per tunnel.

The NAPIM mechanism stores relevant credentials, coordinates and other information for each side of a peer pair to utilize when building new tunnels via the Tunnel Managers 55110 and 55310. The server availability mechanism 55222 on the SRV_CNTRL 300 evaluates the performance of various tunnels tested on the EPD side via Tunnel Tester 55112 and the SRV_AP side by Tunnel Tester 55312. The information from the tests is relayed to the Connectivity Analyzer 55288 on the SRV_CNTRL 200. Test results include assigned IP address and port combinations, ports used, results from historical combinations use, results from port spectrum tests, and other related information.

Server availability lists present the EPD 100 with a list of IP addresses and ports which could be utilized by the Tunnel Manager to build new tunnels. The SRV_AP 300 and other SRV_AP servers noted on the list will be notified to expect 55320 and to listen for connection attempts to be made by EPD 100.

Server availability prioritizes the list of SRV_AP IP address and port combinations based on expected best performance of the tunnels to be built while also looking at current load of available SRV_AP servers, balancing assigned lists given to other EPDs as well as other available information.

FIG. 56 illustrates various types of communications available between GVN devices via the NAPIM.

Closed loops are available as NAPIM REQ/RESP communications between known peer pairs and there are two main types; Device to Repository 56-P2C and Device to Device 56-P2P.

RESTful URL posting is an open access (if allowed for that specific action) possibly to unknown peers, such as generic or general non sensitive information which can be shared.

Each defined API action has a flag governing access via path type with potential values, another flag regarding whether authentication is required or not required, plus other controls. For example, an EPD 100 can request a list of available servers and corresponding IP addresses and ports via 56REQ100200 and receive that list from SRV_CNTRL 200 via response path 56RESP100200. At the same time, the SRV_AP 300 may be informed by the EPD 100 via 56REQ100300 or may receive the information from the SRV_CNTRL 200 either via NAPIM, by data base replication, via back channel, or other message.

FIG. 57 describes API call groups 57202, 57206, and 57208 between different types of devices within a Global Virtual Network (GVN). Each API call is circular in nature with a request sent from a client to a server with a response sent back. In most cases, the client can be one or the other end of a peer pair as long as the other peer has listening enabled for it to act as a server.

API call group 57202 represents calls from the Central Server (SRV_CNTRL) 200 via path P57202-C to End Point Device (EPD) 100 via P57202-B and Access Point Server (SRV_AP) 300 via P57202-A. This type of communication can exchange information between the repository database and file store on the SRV_CNTRL 200 and the EPD 100 and SRV_AP 300 about tunnel info, logging info, billing info, device peer pair data, and other forms of relevant information.

Between the EPD 100 and SRV_AP 300 are two types of communication path. The direct tunnel is where Third Layer traffic, information and binary files can be pushed as data packets via path P57206-C. There also exists an API call framework 57206 between EPD 100 and SRV_AP 300 via P57206-B to 57206 to P57206-A.

Direct connect between EPD 100 and SRV_AP 300 via API 57206 can be for information sharing, collaboration and verification and, other information. For example, an attempt to restart a tunnel can usually be initiated by one side with the other side automatically responding and rebuilding it. However, in the case where a tunnel is stuck and cannot be rebuilt, the API can be used to send commands to try to force a tunnel restart on both ends and if still unsuccessful can share information between devices. This information may trigger a need to use new tunnel information to build a different tunnel between the two devices, or to have both devices query SVR_CNTRL 200 to obtain fresh tunnel building info. Having a communication path between them via API 57206 is therefore extremely useful.

API call group 57208 represents calls from the CNTRL_SRV 200 and internal backend infrastructure devices and other infrastructure supporting devices of the GVN via path P57208-C. For simplicity sake of the illustration, some gateway devices are illustrated in this example embodiment and there are other types of infrastructure devices in a GVN not illustrated here which could connect via this path to the SRV_CNTRL.

SRV_GW_Email 57310 represents an email server and is linked to CNTRL_SRV 100 via P57208-B1 to 57208 to P57208-C. The email can be sent and received via Email Network Access Point (NAP) 57401. A dedicated email server allows other devices to be focused in their functionality and also offers simplified administration as it is the only device type that needs to be maintained with respect to email server administration.

SRV_GW_FIN 57318 represents a financial gateway server through which credit card and other financial related transactions could be made to third parties via External API 57501 NAP. Like the example of the SRV_GW_Email, a single focused device type role allows for other devices to focus on their core functionality and presents a simplified administration with only SRV_GW_FIN servers requiring extra administration to protect financial transactions with third parties.

SRV_GW_Other 57315 represents other types of gateways between the GVN and other services on the internet. Communications between these types of gateway servers and SRV_CNTRL 200 is via P57208-B3 to 57208 to P57208-C.

A secondary API path between SRV_AP 300 and SRV_CNTRL 200 is via P57208-A to 57208 to P57208-C and exists for redundancy purposes and infrastructure related communication between this peer pair.

Another group of calls from SRV_AP servers allow a path from SRV_AP 300 to SRV_GW_Email 57310 via path P57208-A to 57208 to P57208-B1, and to SRV_GW_FIN 57218 via P57208-A to 57208 to P57208-B2, and to SRV_GW_Other 57315 via P57208-A to 57208 to P57208-B3. These can be for API calls for data exchange directly from SRV_AP 300 to those devices.

The API calls which transit via P57208-A can also represent relayed API calls from other devices via the SRV_AP 300 such as from an EPD 100 to SRV_GW_FIN 57318 via path P57206-B to 57206 to P57206-A to 300 to P57208-A to 57208 to P57208-B2 where the flow of the API call through SRV_AP 300 is only another hop in the chain with client being one end EPD 100 and server being the other end SRV_GW_FIN 57318.

API calls and other types of information exchange are essential to the operations of devices in the GVN. There are number of type of automated infrastructure operations. These include keeping device operating systems configuration up to date, updating software packages of the O/S and modules from reliable sources to repository which can house update software for ease and predictability of patching, updating and new installs, deploying new global virtual network software modules and keeping installed modules up to date, controlled replication of the GVN database(s), keeping the API actions library up-to-date, and other operations.

On each device, there are daemons and heartbeat functionality where automation and device to device interaction is required. This includes keeping daemons running, keeping services up, keeping queues up and keeping them unclogged, heartbeat functions, logging functions.

The connectivity and construct structure in the GVN includes virtual interfaces (VIFs), tunnels, multiple tunnels, routes, server availability, geo-destination, DNS, and caches and chained caches.

The most up to date information is required for tunnel building and this information needs to be shared between client and server or tunnels will not be able to be built. As such, there exists a need for testing and diagnostics with the reporting of results data to be analyzed centrally in order to have visibility of the overall operations of the GVN. The testing and diagnostic information can include first layer conditions, connectivity of the tunnels, best point to point route on the Internet, Advanced Smart Routing for best route through the GVN, and device operational status.

The API can also be utilized to convey information about itself such as peer pair information, queue information, transaction logs, security/accounting and other logs, and API actions, patterns, data structures, and related scripts to process actions either on client or server.

Information regarding the state and configuration of Hosting Services can also be conveyed via API calls from a device to SRV_CNTRL or other devices. This information can include services up/down status, API module up/down status and if answerable, hosting status of sites, database status, Secure Socket Layer (SSL) certificates status, GVN component status (e.g. whether components such as geo-destination are running).

There exists other uses for information exchange via API related to Security/FW/Monitoring/Collaboration/Information Exchange, and other mission critical aspects of the GVN. The API is a powerful medium for information exchange and is a holistic self-healing mechanism is therefore possible to be deployed across devices.

FIG. 58 describes the steps taken for an API call from initiation on a client device Peer (Source) 006 through to sending to server device 007 007B with return back to client 006 006B.

The API transaction is triggered at API Start 001. Data is passed to a common class or other type of handler to Create Inner Payload 002. It is added to a queue 003 which can be in memory, saved to database, flat file or other mechanism. The queue step may be bypassed with API call immediately sending or can be set to send at a certain time. As a part of the heart beat functionality of the client device 006 and depending on the priority flag of the API call in the queue, the payload can be processed immediately, processed at a specific time or deferred based on a factor such as load, queue 003 length, network conditions or other factors. When an item is processed from the queue, an outer payload is prepared and relevant transaction data 004 are generated for a specific, single use API call. When the outer API REQUEST payload is ready to be sent it is conveyed via the Neutral API mechanism 005 to be sent to the Peer Target 007 Host (server) API through the Internet Q01 via path CP01 to Q01 to CP03 or through a secure tunnel WAN Q02 via path CP02 to Q02 to CP04.

Upon receiving 008 the Request payload RP01, the server 007 will then begin to parse and interpret the payload. In the processing of the request payload RP01 there will be security and data integrity checks made and the outer payload will be decrypted to discover the contents of the inner payload 009. Further security and data integrity checks will be made comparing the inner and outer payloads. Upon validation, the payload is passed to the corresponding script to take the prescribed action 010. Upon completion of requested action, the inner payload for the response is created 011. The outer payload creation 012 and transaction preparation 013 follow the same process to create the outer API RESPONSE payload RP02 as was followed for when the API Request outer payload RP01 was created. The response is then sent back via Neutral API 014.

The API RESP (Response) RP02 follows the same path back from API server 007 to API client 006.

The API RESP RP02 is received back 015 by the Peer Source API client device 006. The payload is parsed 016 and processed 017. Based on API action type, the data received back will be passed to API handler scripts on 006. Transactions are all Logged 018.

If Call Back 019 is specified 020 then a new call will be initiated via path P019 and in parallel via path P020, the original API call terminates at API Complete 022.

If Call back is not specified 021 in the API RESP RP02 then the original call proceeds to termination point 022 via P021 to complete the transaction.

FIG. 59 is a flowchart outlining the interaction between the EPD and SRV_AP to achieve geographic destination functionality. Specifically, this figure describes the process flow of the geographic destination mechanism starting at client 000 and following a sequential and at times parallel communications path from CP0 to step 12 end point device (EPD 100) with EPD 100 interacting with access point server (SRV_AP 300).

This process flow ends when the content has been pulled within the remote region to SRV_AP 300 and then sent via transfer and caching within the geographic destination mechanism back to the EPD 100 to be served at step number 15 back to the client 000 via path CP203.

Content pull at step number 8 are in parallel via CP13, CP14, CP12 from content servers SRV 803, 804, 802 and the results are sent back via CP10 for listing and then processing of data pull.

Steps 1, 12, 13 and 15 occur in the origin region with respect to the client 000 and the EPD 100.

Steps 2, 10, 11, and 14 are steps that occur in transit in either or both directions between the EPD 100 and the SRV_AP 300.

Steps 5, 6, and 9 occur on the SRV_AP 300.

Steps 3, 4, 7, and 8 occur via EIP (egress/ingress point) from the SRV_AP 300 over the internet in the remote region in which it is located.

Step 3 is for the DNS lookup for the initial URL, URI, and URN of the content requested by the client 000. Step 7 is for DNS lookups for nested content to be pulled as constituent parts of the initially pulled content.

FIG. 60 describes device collaboration within a geographic destination as an overview with component parts indicated as modules and their constituent parts noted on the various devices including the information stored in memory and databases and information exchange and communicated via communication paths both for API traffic as well as data transfer such as file transfer between devices. A GVN makes it possible to control complex automated structures spread across multiple devices to work together to achieve a shared goal.

The figure shows the components of EPD 100 and illustrates the geographic destination mechanism on an end point device (EPD). The figure also shows the components of SRV_AP 300 and illustrates the geographic destination mechanisms on an access point server (SRV_AP 300) in a remote region from the EPD.

The content pulling agent D302 resides on the SRV_AP 300. The CPA D302 receives the target URL/URI from the CDA D102 located on the EPD. This target address that the client wishes to reach is located in another region from the client and is where the client wishes to pull content from. The CPA D302 passes the request address to the remote fetcher bot (R.F.BOT 301).

R.F.BOT D301's job is to do the DNS lookup D304 and then to use that information to pull content via data pull 301. The R.F.BOT D301 works in conjunction with CPA D302 to parse the fetched results via CP01 to seek any other addresses for auxiliary content which can and should be pulled as constituent parts of that content. Requests are stored in database D302 for access and future reference by CPA D302 and R.F.BOT D301. The content file list L301 is passed from R.F.BOT D301 to CPA D302. Data files content is passed from DATA PULL 301 via R.F.BOT D301 to Cache Manager D303. Pulled files are sent to the cache manager D303 for on transfer either as a file clump or as separate files.

Depending on distance from origin to geographic destination region, the file type and QoS, the pulled files in the cache may be clumped into one single file for unified transfer through the chained cache or as individual files which may be sent in parallel, concurrent streams.

There are multiple optional paths to remote region. Data can be transferred via paths between API and TP01 to TP02, between TP01 and TP03, and between TP02 and TP03. Data files can also be transferred through the GVN via paths CP38, CP39, or P06 to CPBB, etc. CP38 is a path via tunnel from SRV_AP 300 to SRV_AP D555 via GVN D888. CPBB is a backbone path between SRV_AP D555 and SRV_AP 300 via relay SRV_AP D505 path P06. CP39 is the file transfer path over GVN from cache 701 to EPD100 via SRV_AP D555. CP02 indicates a direct connection path possibility between SRV_AP 300 and EPD 100.

The optional path to remote regions allow options for traffic to flow via best route based on current conditions, network segment attributes and how these contribute to best transfer, data type, as well as other factors.

FIG. 61 illustrates how a globally distributed parallel file system (PFS) can be connected via a GVN. Specifically this figure illustrates how a globally distributed parallel file system (PFS) can allow access to one of three 61308, or 61318, or 61328 PFS storage nodes seamlessly using native RDMA access through a GVN Tapestry over the top (OTT) of various non-native network fabrics to realize the required quality of service (QoS) and adhering to the high performance computing (HPC) principles required for this functionality.

PFS 61308 is an example of one PFS instance in a client's LAN behind an EPD linked to two other PFS instances "in the cloud" with native RDMA over IB between all three PFS storage nodes allowing true parallel access regardless of network type at base segments. The link 61CP06 is the base internet connection between EPD 100 and SRV_AP 300 and TUN1 runs OTT of 61CP06. 61CP10 is either within an IDC or OTT internet. PFS 61308 connects to PFS 61318 via paths 61CP08→8CP02→8CP06/ TUN1→8CP10→8CP12→8CP18 which represents short distance within a region. These devices are both located within the same High Performance Zone.

SRV_AP 300 connects to SRV_BBX 61310 via 61CP10 and both are located within the same Global Node.

PFS 61318 connects to PFS 61328 via SRV_BBX 61310 connecting to SRV_BBX 61320 which represents Global Node to Global Node long distance communication via GVN.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method comprising:
   identifying, by one or more processors, a plurality of candidate communication routes from a first networking node toward a second networking node, at least a first one of the candidate communication routes comprising one or more virtual network tunnels for use by traffic aggregated from multiple sources, the one or more virtual network tunnels each built between respective peer nodes over an underlying network infrastructure;
   determining, by the one or more processors, a plurality of ratings corresponding respectively to individual routes of the plurality of candidate communication routes, each rating of the plurality based at least in part on a plurality of factors applicable to the respective individual route, including a security rating, wherein a respective security rating indicates a respective level of security risk for each of the plurality of candidate communication routes; and selecting, by the one or more processors, one or more communication routes from the plurality of candidate communication routes based on the plurality of ratings, wherein the selected one or more communication routes are used to communicate data from the first networking node toward the second networking node.

2. The method of claim 1, wherein the first networking node is a virtual network first endpoint device (EPD).

3. The method of claim 2, wherein the second networking node is a virtual network second EPD.

4. The method of claim 3, wherein at least one tunnel of the one or more virtual network tunnels extends from the virtual network first EPD to the virtual network second EPD.

5. The method of claim 4, wherein at least a second one of the candidate communication routes traverses a wide area network path determined at least in part by standard Internet Protocol routing.

6. The method of claim 4, wherein the at least one tunnel is associated with a first virtual interface at the virtual network first EPD and with a second virtual interface at the virtual network second EPD.

7. The method of claim 6, wherein the first virtual interface and the second virtual interface pass traffic between a first local area network coupled to the first networking node and a second local area network coupled to the second networking node.

8. The method of claim 7, wherein the at least one tunnel comprises a plurality of parallel virtual network tunnels that are concurrently active.

9. The method of claim 1, wherein the at least a first one of the candidate communication routes comprises a first route that connects the first networking node to a virtual network first access point via a first tunnel of the one or more virtual network tunnels, and a second route that connects the first networking node to a virtual network second access point via a second tunnel of the one or more virtual network tunnels.

10. The method of claim 9, wherein a third tunnel of the one or more virtual network tunnels connects the first networking node to the virtual network first access point, the first and third tunnels concurrently active, and wherein a fourth tunnel of the one or more virtual network tunnels connects the first networking node to the virtual network second access point, the second and fourth tunnels concurrently active.

11. The method of claim 10, wherein the first and third tunnels are each associated with the first route, and the second and fourth tunnels are each associated with the second route.

12. The method of claim 11, wherein the first route aggregates traffic across the first and third tunnels.

13. The method of claim 10, wherein the at least a first one of the candidate communication routes further comprises a third route associated with the third tunnel and a fourth route associated with the fourth tunnel.

14. The method of claim 1, wherein the plurality of factors comprises a data type for a particular data flow.

15. The method of claim 1, wherein the plurality of factors comprises at least one of a current or a historical latency for a particular candidate communication route or a network segment thereof.

16. The method of claim 1, wherein one or more of the candidate communication routes traverse a firewall perimeter located in a cloud.

17. The method of claim 1, wherein the second networking node comprises an EPD connected to a cloud service provider partner organization, the EPD configured to connect via virtual network connections to a plurality of remote user locations.

18. The method of claim 1, wherein the first networking node is a virtual network access point.

19. The method of claim 1, wherein the one or more virtual network tunnels comprises a plurality of virtual network tunnels joined end-to-end.

20. The method of claim 1, wherein the one or more virtual network tunnels comprises and end-to-end tunnel connecting the first and second networking nodes, the end-to-end tunnel routed within a plurality of intermediate tunnels joining intermediate peer nodes between the first and second networking nodes.

21. The method of claim 1, further comprising determining that none of the plurality of candidate communication routes have an acceptable rating for the given traffic flow, and therefore selecting instead to build a new virtual network tunnel to a selected virtual network access point and select a route including the new virtual network tunnel for the given traffic flow.

* * * * *